(12) United States Patent
Monari et al.

(10) Patent No.: US 9,700,781 B2
(45) Date of Patent: Jul. 11, 2017

(54) SPORTS ENTERTAINMENT TRACKING SYSTEM FOR MOBILE SPORTS SPECTATORS

(71) Applicants: Lawrence Maxwell Monari, Palm Bay, FL (US); Lawrence Scott Monari, Palm Bay, FL (US)

(72) Inventors: Lawrence Maxwell Monari, Palm Bay, FL (US); Lawrence Scott Monari, Palm Bay, FL (US)

( * ) Notice: Subject to any disclaimer, the term of this patent is extended or adjusted under 35 U.S.C. 154(b) by 23 days.

(21) Appl. No.: 14/752,260

(22) Filed: Jun. 26, 2015

(65) Prior Publication Data
US 2016/0375340 A1 Dec. 29, 2016

(51) Int. Cl.
| | |
|---|---|
| *G06T 7/20* | (2017.01) |
| *G06F 19/26* | (2011.01) |
| *A63B 71/06* | (2006.01) |
| *G06T 13/80* | (2011.01) |
| *G06T 11/20* | (2006.01) |
| *G09G 5/377* | (2006.01) |
| *G09G 5/36* | (2006.01) |
| *G06F 17/30* | (2006.01) |

(52) U.S. Cl.
CPC ........ *A63B 71/06* (2013.01); *G06F 17/30241* (2013.01); *G06T 11/203* (2013.01); *G06T 13/80* (2013.01); *G09G 5/363* (2013.01); *G09G 5/377* (2013.01); *G09G 2340/12* (2013.01)

(58) Field of Classification Search
None
See application file for complete search history.

(56) References Cited

U.S. PATENT DOCUMENTS

| | | | | |
|---|---|---|---|---|
| 2005/0207617 A1* | 9/2005 | Sarnoff | ................... | G01S 5/04 382/103 |
| 2007/0146372 A1* | 6/2007 | Gee | ....................... | G06T 13/00 345/474 |
| 2009/0048039 A1* | 2/2009 | Holthouse | ............ | A43B 3/0005 473/415 |
| 2009/0189982 A1* | 7/2009 | Tawiah | .............. | A63B 24/0006 348/157 |
| 2010/0030350 A1* | 2/2010 | House | ................ | A63B 24/0021 700/91 |
| 2011/0090344 A1* | 4/2011 | Gefen | .................... | G06T 7/204 348/169 |

(Continued)

*Primary Examiner* — Barry Drennan
*Assistant Examiner* — Jason Pringle-Parker

(57) ABSTRACT

The present invention is an entertainment system for multitudes of sport's spectators to help them follow the movements of players and play objects on the play areas of sport's venues in past games and in real time games during sporting events and help with making fouling and scoring decisions. The invention uses generic surveillance sources to capture the instantaneous real time and historic continuous data streams of geographic coordinates of the players and their play objects during their movements, and displays the data as scaled animated tracks of the players and the play object on the screens of the spectator's personal smart mobile devices (includes smart devices, mobile devices) under the control of a mobile app. The tracks are displayed on a backdrop which is an animated rendering of the play area. The tracks and the backdrop are calculated to have the same scale to assure their alignment on the screen together.

59 Claims, 20 Drawing Sheets

(56) References Cited

U.S. PATENT DOCUMENTS

2012/0126973 A1* 5/2012 DeAngelis ......... A63B 24/0021
340/539.13
2012/0254369 A1* 10/2012 Gillard .................. G06T 7/2033
709/219
2014/0067098 A1* 3/2014 Regan ................ A63B 71/0616
700/91

* cited by examiner

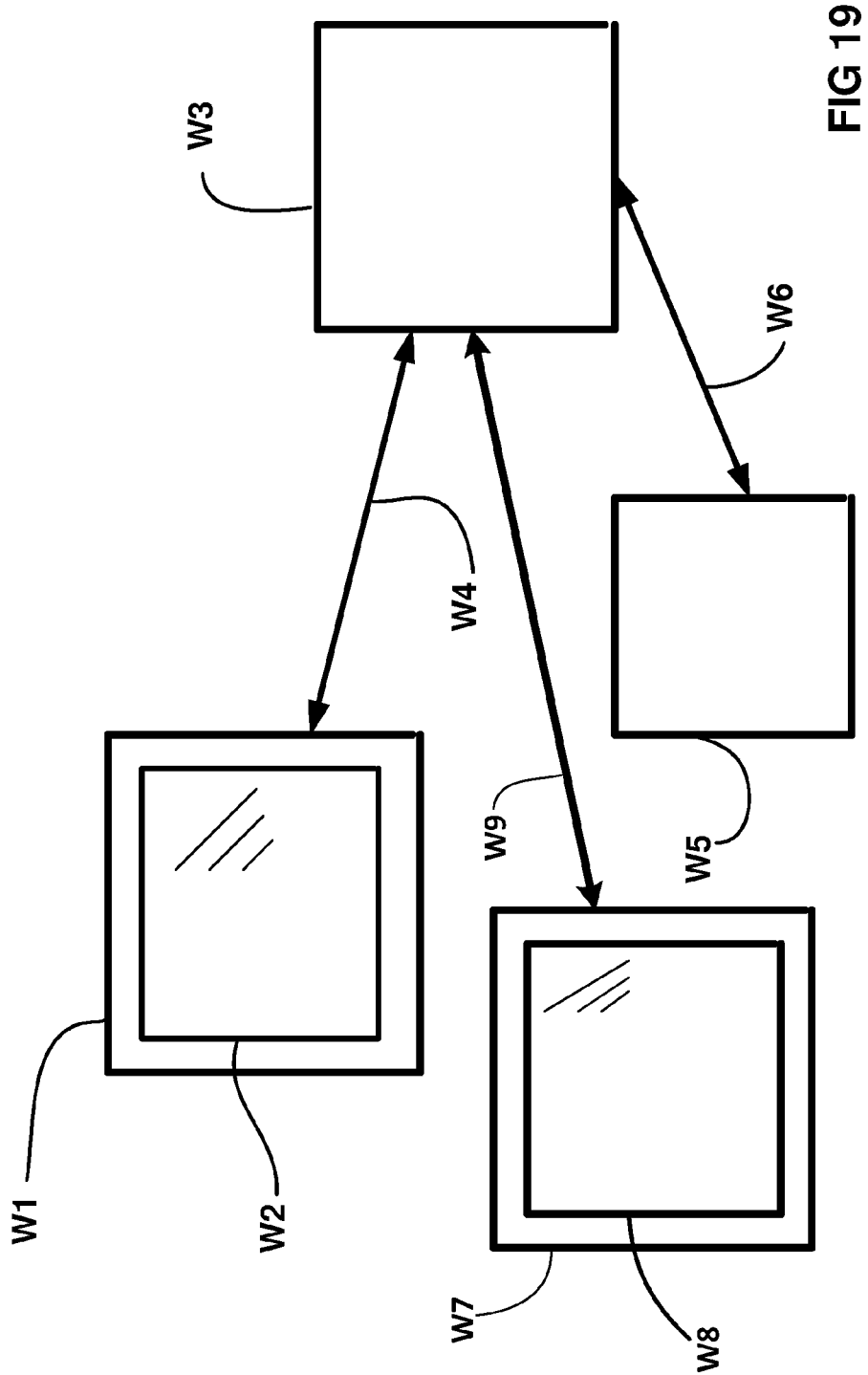

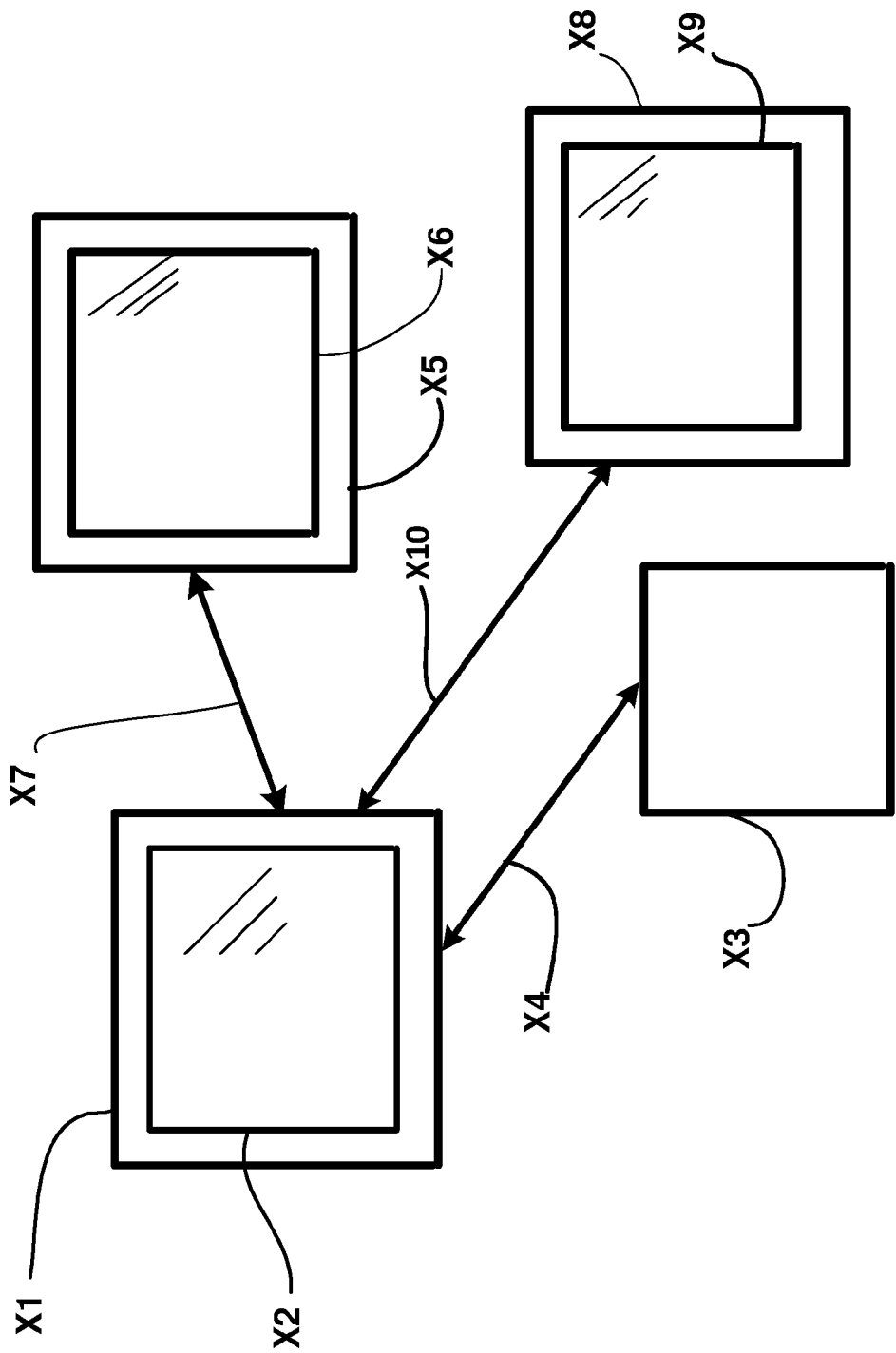

SPORTS ENTERTAINMENT TRACKING SYSTEM FOR MOBILE SPORTS SPECTATORS

BACKGROUND OF THE INVENTION

1. Field of the Invention

The present invention relates generally to the field of sports entertainment, and in particular to electronic aides that help sport's spectators follow the players and play objects on the play area.

2. Description of the Prior Art

There are many generic surveillance sources, i.e. resources that use prior art technologies for capturing the real time geographic coordinates of players and play objects on the play area during sports games. Generally little has been done to utilize the geographic position coordinates which are the product of these technologies to help sports spectators follow players and play objects on the play area during sports games.

Examples of the many prior art technologies are: U.S. Pat. No. 9,002,485 (Wohl), U.S. Pat. No. 8,894,514 (Jennings), U.S. Pat. No. 8,562,356 (Forest), U.S. Pat. No. 8,482,612 (Tamir), U.S. Pat. No. 8,432,489 (Arseneau), U.S. Pat. No. 8,303,311 (Forest), U.S. Pat. No. 8,130,096 (Monte), U.S. Pat. No. 8,036,826 (MacIntosh), U.S. Pat. No. 7,855,638 (Huston), U.S. Pat. No. 7,821,406 (Wangrud), U.S. Pat. No. 7,715,982 (Grenfell), U.S. Pat. No. 7,589,638 (Jackson), U.S. Pat. No. 7,162,392 (Vock), and U.S. patent application Ser. No. 15/015,486 (Osman), Ser. No. 15/089,539 (Davis), Ser. No. 14/504,634 (Stout), Ser. No. 14,204,414 (Wohl), Ser. No. 14/071,544 (Thurman), Ser. No. 14/364,975 (Wohl), Ser. No. 13/942,572 (Wohl), Ser. No. 13/942,568 (Wohl), Ser. No. 13/437,055 (Lopez), Ser. No. 13/335,313 (DAVIS), Ser. No. 13/182,117 (Arseneau), Ser. No. 13/083,173 (Geisner), Ser. No. 12/276,162 (Clark), Ser. No. 11/032,361 (Tamir).

Multitudes of spectators watching sports games frequently find it difficult to follow the many simultaneous movements of the players and the play objects that occur together on playing fields, courts and rinks during a game. This difficulty often results in confusion and failure by the spectators to understand what is happening in the game. The confusion typically comes about because of the speed of these movements and the complexity of the plays. Even sportscasters and coaches often have these same problems. In addition, television audiences are often handicapped by the TV cameras not being at the right place at the right time.

Therefore, it would be useful to provide an aide to spectators to enable them to better follow the movements of the players and the play objects that occur during a game as well as game nuances. In addition, this same aide would be useful to better enable television sportscasters to explain the game's action to their television audiences in real time as the plays occur. Furthermore, this same aide would be useful to better enable coaches to instruct and train their players regarding ways to overcome the strategies used by their competitors.

BRIEF DESCRIPTION OF THE SEVERAL VIEWS OF THE DRAWINGS

In order to more fully understand the objects of the invention, the following detailed description of the illustrative embodiments should be read in conjunction with the appended figure drawings, wherein:

FIG. 19 shows a block diagram for a real-time animated sports entertainment system where two or more spectators use their personal smart mobile devices together with a downloaded generic data source of geographic coordinates for both the players and the play object in conjunction with a smart database to display tracks on an animated play area background.

FIG. 20 shows a block diagram for a real-time animated sports entertainment system where spectators use their personal smart mobile devices networked together with a generic data source of geographic coordinates for both the players and the play object to display tracks on an animated backdrop of the play area.

SPECIFICATION

Figure 1:
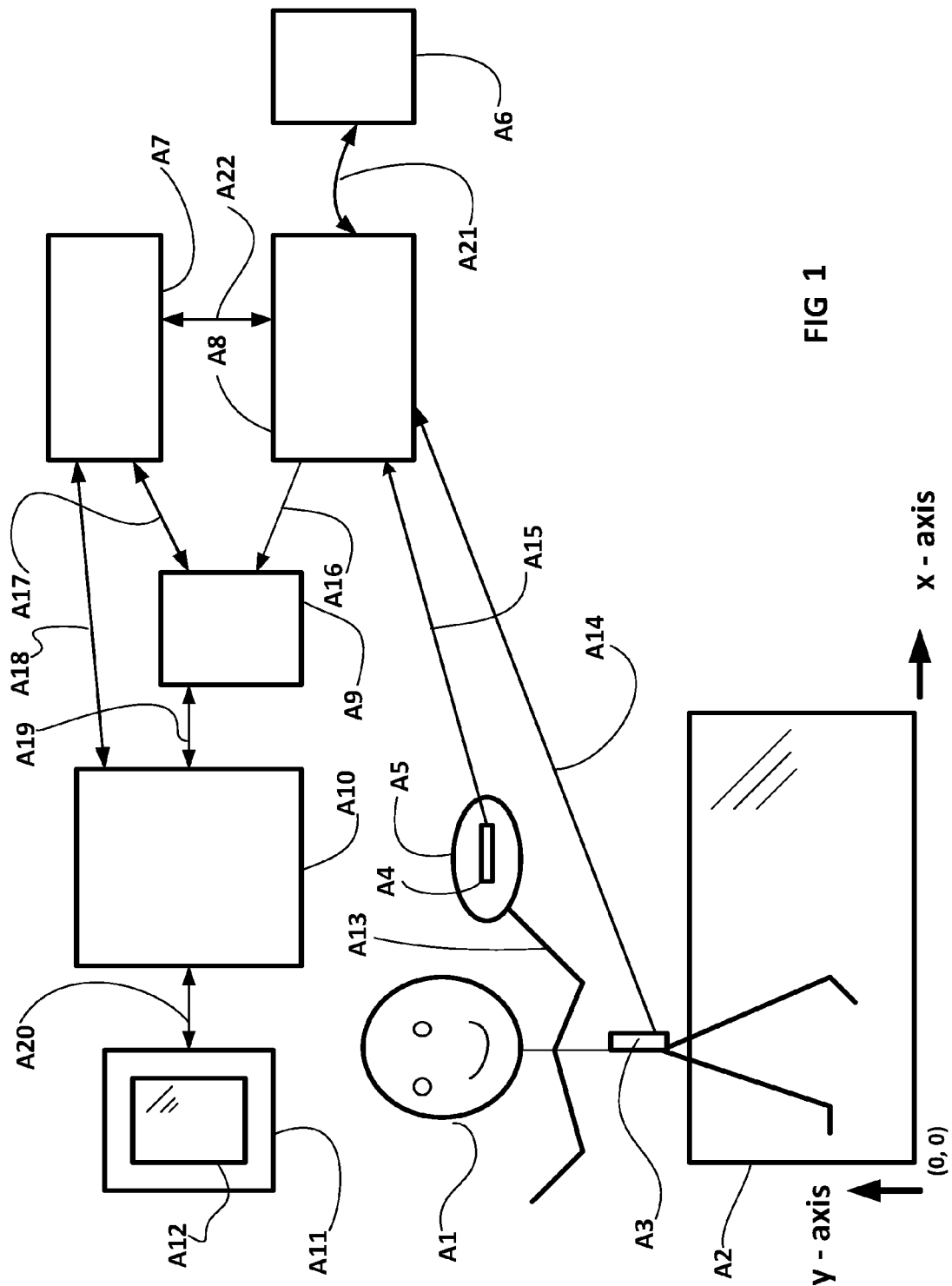
FIG. 1 shows a block diagram for a real-time animated sports entertainment system using GPS sources of geographic coordinate data.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF SUMMARY OF THE INVENTION

The invention is an entertainment system (i.e. an electronic aide) to help multitudes of sport's spectators to follow the simultaneous movements of players and the play objects on the play area in real time during sporting events as well as help the spectator with various game nuances. Real time continuous data streams of geographic coordinates of the players and their play objects on a play area are derived during a game using GPS and other generic sources of players and play object's position coordinates. Using this data, the present invention simultaneously calculates and displays the animated tracks of the players and play objects as they move against an animated backdrop representing the boundaries and artifacts of the play area. The animated tracks are typically displayed to the spectator on the spectator's personal mobile smart devices (includes smart devices and mobile devices) under the control of a mobile App. The display format is likened in many respects to that of an animated playbook. The system automatically derives the game's scoring and fouling from the real time data stream of geographic coordinates of the players and play objects on the play area. Besides providing an aide to multitudes of spectators, the present invention provides an information assist to television sportscasters and coaches. Therefore, it is an objective of the present invention to configure a system to aide multitudes of spectators to track the geographic movements of the players and their play objects in the play area.

DETAILED DESCRIPTION OF THE INVENTION

Throughout this description, the preferred embodiments and examples shown should be considered as examples, rather than limitations, of the present invention.

The following are some of the preferred embodiments and contemplations disclosed in the present invention for the major system components of the "Player and Play Object Tracking Display System for Sports Spectators" discussed in the detailed descriptions of the drawings.

Disclaimers:

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

General

Sport's games are normally comprised of players and play objects. It is therefore an objective of the present invention to configure a spectator's aide to follow each of the player's geographic movements, and the play object's geographic movements, on the play area.

In the present invention the spectators follow each of the players and the play object on the play area by following their geographic movements on a screen by showing their virtual tracks. In order for players and play object tracks to be displayed, it would therefore be useful for the aide to be in the form of a device configured with a CPU, on-board memory capability and a display screen on which the spectators could simultaneously observe the tracks created by each player's geographic movements in the playing area together with the geographic movements of the play object.

It is therefore an objective of the present invention to configure a spectator's aide to display the player's and play object's tracks on a screen.

Spectators at sporting events typically carry a personal smart mobile device (includes smart devices and mobile devices). Smart mobile devices possess memory capability enabling them to store the historical geographic location coordinate points of both the players and the play objects in the play area. Smart mobile devices also possess on-board CPU and CPU memory capability enabling spectators to make logical choices regarding the display of the player and play object tracks. Since many spectators who attend the games own personal smart mobile devices like smart phones, etc. and since smart phones have a screen, it would be useful for the aide to be a smart phone or other mobile device or smart device with which to track the players and play objects.

It is therefore an objective of the present invention to use the spectator's personal smart devices as aides. It is therefore an objective of the present invention to use the spectator's smart mobile devices as spectator's aides to track each player's geographic movements in the playing area together with the geographic movements of the play object. It is therefore an objective of the present invention to use configure smart mobile devices with Apps to receive the geographic location coordinates of the players and the play object from a wireless source and/or from a hard wired source. It is therefore an objective of the present invention to use and configure smart mobile devices with Apps to program the CPU to receive, store and display the geographic location coordinates of the players and the play object on the smart mobile device screen.

In order for the aide to help the spectators track the present and past geographic locations of the players and the play object on the play area as the game progresses, it would be useful for the aide to display the past and present geographic locations of the players and the play object in the play area. Smart mobile devices possess on-board memory capability enabling them to store the historical geographic location coordinate points of both the players and the play objects in the play area. Smart mobile devices possess on-board memory to program instructions into the smart mobile device, and a CPU to execute the instructions.

It is therefore an objective of the present invention to configure the smart mobile devices to be downloaded with an App. It is an objective of the present invention to configure the smart mobile devices to display the past and present tracks of the geographic location coordinates of the players and the play object on the play area on the screen. It is an objective of the present invention to configure the smart mobile devices to store the past and present geographic location coordinates of the players and the play object on the play area.

Many existing smart mobile devices possess the capability to be downloaded with an App.

It would be useful to configure such an App to enable the smart mobile device to collect and store the continuous data stream of geographic location coordinate points of the players and the play object flowing from an Internet Service Provider. In order for the spectators to gain perspective about the positions of the players and the play object on the play area during a game, it would useful for the spectators to be able to see the tracks of both the players and the play object simultaneously displayed together on a common screen.

It is therefore an objective of the present invention to configure the personal smart mobile devices to display the tracks of both the players and the play object simultaneously together on a common screen.

It would be useful for the spectators to see the historical tracks and the present tracks of both the players and the play object as they are created. It would be useful for the spectators to be able to freeze the action at any particular time they choose. It is therefore an objective of the present invention to configure the smart mobile devices to enable the spectators to retrieve and display the historical tracks and the present tracks of both the players and the play object as they are created. It is therefore an objective of the present invention to configure the smart mobile devices to enable the spectators to freeze the display of the tracks of both the players and the play object simultaneously together on a common screen at any particular time they choose.

It would be useful for the spectators to be able to control the rendering (i.e. plotting and drawing) of tracks on the screen in slow motion so as to be able to see and understand the details of each play.

It is an objective of the present invention to configure the smart mobile devices to enable the spectators to see the display of the tracks of both the players and the play object simultaneously together on a common screen at any particular time they choose in slow motion.

In order for the spectators to zoom in on particular time intervals during a game, it would be useful to the spectators for the aide to be able to allow spectators to select and choose the time interval over which the player's and play object tracks are drawn and displayed. It is an objective of the present invention to configure the smart mobile devices to enable the spectators to choose the time interval over which the player's and play object tracks are drawn and displayed. It is an objective of the present invention to configure the smart mobile devices to enable the spectators to zoom in on particular chosen time intervals during a game. It is an objective of the present invention to configure the smart mobile devices to enable the spectators to zoom in on the track of any chosen player at any time during the game. It is an objective of the present invention to configure the smart mobile devices to enable the spectators to zoom in on the track of the play object at any time during the game.

In order for the display to be practical for spectators to use in the stands of spots stadiums and arenas, it would be useful for the aide to offer a current real-time play by play visualizations of the game to the spectators. It is an objective of the present invention to configure the smart mobile devices to display current real-time tracks made by the players and the play object.

In order to avoid spectator confusion, it would be useful for the aide to distinguish one player from the next. Therefore it would be useful for the spectators to be able to clearly identify each player individually as well as the team that they play on; and it would also be useful for the spectators to be able to clearly distinguish the track of the play object from the tracks of each of the players.

It is therefore an objective of the present invention to configure the personal smart mobile devices to clearly distinguish the track of the play object from the tracks of each of the players.

In order to avoid spectator confusion, it would be useful to help the spectators to see tracks that were smooth and unambiguous rather than have empty spaces between dots. It is desirable to show a continuous track by filling the space between the coordinate points with straight line segments.

It is therefore an objective of the present invention to configure the smart mobile devices to produce smooth and unambiguous tracks.

In order to produce smooth tracks, it would be useful to join the dots (i.e. the coordinate points) with straight lines. It is therefore an objective of the present invention to connect the coordinate points that are displayed on the screen of the aide with straight line segments.

In order for the tracks displayed for each of the players and for the play object to grow over time on the screen, the data used to create the tracks must be continually updated during any chosen interval of time. Therefore the aide requires a constant stream of updated geographic coordinates for each of the players and for the play object. Therefore it would be useful for the aide to be able to wirelessly acquire a stream of continuous new coordinates of each player's geographic locations on the play area as he moves in the playing area, together with the geographic locations of the play object as it moves in the playing area. In addition, it would be useful for the aide to acquire these updated coordinates wirelessly from external sources. It is therefore an objective of the present invention to configure the smart mobile devices to wirelessly receive a continuous single stream of updated geographic coordinates for each of the players and for the play object from external sources.

Similarly, it would be useful to have a continuous source of the player's geographic coordinates; and a continuous source of the player's coordinates with which to build the single continuous data stream. In order for the aide to receive a single continuous stream of geographic coordinate date from each and all the players and the play object in the play area, it would be useful for there to be a means to collect the geographic coordinate data from each and all the players and the play object, and merge the coordinate data into a single continuous data stream for transmission to the spectators aide. It is therefore an objective of the present invention to configure a means to collect updated geographic coordinates from each of the players and from the play object; and transmit a continuous single stream of updated geographic coordinates comprising the coordinates for each and every one of all the players and the play object. It is therefore an objective of the present invention to configure the aide to enable the spectators to refresh the display at any time.

In the extreme case, tracks might be created and displayed to spectators for as long as the entire game. Therefore it would be useful for the aide to be able to record and store in memory the historical geographic coordinate points for each player and for the play object as they move in the play area for the length of a game. It is therefore an objective of the present invention for the aide to record and store in memory the historical geographic coordinate points for each player and for the play object as they move in the play area for the length of a game.

Some sports have fast moving players, like ice hockey and football for example. Some sports have fast moving play objects also. Therefore the geographic distances covered by the players and the play object per unit time will be larger. Consequently the separation between these points on the screen will be larger. Since the screen display of a track is made up of a sequence of retained consecutive contiguous geographic location point coordinates, in order to display the tracks of these fast items as time progresses as a continuous path, a greater number of coordinate points is required per unit of time. This requires that more coordinate points per unit time be transmitted to the aide from the external sources. Therefore it would be useful if the geographic coordinates were furnished to the aide by external sources at higher frequency data rates (therefore higher resolution) in order for the separation between the points displayed on the screen to be closer to one another. It is therefore an objective of the present invention to furnish the aide with the geographic coordinates at higher frequency data rates.

In sports where there are multiple players, in order to avoid spectator confusion between a possible large number of tracks and increased track density, it would be useful for the spectators to be able to zoom in on a chosen player's tracks and/or the track of the play object on the screen. It is therefore an objective of the present invention to be configured to zoom in on chosen player's tracks and/or the track of the play object on the screen.

In order to give the spectators a sense of perspective as to the geographic location in the play area of the action taking place during a play, it would be useful to present the tracks of the players and the track of the play object against a recognizable background rendering showing the boundaries of the play area. In order to give the spectators a further sense of perspective and to acclimate the spectators as to the geographic location of the players and the play object in the play area, it would be useful to present the tracks of the players and the track of the play object against a recognizable background rendering of the artifacts and guidelines of the play area. It would be useful if the spectator's devices already existed and were available and could be programmed with an App to achieve the features discussed previously with the aide. This would lower the cost to the spectator. We would still need a source of coordinate data for the play area boundaries. We would still need a source of data for the play area artifacts. It is therefore an objective of the present invention to provide a source of coordinate data for the play area boundaries. It is therefore an objective of the present invention to provide a source of data for the play area artifacts. It is an objective of the present invention to configure the system with a data base containing each of the play areas at each of the sports venues, wherein the system data base will contain the boundary coordinates of the play areas, the boundary coordinates of the scoring zones, the boundary coordinates of the foul zones, and the data to render the artifacts for each of the play areas. It is an objective of the present invention to configure the App to enable the spectator to identify the sports venue hosting the sporting event hosting the game to the data base in order to retrieve and download the boundary coordinates of the play area, the boundary coordinates of the scoring zones, the boundary coordinates of the foul zones, and the data to render the animation for the artifacts for the play area. It is an objective of the present invention to configure the App to enable the personal smart mobile device to automatically poll the sports venue that the spectator is presently attending so as to enable the spectator's personal smart mobile device to automatically retrieve and download the boundary coordinates of the venue's play area, the boundary coordinates of the scoring zones, the boundary coordinates of the foul zones, and the data to render the animation for the artifacts for the play area from the system data base. It is an objective of the present invention to firmly dispose GPS locators on the boundaries of the play area. It is an objective of the present invention for the GPS locators disposed on the boundaries of the play area to transmit the geographic coordinates of the boundaries of the play area to the WASP (wireless application service provider).

In order to permit the spectators to view the play area boundaries and the play area artifacts from different vantage points, it would be useful to enable the spectators to be able to rotate the display animation on the screen in ninety degree increments. It would also be useful for the spectators to be able to brighten certain aspects of the display in order to accentuate and better track each play. It is an objective of the present invention to enable the spectators to rotate the display in ninety degree increments. It is an objective of the present invention to display the tracks on a background showing artifacts and guidelines and the boundaries of the play area. It is an objective of the present invention to enable the spectators to vary the brightness of certain aspects of the display.

In order to meet the coordinate data requirements described above, it would be useful to establish a source of a stream of permanent and reliable coordinate data. It is an objective of the present invention for each player and play object to carry a GPS locator to meet the size, weight and power consumption.

In order to form a smooth track rendering and to avoid jitter, it would be useful for each contiguous point to be joined together with a line. It is an objective of the present invention for each contiguous displayed point to be joined together with a line. It is an objective of the present invention to configure the aide to scale and convert the geographic coordinates of each of the players on the play area to fit on the display screen.

It is an objective of the present invention to configure the personal smart mobile devices to be downloaded with an App. It is an objective of the present invention to configure the smart mobile devices to display the past and present tracks of the geographic location coordinates of the players and the play object in the play area on the screen. It is an objective of the present invention to configure the smart mobile devices to store the past and present geographic location coordinates of the players and the play object in the play area. It is an objective of the present invention to configure the smart mobile devices to display the tracks of both the players and the play object simultaneously together on a common screen.

It would be useful for the spectators to see the historical tracks and the present tracks of both the players and the play object as they are created. It would be useful for the spectators to be able to freeze the action at any particular time they choose. It is an objective of the present invention to configure the smart mobile devices to enable the spectators to freeze the display of the tracks of both the players and the play object simultaneously together on a common screen at any particular time they choose.

It would be useful for the spectators to be able to control the plotting of historical tracks on the screen in slow motion so as to be able to see and understand the details of each play. It is an objective of the present invention to configure the smart mobile devices to enable the spectators to see the display of the tracks of both the players and the play object simultaneously together on a common screen at any particular time they choose in slow motion.

In order for the spectators to zoom in on particular time intervals during a game, it would be useful to the spectators for the aide to be able to allow spectators to select and choose the time interval over which the player's and play object tracks are drawn and displayed. It is an objective of the present invention to configure the smart mobile devices to enable the spectators to choose the time interval over which the player's and play object tracks are drawn and displayed. It is an objective of the present invention to configure the smart mobile devices to enable the spectators to zoom in on particular chosen time intervals during a game. It is an objective of the present invention to configure the smart mobile devices to enable the spectators to zoom in on the track of any chosen player at any time during the game. It is an objective of the present invention to configure the smart mobile devices to enable the spectators to zoom in on the track of the play object at any time during the game.

Sometimes it is useful to zoom in on a particular spot on the play area with the expectation that an important event will happen there. It is an objective of the present invention to configure the smart mobile devices to enable the spectators to zoom in on a particular spot of the play area during the game.

In order for the display to be practical for spectators to use in the stands of spots stadiums, it would be useful for the aide to offer current real-time play by play visualizations of the game to the spectators. It is an objective of the present invention to configure the smart mobile devices to display current real-time tracks made by the players and the play object.

In order to avoid spectator confusion, it would be useful for the aide to distinguish one player from the next. Therefore it would be useful for the spectators to be able to clearly identify each player individually as well as the team that they play on; and it would also be useful for the spectators to be able to clearly distinguish the track of the play object from the tracks of each of the players. It is an objective of the present invention to configure the spectator's smart mobile devices to clearly distinguish the track of the play object from the tracks of each of the players; and to distinguish each player's track from one another.

In order to avoid spectator confusion, it would be useful to help the spectators to see smooth and unambiguous tracks rather than have empty spaces between dots. It is desirable to show a continuous track by filling the space between the coordinate points with straight line segments. It is an objective of the present invention to configure the smart mobile devices to produce smooth and unambiguous tracks. It is an objective of the present invention to configure the smart mobile devices to fill in the spaces between the position coordinates of the track with straight line segments; i.e. in order to produce smooth tracks, it would be useful to join or connect the dots (i.e. the coordinate points) with straight lines. It is an objective of the present invention to connect the coordinate points that are displayed on the screen of the aide with straight line segments.

In order for the tracks displayed for each of the players and for the play object to grow over time on the screen, the data used to create the tracks must be continually updated during any chosen interval of time. Therefore the aide requires a constant stream of updated geographic coordinates for each of the players and for the play object. Therefore it would be useful for the aide to be able to wirelessly acquire a stream of continuous new position coordinates of each player's geographic locations on the play area as he moves in the play area, together with the geographic coordinates of the play object as it moves in the play area. In addition, it would be useful for the aide to acquire these updated coordinates wirelessly from external sources to enable the players and play object's to move unencumbered. It is an objective of the present invention to configure the smart mobile devices to wirelessly receive a continuous single stream of updated geographic coordinates from each of the players and from the play object.

Similarly, it would be useful to have a continuous source of the player's geographic coordinates; and a continuous source of the player's coordinates with which to build the single continuous data stream. In order for the aide to receive a single continuous stream of geographic coordinate data from each and all the players and the play object in the play area, it would be useful for there to be a means stationed between the spectators and the players/play object to collect the geographic coordinate data from each and all the players and the play object, and merge and build the position coordinate data into a single continuous data stream for transmission to the spectators aide. Similarly, it would be useful to build a historic data base of position coordinates from which to draw data for the players and for the play objects. It is an objective of the present invention to configure a data base means to collect and record updated geographic coordinates from each of the players and from the play object; and transmit a continuous single stream of updated geographic coordinates comprising the coordinates for each and every one of all the players and the play object. It is an objective of the present invention to configure the aide to enable the spectators to refresh the display at any time.

In order to facilitate the building of a data base for the players position coordinates and for the play object' position coordinates during a game, it would be useful to earmark the incoming real time position coordinates for the players with identifies. It would be useful to earmark the play objects with identifiers. It would also be useful to identify the play area, sport's venue, date of the game and the time of each position coordinate to the data base. Therefore it is an objective of the present invention to encode the wireless data packets with the position coordinates with the player's jersey number encoded into the wireless signal, with the serial number of the play object's encoded into the wireless signal, with the name of the sports venue encoded into the wireless signal, with the time of the position coordinate encoded into the wireless signal, with the date of the position coordinate encoded into the wireless signal, and with an identifier for the play area encoded into the wireless signal.

In the extreme case, tracks might be created and displayed to spectators for as long as the entire game. Therefore it would be useful for the aide to be able to record and store in memory the historical geographic coordinate points for each player and for the play object as they move in the play area for the length of a game. It is an objective of the present invention for the aide to record and store in memory the historical geographic coordinate points for each player and for the play object as they move in the play area for the length of a game.

Some sports have fast moving players. Some sports have fast moving play objects. Therefore the geographic distances covered by the players and the play object per unit time will be larger. Consequently the separation between these points on the screen will be larger. Since the screen display of a track is made up of a sequence of retained consecutive contiguous geographic location point coordinates, in order to display the tracks of these fast items as time progresses as a continuous path, a greater number of coordinate points is required per unit of time. This requires more coordinate points per unit time be transmitted to the aide from the external sources. Therefore it would be useful if the geographic coordinates were furnished to the aide by external sources at higher frequency data rates (therefore higher resolution) in order for the separation between the points displayed on the screen to be closer to one another. It is an objective of the present invention to furnish the aide the geographic coordinates at controllable higher frequency data rates.

In sports where there are multiple players, in order to avoid spectator confusion between a possible large number of tracks and increased track density, it would be useful for the spectators to be able to zoom in on a chosen player's tracks and/or the track of the play object on the screen. It is an objective of the present invention to be configured to zoom in on a spectator's chosen player's tracks and/or the track of the play object on the screen.

In order to give the spectators a sense of perspective as to the geographic location in the play area of the action taking place during a play, it would be useful to present the tracks of the players and the track of the play object included against a recognizable background showing the boundaries and artifacts of the play area. It is an objective of the present invention to be configured to show the track against a backdrop of play area boundaries and recognizable artifacts.

In order to give the spectators a further sense of perspective and to acclimate the spectators as to the geographic location of the players and the play object in the play area, it would be useful to present the tracks of the players and the track of the play object against a recognizable background of artifacts and guidelines of the play area. It would be useful if the spectator's devices already existed and were available and could be programmed with an App to achieve the features discussed previously with the aide. It would be useful if we had a source of coordinate data for the play area boundaries and a source of data for the play area artifacts. Therefore it is an objective of the present invention to provide a source of coordinate data for the play area boundaries including scoring and fouling zones. It is an objective of the present invention to provide a source of data for the play area artifacts.

It would be useful if the spectator's devices had access to a data base containing a library of each of the sports venue's play areas with their boundaries and artifacts. It would be useful if the spectator's devices had access to the data base containing a library of each of the sports venues play areas with their boundaries and artifacts by being downloaded or from an App. It is an objective of the present invention to provide a library of each of the play areas with their boundary coordinates including fouling boundaries and scoring boundaries to the spectator's aides. It is an objective of the present invention to configure spectator's aides to the wirelessly and by hard wiring provide acquire the data from this library. It is an objective of the present invention to firmly dispose GPS locators i.e. (position encoders) on the boundaries of the play area. It is an objective of the present invention for the GPS locators i.e. (position encoders) positioned on the boundaries of the play area to transmit the geographic coordinates of the boundaries of the play area to the WASP. It is an objective of the present invention for the WASP to be configured to receive the geographic coordinates of the boundaries of the play area.

In order to permit the spectators to line up and view the play area boundaries and its artifacts on the device screen from different vantage points in the stands, it would be useful to enable the spectators to rotate the display on the screen in ninety degree increments. It would also be useful for the spectators to be able to brighten any chosen length of the displayed tracks in order to accentuate that part of the track to better track the players and play objects during certain critical plays. It would also be useful for the spectators to be able to change the spot size diameter of the points which make up the track in order to be better able to see tracks with higher resolution when zoomed-in upon. It would also be useful for the spectators to be able to change the width of the lines that connect the coordinate points on the screen so as to attain higher track resolution when needed. It is an objective of the present invention to enable the spectators to rotate the display in ninety degree increments by making choices from a pull down menu. It is an objective of the present invention to display the tracks on a background showing the artifacts and boundaries of the play area by making choices from a pull down menu. It is an objective of the present invention to enable the spectators to vary the brightness of any chosen length of track by making choices from a pull down menu. It is an objective of the present invention to enable the spectators to vary the spot size of each of the individual coordinate points that makes up the track. It is an objective of the present invention to enable the spectators to vary the width of any chosen lines connecting the individual coordinate points.

The scoring lines on a play area are sometimes changed. It would be useful to have a method to deal with this eventuality. It is an objective of the present invention to provide current updated position coordinates to the system for the scoring lines and the fouling lines.

In order to meet the coordinate data requirements described above, it would be useful to establish a source of permanent and reliable track position coordinate data for the players and for the play objects. In order to meet the needed quantity and quality of the geographic coordinate data described above, it would be useful for the source to use GPS technology, wherein each player would carry a GPS locator i.e. (position encoders); and wherein the play object would carry a GPS locator i.e. (position encoders). In order to meet size, weight and power consumption requirements, it would be useful to choose a GPS locator i.e. (position encoders) as a preferred method to stream the geographic location coordinate data of each the players and the play object. It is an objective of the present invention for each player and play object to carry a GPS locator i.e. (position encoders) for streaming their geographic coordinate data points.

In order to form a smooth track to avoid jittery tracks on the device screen, it would be useful for each contiguous coordinate point to be joined together with a line. It is an objective of the present invention for each contiguous displayed point to be joined together with a line whose length and slope is calculated by the system. It is an objective of the present invention to configure the aide to scale and convert the geographic coordinates of each of the players on the play area to fit on the display screen.

In order to save computing power and memory space in the aide, it would be useful for the WASP to do the position coordinate scaling calculations. In an alternate preferred embodiment, it is an objective of the present invention to configure the WASP to scale and convert the tracks of each of the players and the play object to fit on the device display screen.

There are many coordinate systems that can be used to represent the locations of the players and the play objects. The Cartesian coordinate system is an example. The geographic coordinate system is another example. These are only two of the many coordinate systems that can be used to describe the location of the players and play objects during a game on the play area. A generalized coordinate system is used to cover all possible coordinate systems. Therefore, it is an objective of the present invention for a generalized coordinate system to be used to cover all the possible coordinate systems.

FIG. 1

FIG. 1 shows a block diagram for a real-time animated sports entertainment system using GPS sources of geographic coordinate data.

The detailed physical elements disclosed in the drawing shown in FIG. 1 are identified as follows: A1 is a typical game player standing within the boundaries of the game playing area A2. A2 are the animated boundaries and artifacts of the game playing area i.e. play area. A3 is a GPS-locator (position encoder) carried by the player A1. Each player caries a position encoder.

In a preferred embodiment, a player's GPS position encoder turns itself on when the player is within the boundaries of the play area; and turns itself off when the player is outside the boundaries of the play area. The system essentially keeps track of the players in the game, and those that are out of the game. This feature is necessary so as not to track players on the sidelines. A4 is a GPS-locator (position encoder) mounted inside the typical play object A5.

In a preferred embodiment, a play object's GPS position encoder turns itself on when the play object is within the boundaries of the play area; and turns itself off when the play object is outside the boundaries of the play area. The system essentially keeps track of the play objects in the game, and those that are out of the game. This feature is necessary so as not to track play objects on the sidelines.

A5 is a typical play object in contact with player A1 in the game playing area A2. A6 is a laptop administrative PC terminal operated by the venue's field service personnel which is the human interface to the WASP A8 to operate the system. A7 is the internet service provider to the sport's venue. The internet service provider carries the inbound and outbound internet traffic from/to the outside world. In one preferred embodiment, a mobile App is downloaded into A11 via A10 from A7. In another preferred embodiment, the mobile App is downloaded into A11 from A7 via A9 and A10. The ISP A7 hangs off of the LAN A10. The ISP also enables the smart mobile devices to be downloaded from the internet via A10. The mobile App is a sophisticated computer program that enables the spectator's smart mobile device to receive data enabling the spectator's smart mobile device to interact with and display on its screen an animation of tracks (i.e. connected colored dots, line-art and symbols) representing the players and play object's real time positions on an animated play area background, during a live game or a previously played game.

A8 is a wireless application service provider (WASP). A8 is comprised of radio frequency antennas. A8 receives wireless signals via its radio frequency antennas from all the player's position encoders and the play object's position encoder. A8 is comprised of at least one CPU that muxes (i.e. multiplexes) the position coordinate data from all the player's position encoders and the play object's position encoder into a single data stream of position coordinates. The CPU creates a master file comprised of all of the historical position coordinates of all the player's and play objects during a game. The single data stream of position coordinates is derived from this master file. The single data stream of position coordinates is fed into A9 from A8. A8 has software algorithms installed within it to process the incoming data streams (i.e. GPS data packets) to reduce the GPS position coordinates it receives from A3 and A4 to coordinates referenced to the play area on the display. The coordinates of the boundaries of the play area have been preprogrammed into A8. In another preferred embodiment, the sports venue play area boundary coordinates are furnished to A8 from A7 via A22 from a play area data base on the internet via A7. The play area data base contains all the GPS coordinates of all the current play area boundaries in all and every sport's venue. In yet another preferred embodiment, GPS position encoders are planted along each of the sports venue's play area boundaries. GPS position coordinate data from these position encoders is transmitted wirelessly or by cable to A8 where the data is processed.

A9 is a public web server for the sport's venue. A9 is a computer with memory. A9 takes the single data stream of position coordinates derived from the master file created by A8 and hands it off to the LAN A10 for dissemination to the spectators at the sport's venue i.e. the stadium; and also hands the file off to remote spectators by way of A7. In another preferred embodiment, the mobile App is downloaded from A9 into A11 via A10.

A10 is a local area network (LAN). A10 is a combined hard wired and wireless LAN. Hanging on the LAN are, for example, routers (i.e. used to assign IP addresses to the users), WIFI, Radio Frequency antennas that receive and transmit wireless signals to and from the spectators in the stands, hardwired PC's, receptacles in the stands where spectators can plug their devices into the LAN, etc.

A11 is a typical spectator's device (aide). A11 is the spectator's personal mobile smart device that has playbook application software (i.e. the mobile APP) downloaded into it. A12 is the display screen of A11. A13 is the arm of A1 in contact with or for example holding A5. A14 is the signal from A3 transmitted to a wireless application service provider (WASP) A8. The signal A14 is encoded with the position coordinates of the player A1. Each player caries a position encoder A3 that transmits its position coordinates to the WASP A8. A15 is the signal from position encoder A4 transmitted to a wireless application service provider (WASP) A8. The signal A15 is encoded with the position coordinates of the play object A5. Each play object caries a position encoder A4 that transmits its position coordinates to the WASP A8.

A16 is a unidirectional data communication link from A8 to A9 carrying a continuous single data stream of real-time position coordinates of the players and play object on the play area. A16 is a hard wired and/or a wireless link. Hard wiring is superior for reliability. A17 is a bi-directional data communication link between A7 and A9. A17 carries internet traffic from A7 to A9. A17 is comprised of internet traffic from and to the outside world. A17 is hard wired for performance and reliability.

A18 is a bi-directional data communication link between A7 and A10. A18 carries internet traffic from A7 to A10. A18 is comprised of internet traffic from and to the outside world. A18 is hard wired for performance and reliability. A19 is a bi-directional data communication link between A9 and A10. The bi-directional data communication link carries the single data stream of position coordinates derived from the master file created by A8. A19 is hard wired for performance and reliability.

A20 is a bi-directional data communication link between A10 and A11. A20 is typically a wireless data communication link for mobile spectators. A20 feeds the single data stream of position coordinates from A10 to A11. In yet another preferred embodiment, spectator's smart mobile devices A11 plug into a LAN receptacle in the stands of the sport's venue, A20 is hard wired for performance and reliability in this instance.

A21 is a bi-directional data communication link between A6 and A8. It carries administrative commands from A6 to A8, and human interface data from A8 for display on A6. For example, the battery life remaining on the GPS encoders. In general, A6 interrogates the GPS encoders A3 and A4 for their functional status. This is an important factor in servicing the field equipment. A21 is hard wired for performance and reliability.

A22 is a bi-directional data communication link between A7 and A8. It carries the play area boundary coordinates from A7 to A8. A22 is hard wired for performance and reliability.

Each of the position coordinates for the players A1 identifies the player with the player's jersey number encoded into its wireless signal. Each of the position coordinates for the play objects A5 identifies the play objects with the serial number of the play objects encoded into its wireless signal. In addition, an identifier for the play area A2 is encoded into the player's A14 and play object's A15 wireless signal. Furthermore, an identifier for the sport's venue (not shown), an identifier for the date (not shown), and an identifier for the time (not shown) is encoded into the player's and play object's wireless signal to the WASP A8.

Real-time GPS locators (position encoders) have become physically small, light weight, rugged and low power. These features make the GPS locators useful for locating sports players and play objects in play areas during sports games in sports venues. The GPS locators now join other generic technologies for geographically locating sports players and play objects in play areas.

Examples of sports venues are stadiums and arenas comprised of play areas like fields, courts, courses and rinks; wherein the play areas have physical geographic boundaries given by their geographic position coordinates. The play areas also have visible artifacts like for example lines, circles and numbers. The location of these artifacts can also be given by their geographic position coordinates. Examples of play objects are golf balls, ice hockey pucks, tennis balls, baseballs, soft balls, volleyballs, soccer balls, footballs and basketballs.

In a preferred embodiment it is contemplated that each player and play object in a game is equipped with a real-time GPS locator that contains its own unique electronic identifier. The GPS locator is continuously networked to a wireless application service provider within the given sports venue during a sporting event. Each player carries a GPS locator. Each play object is embedded with a GPS locator.

This wireless application service provider consists of a wireless communication system infrastructure comprised of an array of RF radio frequency antennas, network repeaters, routers, transceivers, and associated network cabling, etc. installed within the sports venue that provides a means of intercepting the data collected from each of the GPS locators anywhere within the play area, and a means of forwarding this data onto a public web server for access by the sports spectators via WIFI or Cellular phone service present at the sports venue via their personal wireless devices.

Remote access across the internet over greater distances is achieved utilizing a PC based software App similar to that in use by the spectators present at the sports venue who utilize their personal wireless devices such as smart phones while viewing the playbook application and associated screen menus. Broadcasting over interactive television mediums equipped with playbook software as appropriate can be realized as well.

In a preferred embodiment, the aforementioned service provider further contains mobile App software that constantly monitors the real-time GPS data from each of the GPS locators in use during a live sporting event. It further processes and multiplexes this data into a single encoded stream mux for easier dissemination to the sports venue, remote internet and television based spectator audiences.

Administrative data is added to the stream mux that allows a spectator to access the optional features pertaining to the points of interest within the game i.e. only show the ball's motion or position, only show the track of a specific player, delayed or instant replay, etc.

Recording and long-term storage of game events for delayed and/or instant replay is achieved in two ways: First, the stream mux data previously captured by the public webserver may be polled at a future time by a spectator as often as desired using the features of the App. Second, the stream mux data can be stored locally in real-time as the spectator observes the App's screen menu on their device during a live sporting event.

Except for certain administrative data functions that relate to upkeep and overall maintenance of the system accessible only to sports venue personnel, communication between the service provider and the public webserver is primarily unidirectional since only encoded GPS data packets representing each of the players locations and play object locations is actually required by the downstream playbook application to function.

Each data bases is primarily a lookup table that consists of the once real-time GPS coordinates that represent the unique player and/or play object's positions relative to the play area as observed throughout a game that were originally received by the service provider in the sports venue.

Through a maze of multiple menu driven commands, a spectator can select a set of features unique to the given library that might include special effects, analytical algorithms and stop action functions. Depending on the spectator's device screen size, a plurality of optical overlays can also be superimposed giving the viewer a better sense of what is being observed. The App can be easily disseminated for widespread public consumption and installed directly over the internet via smart phone app providers.

The invention is a system (i.e. an aide) to help sport's spectators follow the simultaneous movements of players and the play objects on the play area in real time during sporting events. The invention draws and displays in real time the animated virtual tracks of the movements of the players and the play object using their position coordinates, drawn on an animated background representing the boundaries and artifacts of the play area.

In a preferred embodiment, the system uses the GPS geographic coordinates of the players and their play objects on a play area, wherein the position coordinates are derived from GPS position encoders carried by the players and the play object.

The aide acquires real time geographic coordinate data for each of the sport's players and play objects as input data with which to draw the animated tracks for each of the sport's players and play objects. A WASP acquires the real time geographic coordinate data from each of the sport's players and play objects from GPS locators (encoders) carried by each of the players and the play objects to locate the position coordinates of their subjects. Each of the GPS locators communicates the instantaneous position coordinates of its subject to the WASP.

As future improved systems for geographically locating the positions of players and play objects in a play area are developed, it is contemplated that the present invention will use the real-time position coordinate data that is derived from them also.

In a preferred embodiment, the invention uses smart mobile devices as a display medium to draw and display the player's tracks and the tracks of the play object on their screens. The tracks displayed are animated on the screens of the smart mobile devices in the form of a playbook type presentation superimposed on an animated background of play area boundaries and artifacts.

In a preferred embodiment, the invention utilizes a real-time animated sports playbook screen display controlled by an App. The invention uses the App to program and control the smart mobile devices to display and draw the player's tracks and the tracks of the play object on the smart mobile device screens. The App is initially downloaded from a WASP into the smart mobile devices. Furthermore, the App programs and controls the smart mobile devices to acquire the geographic coordinate data of the players and the play object via the WASP in real time from the GPS locators carried by the players and the play objects. In addition, the App programs and controls the smart mobile devices to display the animated boundaries and background artifacts of the play area on their screens. The App also programs and controls the smart mobile devices to superimpose and align the players and the play object against a simulated play area backdrop consisting of the boundaries and background artifacts of the play area on their screens.

Each GPS locator wirelessly transmits its real time geographic coordinates to a WASP. The geographic coordinate data from each of the players and the play object is identified by a unique code. The code identifies the specific player and play object as the source of the position coordinate data. The position coordinate data received wirelessly by a WASP is collected and muxed into a single data stream. The geographic coordinates of all the players and the play object is collected from their GPS locators and made available to the spectator's smart mobile devices in the form of a single data stream. The geographic coordinates of all the players and the play object is used as input data to the smart mobile devices to create a display of the players and play object's movements as tracks. The invention uses the computing power and memory storage capability of the smart mobile devices combined with the App software to create the display.

It would be useful for the geographic GPS coordinates of the players and the play object to be referenced to the geographic GPS coordinates of the play area. The purpose for this is so the boundaries of the play area will establish the X-Y Cartesian coordinate axes, and the player coordinates will be points in the X-Y plane. For example, suppose the GPS coordinate for a corner of the play area (a court, a field, a rink) is (X0, Y0), and suppose the GPS coordinate for any arbitrary player is (X1, Y1). Therefore we transform the player's coordinate to a point in the X-Y plane referenced to the coordinate axes X and Y as follows:

$$x1 = X1 - X0$$

and $$y1 = Y1 - Y0$$

Therefore, the transformed coordinate for a player becomes (x1, y1).

In a preferred embodiment, the Cartesian coordinate for the corner of the screen becomes (0, 0), where the y-axis is the ordinate and the x-axis is the abscissa.

The geographic coordinates of the players and play objects are processed at 8 to create a display of their movements as tracks on a common screen A12; wherein the tracks are aligned against a simulated play area backdrop comprised of boundaries and artifacts. In a preferred embodiment, the present invention uses the coordinate data derived from prior art GPS position encoders carried by the players and the play object.

The system calculates when the action starts and stops. The spectator's devices continuously receive the real-time GPS location coordinate data from each of the players in the play area and the play object's real-time GPS location coordinate data. The position coordinates for the players and for the play objects do not change when there is no action. The system is configured to calculate the absence of these changes. The position coordinates of the players are invariant when the players are motionless. The position coordinates of the play objects are invariant when the players are motionless. The position coordinates are frozen.

The position coordinates for the players and for the play objects change when the action starts. The system is configured to calculate these changes. The play object in the play area carries a GPS locator i.e. position encoder inside it. The GPS locator i.e. position encoder outputs wireless signals encoding the geographic coordinates of the play object's location in the play area. The GPS locator i.e. position encoder outputs the wireless signals encoding the geographic coordinates of the play object's movements and subsequent location changes continuously. The encoded geographic coordinate data stream carries the serial number of the play object that carries the GPS locator i.e. position encoder. This serial number identifies the play object to the App contained in the mobile device receiving the encoded geographic coordinate data stream Each and every player in the play area carries a GPS locator i.e. position encoder. The GPS locator i.e. position encoder outputs wireless signals encoding the geographic coordinates of the player's location in the play area. The GPS locator i.e. position encoder outputs the wireless signals encoding the geographic coordinates of the player's locations continuously. The encoded geographic coordinate data stream carries the serial number of each of the player's that carries the GPS locator i.e. position encoder. This serial number identifies the player's to the App contained in the mobile device receiving the encoded geographic coordinate data stream. The spectators seated in a sports stadium can use the stadium's WIFI system to receive the player's real-time GPS geographic coordinate location data. The spectators seated in a sports stadium use the stadium's WIFI system to receive the real-time encoded GPS geographic coordinate location data from each of the players in the play area.

The spectators seated in a sports stadium use the stadium's WIFI to receive the real-time encoded GPS geographic coordinate location data from the play object in the play area.

Each of the players in the play area carries a GPS locator i.e. position encoder having a distinguishing electronic serial number to identify it to the system. This serial number is used by the app to separately process the location data received from each of the players in the play area and to distinguish each of the player's tracks from one another.

The play object in the play area carries a GPS locator i.e. position encoder having a distinguishing electronic serial number to identify it to the system. This serial number is used by the app to separately process the location data received from the play object in the play area and to distinguish the play object's track data from other play objects that are not in the playing area. The play object's track is created on the screen by instructions from the App to the aide's CPU for the spectators to see. The play object's track seen on the screen by the spectators has a beginning and an end. Most often the tracks resemble a curved freeform line. The freeform line traces the path that the play objects take during the time interval chosen by the spectator separating the beginning and the end of the track. The length of the freeform line becomes progressively longer on the screen as the play object moves from place to place in the play area. Some tracks are designated with distinguishing colors which are spectator selectable so the tracks may be told apart from any neighboring tracks to avoid confusion. The spectator can start the play object's track whenever the spectator wishes by selecting his choice from a pull down menu. The spectator can stop the play object's track whenever the spectator wishes by clicking "stop" in the margin of the screen.

Each player's track is created on the screen by the App for the spectators to see. Each player's track seen on the screen has a beginning and an end. Most often the tracks resemble a curved freeform line. Each freeform line traces the path that each of the players takes in the play area during the chosen time interval separating the beginning and the end of the track. Some tracks may be designated with distinguishing colors which are spectator selectable so that they may be told apart from other player's neighboring tracks to avoid confusion. The spectator can start the player's tracks whenever the spectator wishes by selecting "start" in the margin of the screen. The spectator can stop the player's tracks whenever the spectator wishes by selecting "stop" in the margin of the screen. The mobile device receives wireless signals and/or hard wired signals.

Some spectator's have a television device. The television device can receive both wireless and hard wired signals.

Some spectators have a computer device. The computer device can receive both wireless and hard wired signals.

The mobile device has a display screen. The television device has a display screen. The computer device has a display screen. The user views the progress of a sports game on the display screen.

Many sport's games are complex and involved. Many games involve fast action plays. Many games involve multiple players. Most games involve a play object. Some play objects move quickly in the play area and some move slowly during different time intervals of the game. Some players move more quickly in the play area and some move more slowly during different time intervals of the game. Typical play objects in such games are golf balls, ice hockey pucks, tennis balls, base balls, softballs, footballs, soccer balls, volleyballs and basketballs. Typical complex sports that have intervals of fast action plays are football, baseball, softball, tennis, ice hockey, volleyball, soccer and basketball.

Many of these fast action plays occur over short periods of time. Play objects typically move quickly from place to place in the play area. Players typically move quickly from place to place in the play area. Some plays are intricate and difficult for the spectators to see. Following the progression of events during a game is sometimes very challenging. The play object moves quickly from place to place in the play area and it is sometimes difficult for the spectators to determine its whereabouts. The players move quickly from place to place in the play area and it is sometimes difficult for the spectators to determine their whereabouts. To say the least, keeping track of the motions of the play object and the motions of the players during an action sequence is a challenge to many spectators and leads to increased excitement in the game. Spectators often wonder who (which player) did what, and who (which player) went where? Spectators often wonder where the play object is.

An important value of the present invention is that it sees through all the clutter and physical blocking and accurately follows the whereabouts of the play object and the players. This is especially true in the game like football. In order to help identify the players, the players typically wear a jersey. The jersey typically has an identifying color signifying the player's team. This helps the spectators to track a player's movements in the play area; particularly the players on the teams that they like.

Additionally, the players typically wear an identifying number on their jerseys. These numbers are typically made large enough so the spectators can tell who is who during a multi-player game. These identifying numbers are difficult for some spectators with poor vision to see at a distance and under varying weather conditions like rain and snow. Some spectators frequently use optical aides such as binoculars to overcome these difficulties.

A means would be useful to the spectators wherein the track of each player had an identifying symbol representing the number on the player's jersey. A means would be useful to the spectators wherein the track of the play object had an identifying symbol representing the play object to discern it from the player's tracks. A means would be useful to the users wherein each track of each player had an identifying graphical symbol showing the direction of motion of that player on his track. An example of such a symbol is an arrowhead pointing in the direction of motion of the player in the play area. A means would be useful to the users wherein the track of the play object had an identifying graphical symbol showing the direction of motion of the play object in the play area. An example of such a symbol is an arrowhead pointing in the direction of motion of the play object in the play area. A means would be useful to the users wherein the track of the play object and the tracks of each and all of the players were displayed together simultaneously. This is especially useful in displaying the interaction of the players with the play object. Track colors are useful in identifying and distinguishing the players on a team.

Spectators sometimes have problems locating the play object during a play. Being able to view the track of the play object amongst the player's tracks, moment to moment, would help spectators overcome this problem. It would also clarify to the spectators where the play object is at any one time. This would help the spectators understand which player is doing what with the play object. It would also help spectators understand how and why which players are interacting with one another.

A means would be useful to the users wherein the combined tracks of the play object and the players were displayed together simultaneously on the smart mobile device screen. A means would be useful to the users wherein the combined tracks of the play object and the players were displayed together simultaneously on the smart mobile device screen against a graphical background representing boundaries of the play area. The App is pre-loaded with the geographic coordinates of the boundaries of the play area.

When a play object leaves the play area for example, the App raises a flag. When a play object leaves the play area, for example, this feature would help resolve issues arising from foul balls.

A means would be useful to the users wherein the combined tracks of the play object and the players were displayed on the smart mobile device screen against a graphical background representing the boundaries of play area. A means would be useful to the users wherein the track of the play object had an identifying symbol representing the play object to discern it from the player's tracks.

In a game like football for example, the football is held, carried or passed. It is sometimes difficult for some of the spectators who do not have a good vantage point in the stadium stands to see who has the ball or where the ball is. Some spectators use binoculars to overcome these difficulties.

A means would be useful to the users for them to be able to keep track of each of the players on the play area as the sports game progresses. A means would be useful to the users for them to be able to keep track of the play object on the play area as the sports game progresses. A means would be useful to the users for them to simultaneously be able to see the player's name on the screen near to their identifying number. A means would be useful to the users for them to be able to keep track of each of the play object on the play area as the sports game progresses. Such a means would be especially useful to the users if it was lightweight, small and easy to use. Such a means would be especially useful to the users if it automatically tracked the progress of the game without the need for the users to use their hands (to keep their hands free to eat hot dogs and drink beer for example). Such a means would be especially useful to the users if each of the players left an identifying track on the display screen which the player created in real time as the player moved in the play area. Such a means would be additionally especially useful to the users if the play object simultaneously left an identifying track on the same display screen which the play object created in real time as the play object moved in the play area. Such a means would be especially useful to the users if each of the tracks of each of the players and could be zoomed-in on to reduce the clutter of overlapping and neighboring tracks Such a means would be especially useful to the users if the tracks of the play object could be zoomed-in on to reduce the clutter of overlapping and neighboring tracks.

A player's tracks are created by linking a series of each player's contiguous GPS location data point coordinates with lines where necessary to achieve a visually smooth track. Each player's track grows in length on the screen as the player moves in the playing area from place to place. The play object's track grows in length on the screen as the play object moves in the playing area from place to place. The play object's track is created by linking a series of the play object's contiguous GPS location data point coordinates with lines where necessary to achieve a visually smooth track where necessary. The spectators are frequently at the sport's venue viewing the sports game from the stands. Stadiums and arenas are typical sports venues for the sports gaming events. The play areas in these venues are typically playing fields, rinks, and courts The display screen gives the spectators a method by which they can keep track of the progress of a sports game more clearly than they could otherwise. The users look at their mobile device screen to track the motions of the players and the play object as each moves on the play area. The spectators use their mobile device to track the progress of the game. Many spectators view the game from home. They observe the game from a computer screen or television screen. The spectator's device screen displays the tracks of each of the players. The spectator's device screen displays the track of the play object.

The system shows the track of the play object as it develops over time as it moves. The system shows the track of each of the players as it develops over time as the players move.

Each player creates a track. Each track has a symbol identifying and representing the player. Each play object creates its own track. Each track has a symbol identifying and representing the play object. The length of the track created by each player grows as he moves. Each play object creates a track. The length of the track created by the play object grows as it moves. The system shows the track as it is developing in real-time wherein the track has a symbol identifying the player moving at the leading end of the track. The system shows the track as it is developing in real-time wherein the track has an symbol identifying the play object moving at the leading end of the track. The system shows the track of the player whether he be moving or motionless. The system shows the track of the play object whether it be moving or motionless. If the play object is motionless, its position coordinates remain unchanged. If a player is motionless, his position coordinates remain unchanged.

Real-time GPS locators have become physically small, light weight, rugged and low power. These features make the GPS locators useful for locating sports players and play objects in play areas during sports games in sports venues. The GPS locators now join other technologies for geographically locating sports players and play objects in play areas.

Each player and play object in a game is equipped with a Real-time GPS locator that contains its own unique electronic identifier, and is continuously networked to a common service provider within the given sports venue during a sporting event. Each player carries a GPS locator. Each play object is embedded with a GPS locator.

In a preferred embodiment, each player and play object within the boundaries of the play area is equipped with a real-time GPS locator that contains its own unique electronic identifier, and is continuously networked to a WASP within a given sports venue (i.e. a sports stadium, sports arena etc.) during a sporting event attended by sport's spectators.

Typically the service provider consists of a wireless communication system infrastructure comprised of an array of radio frequency antennas, network repeaters, routers, transceivers, and associated network cabling, etc. installed within the sports venue that provides a means of intercepting the player's and play object's geographic coordinate data collected from each of the GPS locators anywhere within the play area, and a means of forwarding this geographic coordinate data onto a public web server for access by the sports spectators via WIFI or Cellular phone service present at the sports venue via their personal wireless devices.

Spectators at the sports venue utilize an App downloaded into their personal wireless smart mobile devices i.e. smart phones for viewing playbook applications and associated screen menus. Spectators remote to the sports venue access the games across the internet over great distances configured with PC based software applications i.e. Apps similar to that used by the spectators at the sports venue. Broadcasting over interactive Television mediums equipped with Apps is realized as well.

The aforementioned service provider further contains App software that constantly monitors the real-time GPS data from each of the GPS locators in use during a live sporting event. It further processes and multiplexes this data into a single encoded stream mux for easier dissemination to the sports venue, remote internet and Television based spectator audiences.

Administrative data is added to the stream mux that allows a spectator to access the optional features pertaining to the points of interest within the game i.e. only show the ball's motion or position, only show the track of a specific player, delayed or Instant Replay, etc.

Recording and long-term storage of game events for delayed and/or instant replay is achieved in two ways: First, the stream mux data previously captured by the Public Webserver may be polled at a future time by a spectator as often as desired using the features of the App. Second, the stream MUX data can be stored locally in real-time as the spectator observes the App's screen menu on their device during a live sporting event.

Except for certain administrative data functions that relate to upkeep and overall maintenance of the system accessible only to sports venue personnel, communication between the service provider and the public webserver is primarily unidirectional since only encoded GPS data packets representing each of the players locations and play object locations is actually required by the downstream playbook application to function.

The aforementioned playbook software application or App is a sophisticated computer program that enables the spectator's aide device to receive, interact with and display on their viewing screen in an animated fashion resembling connected colored line-art and dots, a sporting event in relation to the GPS mux stream received from the public webserver during a live game or from current and previously created GPS game libraries that have been stored on said server representing the player and play object positions of both current and earlier sporting events.

Each of these libraries i.e. data bases is primarily a lookup table that consists of the once real-time GPS coordinates that represent the unique player and/or play object's positions relative to the play area as observed throughout a game that were originally received by the service provider in the sports venue.

Through a maze of multiple menu driven commands, a spectator can select a set of features unique to the given library that might include special effects, analytical algorithms and stop action functions. Depending on the spectator's device screen size, a plurality of optical overlays can also be superimposed giving the viewer a better sense of what is being observed. The App can be easily disseminated for widespread public consumption and installed directly over the internet via smart phone app providers.

Remote access across the internet over greater distances is also achieved utilizing a PC based software application similar to that in use by the spectators present at the sports venue who utilize their personal wireless devices such as smart phones whilst viewing a playbook application and associated screen menus. Broadcasting over interactive Television mediums equipped with playbook software as appropriate is realized as well.

The system architecture disclosed in the present invention minimizes the time delay between when action occurs on the play area and when the tracks are displayed on the screen. The architectural configuration of the present invention is streamlined so that it is fast with low latency of no more than a few milliseconds. The system displays tracks to the spectators at the sport's venue with latency so short that the tracks appear to occur in real time synchronized with the actual action on the play area. By looking at a player's tracks, spectators at the sport's venue will be able to quickly tell where a player is on the play area relative to the other players and the play object. By looking at a player's tracks, the spectators at the sport's venue will be able to quickly tell how a player is maneuvering on the play area relative to the other players and the play object.

FIG. 2

Figure 2:
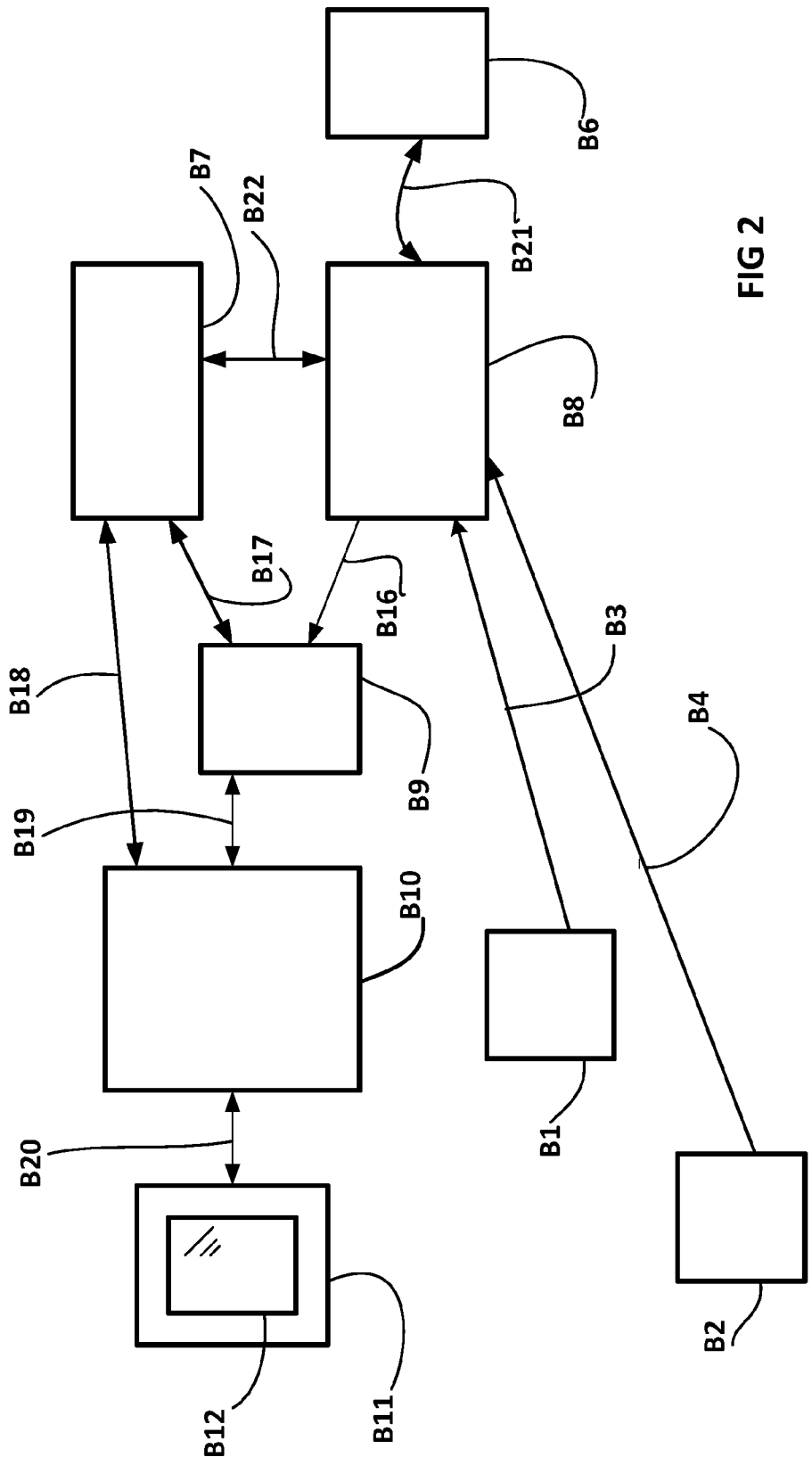
FIG. 2 shows a block diagram for a real-time animated sports entertainment system using generic data sources of geographic coordinate data.

FIG. 2 shows a block diagram for a real-time animated sports entertainment system using generic sources of geographic coordinate data.

The detailed physical elements disclosed in the drawing shown in FIG. 2 are identified as follows: B1 is a generic source for each and every player's real time position coordinates on the play area during a game. B2 is a generic source for the play object's real time position coordinates on the play area during a game. B3 is the signal from B1 transmitted to a wireless application service provider (WASP) B7. The signal B3 is encoded with the position coordinates of the players on the play area. B4 is the signal from B2 transmitted to a wireless application service provider (WASP) B7. The signal is encoded with the position coordinates of the play object on the play area. B5 (is not shown). B6 is a laptop administrative PC terminal operated by the venue's field service personnel which is the human interface to the WASP B8 to operate the system.

B7 is the internet service provider (ISP) to the sport's venue. The internet service provider carries the inbound and outbound internet traffic from/to the outside world. In one preferred embodiment, the App is downloaded into B11 via B10 from B7. In another preferred embodiment, the App is downloaded into B11 from B7 via B9 and B10. The ISP B7 hangs off of the LAN B10. The ISP also enables the smart mobile devices to be downloaded from the internet via B10.

B8 is a wireless application service provider (WASP). B8 is comprised of radio frequency antennas. B8 receives wireless signals via its radio frequency antennas from all the player's position encoders and the play object's position encoder. B8 is comprised of at least one CPU that muxes (i.e. multiplexes) the position coordinate data from all the player's position encoders and the play object's position encoder into a single data stream of position coordinates. The CPU creates a master file comprised of all of the historical position coordinates of all the player's and play objects during a game. The single data stream of position coordinates is derived from this master file. The single data stream of position coordinates is fed into B9 from B8. B8 has software algorithms installed within it to process the incoming data streams (i.e. generic source data packets) to reduce the position coordinates it receives from B3 and B4 to coordinates referenced to the play area on the display. The coordinates of the boundaries of the play area have been pre-programmed into B8. In another preferred embodiment, the sports venue play area boundary coordinates are furnished to B8 from B7 via B22 from a play area data base on the internet via B7. The play area data base contains all the coordinates of all the current play area boundaries in all and every sport's venue. In yet another preferred embodiment, GPS position encoders are planted along each of the sports venue's play area boundaries. GPS position coordinate data from these position encoders is transmitted wirelessly or by cable to B8 where the data is processed.

B9 is a public web server for the sport's venue. B9 is a computer. B9 takes the single data stream of position coordinates derived from the master file created by B8 and hands it off to the LAN B10 for dissemination to the spectators at the sport's venue i.e. the stadium; and also hands the file off to remote spectators by way of B7. In another preferred embodiment, the App is downloaded from B9 into B11 via B10.

B10 is a local area network (LAN). B10 is a combined hard wired and wireless LAN. Hanging on the LAN are, for example, routers (i.e. used to assign IP addresses to the users), WIFI, Radio Frequency antennas that receive and transmit wireless signals to and from the spectators in the stands, hardwired PC's, receptacles in the stands where spectators can plug their devices into the LAN, etc.

B11 is a typical spectator's device (aide). B11 is the spectator's personal smart mobile device that has playbook application software (i.e. the APP) downloaded into it. B12 is the display screen of B11. B3 is a signal from B1. The signal B3 is transmitted to the wireless application service provider (WASP) B8. The signal B3 is encoded with the position coordinates of the player B1. Each player caries a position encoder. B3 transmits the position coordinates of the player B1 to the WASP B8. B15 (is not shown).

B16 is a unidirectional data communication link from B8 to B9 carrying a continuous single data stream of real-time position coordinates of the players and play object on the play area. B16 is a hard wired and/or a wireless link. Hard wiring is superior for reliability. B17 is a bi-directional data communication link between B7 and B9. B17 carries internet traffic from B7 to B9. B17 is comprised of internet traffic from and to the outside world. B17 is hard wired for performance and reliability.

B18 is a bi-directional data communication link between B7 and B10. B18 carries internet traffic from B7 to B10. B18 is comprised of internet traffic from and to the outside world. B18 is hard wired for performance and reliability. B19 is a bi-directional data communication link between B9 and B10. The bi-directional data communication link carries the single data stream of position coordinates derived from the master file created by B8. B19 is hard wired for performance and reliability.

B20 is a bi-directional data communication link between B10 and B11. B20 is typically a wireless data communication link for mobile spectators. B20 feeds the single data stream of position coordinates from B10 to B11. In yet another preferred embodiment, spectator's smart mobile devices B11 plug into a LAN receptacle in the stands of the sport's venue, B20 is hard wired for performance and reliability in this instance.

B21 is a bi-directional data communication link between B6 and B8. It carries administrative commands from B6 to B8, and human interface data from B8 for display on B6. For example, the battery life remaining on the GPS encoders. In general, B6 interrogates the GPS encoders B3 and B4 for their functional status. This is an important factor in servicing the field equipment. B21 is hard wired for performance and reliability. B22 is a bi-directional data communication link between B7 and B8. It carries the play area boundary coordinates from B7 to B8. B22 is hard wired for performance and reliability.

Each generic source of position coordinates for the players B1 identifies the player with the player's jersey number encoded into its wireless signal B3. Each generic source of position coordinates for the play objects B2 identifies the play objects with the serial number of the play objects encoded into its wireless signal B4. In addition, an identifier for the play area is encoded into the player's and play object's wireless signal. Furthermore, an identifier for the sport's venue, an identifier for the date, and an identifier for the time is encoded into the player's and play object's wireless signal to the WASP B8.

The system shown is an entertainment aide for sports spectators. It is also a work aide for sportscasters and coaches. It utilizes a real-time animated sports playbook screen display form controlled by an App.

The primary functional difference between the systems shown in FIG. 1 and FIG. 2 is that the FIG. 2 geographic coordinates of the players and their play objects on a play area come from any available generic sources which may or may not include GPS encoders carried by the players and play object.

In this preferred embodiment, the geographic coordinates of the players and their play objects on the play area come from available generic sources, for example those using prior art technologies.

The geographic coordinates of the players and play objects are processed at B8 to create a display of their movements as tracks i.e. freeform lines, on a common screen B12; wherein the tracks are aligned against an animated play area backdrop comprised of boundaries and artifacts. In a preferred embodiment, the present invention uses the coordinate data derived from available generic systems.

The system architecture disclosed in the present invention minimizes the time delay between when action occurs on the play area and when the tracks are displayed on the screen. The architectural configuration of the present invention is streamlined so that it is fast with low latency of no more than a few milliseconds. The system displays tracks to the spectators at the sport's venue with latency so short that the tracks appear to occur in real time synchronized with the actual action on the play area. By looking at a player's tracks, spectators at the sport's venue will be able to quickly tell where a player is on the play area relative to the other players and the play object and the artifacts on the play area. By looking at a player's tracks, the spectators at the sport's venue will be able to quickly tell how a player is maneuvering on the play area relative to the other players and the play object.

The system calculates when the action starts and stops. The spectator's aide continuously receives encoded real-time location coordinate data derived from generic sources from each of the players in the play area and play object's real-time location coordinate data derived from generic sources. The position coordinates for the players and for the play objects change when the action starts. The system is configured to calculate these changes. The geographic coordinates of the players are invariant when the players are motionless. The geographic coordinates of the play objects are invariant when the players are motionless.

The generic sources of the geographic coordinates of the play object's location on the play area and the player's location on the play area, output wireless and/or hard wired signals encoding the geographic coordinates of the play object's and player's movements, and subsequent location changes continuously. The encoded geographic coordinate data stream carries the serial number of the play object and the jersey number of the players. The serial numbers and the jersey numbers identify the play object and players to the App contained in the spectator's smart mobile device receiving the encoded geographic coordinate data stream.

This serial number and jersey number identify the player's and play objects to the App contained in the spectator's smart mobile device receiving the encoded geographic coordinate data stream. The spectators seated in a sports stadium can use the stadium's WIFI system to receive the player's real-time geographic coordinate location data. The spectators seated in a sports stadium use the stadium's WIFI system to receive the real-time encoded geographic coordinate location data from each of the players and play objects in the play area. The spectators can also plug into the venue's LAN to receive the real-time encoded geographic coordinate location data from each of the players and play objects in the play area. The spectators can also use internet sites as sources of geographic coordinate location data from each of the players and play objects in the play area. The internet is typically slower and has greater time latency. If the time latency gets too high, the spectator's will notice that the tracks are delayed compared to the real-time action on the play area. Many spectators prefer real time tracks as opposed to latent ones. Therefore it is important to have a system architecture that gives results in real-time.

The play object in the play area has a distinguishing electronic serial number to identify it to the system. This serial number is used by the App to separately process the location data received from the play object in the play area and to distinguish the play object's track data from other play objects that are not in the playing area.

The play object's track is created on the screen by instructions from the App to the aide's CPU for the spectators to see. The play object's track seen on the screen by the spectators has a beginning and an end. Most often the tracks resemble a curved freeform line i.e. or a series of dots linked by straight line segments. The freeform line traces the path that the play objects take during the time interval chosen by the spectator separating the beginning and the end of the track. The length of the freeform line becomes progressively longer on the screen as the play object moves from place to place in the play area. The CPU draws the tracks using the instruction set from the App.

Some tracks are designated with distinguishing colors which are spectator selectable so the tracks may be told apart from any neighboring tracks to avoid confusion. The spectator can start the play object's track whenever the spectator wishes by selecting his choice from a pull down menu on the screen. The spectator can stop the play object's track whenever the spectator wishes by clicking "stop" in the margin of the screen.

The jersey number is used by the App to separately process the location data received from each player on the play area and to distinguish the player's track data from other player's track data that are not in the playing area. The player's track is created on the screen by instructions from the App to the aide's CPU for the spectators to see. Each player's track seen on the screen has a beginning and an end. Most often the tracks resemble a curved freeform line. Each freeform line traces the path that each of the players takes in the play area during the chosen time interval separating the beginning and the end of the track. Some tracks may be designated with distinguishing colors which are spectator selectable so that they may be told apart from other player's neighboring tracks to avoid confusion. The spectator can start the player's tracks whenever the spectator wishes by selecting "start" in the margin of the screen. The spectator can stop the player's tracks whenever the spectator wishes by selecting "stop" in the margin of the screen.

Some spectator's have a television device. The television device can receive both wireless and hard wired signals. Some spectators have a computer device. The computer device can receive both wireless and hard wired signals. The spectator's smart mobile device has a display screen. The television device has a display screen. The computer device has a display screen. The spectator views the progress of a sports game on the display screen.

Many sport's games are complex and involved. Many games involve fast action plays. Many games involve multiple players. Most games involve a play object. Some play objects move quickly in the play area and some move slowly during different time intervals of the game. Some players move more quickly in the play area and some move more slowly during different time intervals of the game. Typical play objects in such games are golf balls, ice hockey pucks, tennis balls, base balls, softballs, footballs, soccer balls, volleyballs and basketballs. Typical complex sports that have intervals of fast action plays are football, baseball, softball, tennis, ice hockey, volleyball, soccer and basketball.

Many of these fast action plays occur over short periods of time. Play objects typically move quickly from place to place in the play area. Players typically move quickly from place to place in the play area. Some plays are intricate and difficult for the spectators to see. The play object moves quickly from place to place in the play area and it is sometimes difficult for the spectators to determine its whereabouts. The players move quickly from place to place in the play area and it is sometimes difficult for the spectators to determine their whereabouts. To say the least, keeping track of the motions of the play object and the motions of the players during an action sequence is a challenge to many spectators and leads to increased excitement in the game. Spectators often wonder who (which player) did what, and who (which player) went where? Spectators often wonder where the play object is. Following the progression of events during a game would otherwise be very challenging without the spectator's aide. The spectator's aide helps greatly to assist the spectator in following the players and play objects during a game.

An important value of the present invention is that it sees through all the clutter and accurately follows the whereabouts of the play object and the players. This is especially true in the game of football. In order to help identify the players, the players typically wear a jersey or shirt. The jersey typically has an identifying color signifying the player's team. This helps the spectators to track a player's movements in the play area; particularly the players on the teams that they like.

Additionally, the players typically wear an identifying number on their jerseys. These numbers are typically made large enough so the spectators can tell who is who during a multi-player game. These identifying numbers are difficult for some spectators with poor vision to see at a distance and under varying weather conditions like rain and snow. Some spectators frequently use optical aides such as binoculars to overcome these difficulties.

A means would be useful to the users wherein the track of each player had an identifying symbol representing the number on the player's jersey. A means would be useful to the spectators wherein the track of the play object had an identifying symbol representing the play object to discern it from the player's tracks. A means would be useful to the users wherein each track of each player had an identifying graphical symbol showing the direction of motion of that player on his track. An example of such a symbol is an arrowhead pointing in the direction of motion of the player in the play area. A means would be useful to the users wherein the track of the play object had an identifying graphical symbol showing the direction of motion of the play object in the play area. An example of such a symbol is an arrowhead pointing in the direction of motion of the play object in the play area. A means would be useful to the users wherein the track of the play object and the tracks of each and all of the players were displayed together simultaneously. This is especially useful in displaying the interaction of the players with the play object.

Spectators sometimes have problems locating the play object during a play. Being able to view the track of the play object amongst the player's tracks, moment to moment, would help spectators overcome this problem. It would also clarify to the spectators where the play object is at any one time. This would help the spectators understand which player is doing what with the play object. It would also help spectators understand how and why which players are interacting with one another.

A means would be useful to the users wherein the combined tracks of the play object and the players were displayed together simultaneously on the mobile device screen. A means would be useful to the users wherein the combined tracks of the play object and the players were displayed together simultaneously on the mobile device screen against a graphical background representing boundaries of the play area. The App is pre-loaded with the geographic coordinates of the boundaries of the play area.

An important question that usually comes up during a game is "Which player has control of the play object?" The spectator's aide resolves this issue. Under control of the App, the CPU compares the geographic coordinates of all the players with the position coordinates of the play object during sequential and contiguous time intervals. The system calculates which player appears to be moving with the play object. The system does this by looking for a player whose geographic coordinates are simultaneously almost identical to those of the play object. This instance implies that the play object is moving with and under the control of the player. Because of system errors and small differences in distance between the players controlling the play objects, the position coordinates of the players and the play objects will not be expected to be precisely equal all the time. The App enables the spectator to select the permissible expected average size of this error difference.

Another feature of the spectator's aide has to do with fouls. When a play object leaves the play area for example, the App raises a flag for the spectator to see. When a play object leaves the play area, for example, this feature would help resolve issues arising from foul balls. The system compares the geographic coordinates of the play object with the position coordinates of the foul boundary lines for each play area. The system calculates when the play object goes over the foul lines. For comparison, the system maintains a data base library of all the position coordinates of all the foul boundary lines of all the play areas in all the sport's venues. Additionally, the system similarly calculates when the play object moves across the scoring boundaries. The system maintains a data base library of all the geographic coordinates of all the scoring boundary lines of all the play areas in all the sport's venues. In cases where the boundary lines for a play area may have changed from the boundary lines in the data libraries, the system will deploy GPS locators along the changed boundary lines. The GPS locators will give the system the most recent geographic coordinates of the play area boundary lines, foul boundary lines and scoring boundary lines. For example, if the goal nets have been moved on an ice rink before a game of ice hockey, placing GPS locators at the mouth and throat of the net before the game will provide up to date scoring position coordinates to the system.

A means would be useful to the users wherein the combined tracks of the play object and the players were displayed on the mobile device screen against a graphical background representing the boundaries of play area. A means would be useful to the users wherein the track of the play object had an identifying symbol representing the play object to discern it from the player's tracks.

In a game like football for example, the football is held, carried or passed.

It is sometimes difficult for some of the spectators (who do not have this aide) and who do not have a good vantage point in the stadium stands to see who has the ball or where the ball is. Some spectators use binoculars to overcome these difficulties. The binoculars help to resolve the issue if the spectator knows where and when to point the binoculars. Solving this problem sometimes requires a commanding knowledge of the game.

A means would be useful to the users for them to be able to keep track of each of the players on the play area as the sports game progresses. A means would be useful to the users for them to be able to keep track of the play object on the play area as the sports game progresses. A means would be useful to the users for them to simultaneously be able to see the player's name on the screen near to their identifying number. A means would be useful to the users for them to be able to keep track of each of the play object on the play area as the sports game progresses. Such a means would be especially useful to the users if it was lightweight, small and easy to use. Such a means would be especially useful to the users if it automatically tracked the progress of the game without the need for the users to use their hands (to keep their hands free to eat hot dogs and drink beer for example). Such a means would be especially useful to the users if each of the players left an identifying track on the display screen which the player created in real time as the player moved in the play area. Such a means would be additionally especially useful to the users if the play object simultaneously left an identifying track on the same display screen which the play object created in real time as the play object moved in the play area. Such a means would be especially useful to the users if each of the tracks of each of the players and could be zoomed-in on to reduce the clutter of overlapping and neighboring tracks Such a means would be especially useful to the users if the tracks of the play object could be zoomed-in on to reduce the clutter of overlapping and neighboring tracks.

A player's tracks are created by linking a series of each player's contiguous GPS location data point coordinates with lines where necessary to achieve a visually smooth track. If a player makes a lot of very sudden and fast zigs and zags, more geographic coordinate points are needed per unit time to more accurately follow the player's path on the play area; otherwise the track just represents an average path. Each player's track grows in length on the screen as the player moves in the playing area from place to place.

The play object's track grows in length on the screen as the play object moves in the playing area from place to place. The play object's track is created by linking a series of the play object's contiguous GPS location data point coordinates i.e. dots, with lines where necessary to achieve a visually smooth track where necessary. The spectators are frequently at the sport's venue viewing the sports game from the stands. Stadiums and arenas are typical sports venues for the sports gaming events. The play areas in these venues are typically playing fields, rinks, and courts The display screen gives the spectators a method by which they can keep track of the progress of a sports game more clearly than they could otherwise. The users look at their mobile device screen to track the motions of the players and the play object as each moves on the play area. The spectators use their mobile device to track the progress of the game. Many spectators view the game from home. They observe the game from a computer screen or television screen. The spectator's device screen displays the tracks of each of the players. The spectator's device screen displays the track of the play object.

The system shows the track of the play object as it develops over time as it moves on the play area. The system shows the track of each of the players as it develops over time as the players move on the play area. Each player creates a track. Each track has a symbol identifying and representing the player. Each play object creates its own track. Each track has a symbol identifying and representing the play object. The length of the track created by each player grows as he moves. Each play object creates a track. The length of the track created by the play object grows as it moves. The system shows the track as it is developing in real-time wherein the track has a symbol identifying the player moving at the leading tip of the track. The system shows the track as it is developing in real-time wherein the track has a symbol identifying the play object moving at the leading tip of the track. The system shows the track of the player whether he be moving or motionless. The system shows the track of the play object whether it be moving or motionless. If the play object is motionless, its geographic coordinates remain unchanged. If a player is motionless, his position geographic coordinates remain unchanged.

FIG. 3

Figure 3:
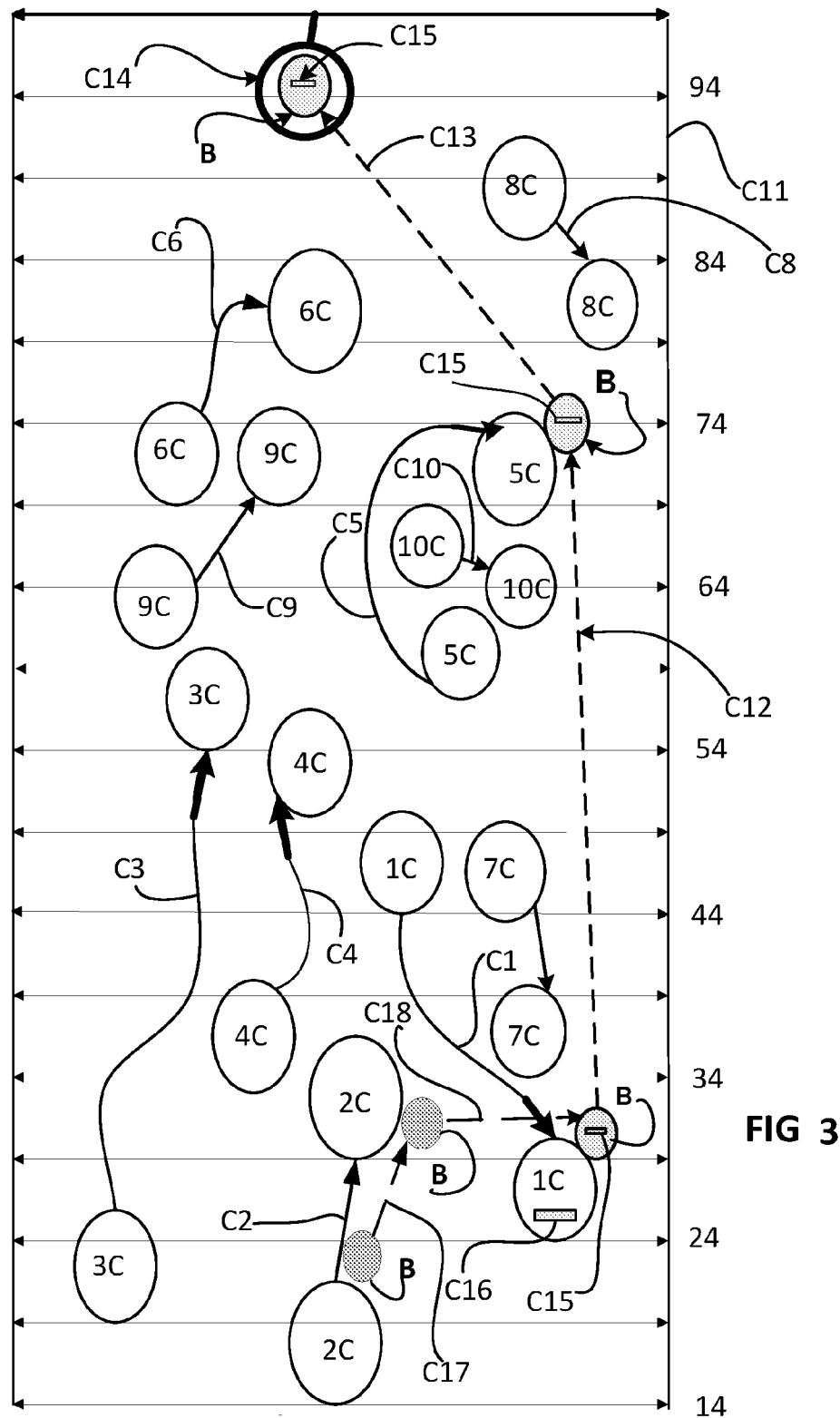
FIG. 3 shows a real-time animated display of basketball player tracks and basketball tracks during a basketball game presented on an animated section of a basketball court as a backdrop.

FIG. 3 shows a real-time animated display of basketball player tracks and basketball tracks during a basketball game presented on an animated section of a basketball court as a backdrop.

The detailed physical elements disclosed in the drawing shown in FIG. 3 are identified as follows: B is the instrumented basketball. C1 is the track of player 1C. C2 is the track of player 2C. C3 is the track of player 3C. C4 is the track of player 4C. C5 is the track of player 5C. C6 is the track of player 6C. C7 is the track of player 7C. C8 is the track of player 8C. C9 is the track of player 9C. C10 is the track of player 10C. C11 is an animated section of the basketball court play area boundary and artifacts. The fouling zone is any space outside of C11. C12 is the track of the basketball as it is passed from player 1C to player 5C. C13 is the track of the basketball as it is thrown by player 5C to the basket C14. C14 is the basket. C14 is also a scoring zone. The basket on the other side of the court is another scoring zone. C15 is the GPS locator mounted inside the instrumented basketball B. C16 is a typical GPS locator carried by each of the players. C17 is the track of the basketball handled by player 2C. C18 is the track of the basketball as its passed from player 2C to player 1C.

FIG. 3 shows a view of the animated basketball play-book display.

FIG. 3 shows an instance on the display screen of the spectator's personal smart mobile device i.e. aide, for the game of basketball. The display screen of the spectator's personal smart mobile device shows an animated top view i.e. computer graphics, of a basketball court's boundaries and artifacts i.e. lines, markings etc. The real-time tracks of each of the basketball players and the basketball is presented aligned with an animated backdrop representing the boundaries of the basketball court, i.e. play area. FIG. 3 is a preferred embodiment.

The play object B, i.e. a basketball, carries a GPS locator C15. There are 10 players in the game. Each player carries a GPS locator C16. Each player is represented by a colored balloon symbol. The team A players all have the same colored balloons. The team B players all have the same colored balloons. The team A players and the team B players have balloons of different colors. Each player's number on his jersey is shown in a circle i.e. inside his balloon. The system would work equally well if instead of GPS position locators, generic surveillance sources were employed to capture the geographic coordinates of the players and play object.

Each GPS locator C16 identifies the player carrying the locator C16 by the player's jersey number encoded into its signal. Each GPS locator C15 identifies the play object i.e. basketball using the locator C15 encoded into its signal.

The display has a start action button. The display has a stop action button. These buttons are displayed using a pull down menu. The spectator can choose to initiate the start of the growth of the tracks at any time using the start action button. The spectator can choose to terminate the further growth of the tracks at any time using the stop action button.

When the spectator chooses to initiate the start of the tracks, the initial geographic of each of the players is marked with a balloon containing the player's number at the start of the player's track.

When the spectator chooses to initiate the start of tracks, the initial geographic of the play object is marked with a balloon symbol representing the play object at the start of the play object's i.e. basketball's track.

Referring to drawing FIG. 3, a preferred embodiment of the invention, the following is a description of the system installed at the sporting venue for deriving, delivering, and displaying the geographic coordinates tracks for each of the players, and for deriving, delivering, and displaying the geographic coordinates tracks for the play object B i.e. basketball on the play area C11.

In a preferred embodiment of the invention, each player is configured with a GPS locator C16. The GPS locator C16 derives each player's geographic coordinates referenced to the play area C11. The GPS locator C16 is worn on the player's clothing, carried in the player's pocket, attached physically to each of the players, or housed internally inside the players.

The position coordinates for each of the players are transmitted to spectator's personal smart mobile devices at the sport's venue via at least one wireless application service provider (WASP). Many spectators in the audience have personal smart mobile devices.

Furthermore, the GPS locator C15 is mounted inside each play object B i.e. basketball. The play object B is an instrumented basketball in this instance.

Each spectator's personal smart mobile device is configured with a display screen and an App.

The App is configured with play-book software. The play-book software displays and animates real-time cartoon representations of the player's tracks at their actual geographic positions on the play area, on the display screen, as the players move on the play area, superimposed on a cartoon backdrop representing the play area boundaries and artifacts.

Furthermore, the play-book software simultaneously (i.e. with the player's tracks) displays and animates a real-time cartoon representation of the play object's tracks i.e. basketball tracks, at its actual geographic positions as it moves on the play area, superimposed on the same cartoon backdrop representing the play area boundaries and artifacts.

The App furnished to the spectator's personal smart mobile device operates the animated play-book during the game. The App causes a backdrop representing the play area to be continuously displayed on the screen of the spectator's personal smart mobile device. The App causes each of the players and play object to be continuously displayed on the screen at its geographic coordinates superimposed on the backdrop representing the play area.

Each of the players and play object leaves its track superimposed on the backdrop representing the play area as the game progresses and the player and play object moves from point to point on the play area. All of the player's and play object's historical positions and present geographic are shown on his track.

The initial conditions for the game are shown with each player and play object represented at its starting position. As each player and play object moves on the playing field i.e. play area C11, its track is shown superimposed on the playing field backdrop in real time from moment to moment for that player and play object as it geographically moves on the play area C11. The length of its track grows as it moves further and further from his initial position. If a player and play object remain at their initial positions, it will generate a track of zero length on the screen.

Referring to FIG. 3, the following is a typical example of the operation of the animated play-book during a game. The player and play object movements displayed on the screen as tracks of increasing length with time are described below.

At the start of the action, the basketball B is with player 2C. Player 2C moves from the 18 foot line to the 34 foot line creating track C2. Player 2C moves the basketball B from the 18 foot line to the 34 foot line creating track. Player 2C passes the basketball B to player 1C at the 29 foot line. Player 1C moves from the 49 foot line to the 29 foot line to position himself to receive the basketball B from player 2C. Player 1C receives the basketball B at the 29 foot line from player 2C.

Meanwhile, Player 6C moves from the 74 foot line to the 84 foot line to cover the basket C14. Player 7C moves from the 49 foot line to the 34 foot line to cover player 1C from passing the basketball B to player 5C. Player 8C moves from the 89 foot line to the 79 foot line to cover player 5C and intercept the basketball. Player 9C who has been covering player 3C, moves from the 64 foot line to the 74 foot line. Player 10C moves to cover player 5C and positions himself to intercept the basketball pass from player 1C.

Meanwhile, Player 3C moves from the 24 foot line to the 59 foot line. Player 4C moves from the 39 foot line to the 54 foot line. Player 5C moves from the 59 foot line to the 74 foot line to position himself to receive a pass from player C1. Player 1C passes the basketball to player 5C on the 74 foot line. Player 5C receives the pass from player 1C and shoots the basketball B to the basket C14. The basketball enters the basket C14 and player 5C scores.

On a pull down menu actuated by a "menu" button on the display, the App enables the spectator to choose "crowd roars". If "crowd roars" is chosen on the menu by the spectator, then the App enables the spectator's personal smart mobile device to issue an audible sound simulating the crowd roaring as player 5C scores. This is a signal to the spectator that the play is over. The spectator can stop the action here temporarily if he wishes.

All symbols for the player's and the play object appearing on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given.

FIG. 4

Figure 4:
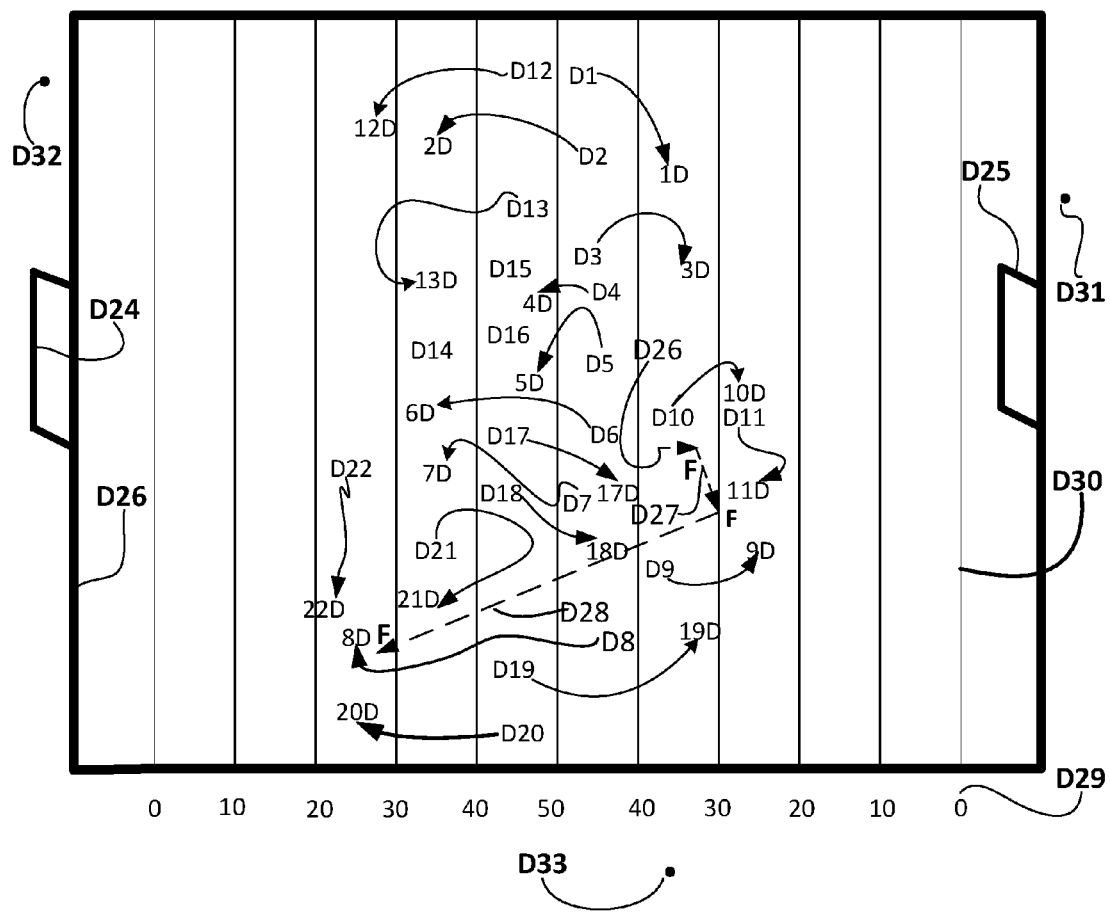
FIG. 4 shows a real-time animated display of football player tracks and football tracks during a football game presented on an animated section of a football field as a backdrop.

FIG. 4 shows a real-time animated display of football player tracks and football tracks during a football game presented on an animated section of a football field as a backdrop.

The detailed physical elements disclosed in the drawing shown in FIG. 4 are identified as follows: D1 represents player 1D. D2 represents player 2D. D3 represents player 3D. D4 represents player 4D. D5 represents player 5D. D6 represents player 6D. D7 represents player 7D. D8 represents player 8D. D9 represents player 9D. D10 represents player 10D the center. D11 represents player 11D. D12 represents player 12D. D13 represents player 13D. D14 represents motionless player 14D. D15 represents motionless player 15D. D16 represents motionless player 16D. D17 represents player 17D. D18 represents player 18D. D19 represents player 19D. D20 represents player 20D. D21 represents player 21D. D22 represents player 22D. D23 is the animated play area displayed as a backdrop on a spectator's personal smart mobile device screen. D24 represents a goal post. D25 represents a goal post. D26 is the geographic play area boundary and artifacts. D26 is the track created by the football F as it moves from player 10D to the quarterback 11D. D27 is the track created by the football as it is carried by the quarterback 11D. D28 is the track created by the football as it is passed from the quarterback 11D and received by player 8D. D29 is a play area artifact. D30 is a play area artifact. D31 is a scoring zone. D32 is a scoring zone. D33 is a fouling zone.

FIG. 4 shows a view of the animated football play-book display.

FIG. 4 shows an instance on the display screen of the spectator's personal smart mobile device i.e. aide, for the game of football. The display screen of the spectator's personal smart mobile device shows an animated top view i.e. computer graphics, of a football field's boundaries and artifacts i.e. lines, markings etc. The real-time tracks of each of the football players and the football are presented aligned on an animated backdrop representing the boundaries and artifacts of the football field play area.

The play object, a football identified in this screen display preferred embodiment by the letter F, and as a dashed line with arrowheads demarking its direction of travel, carries a GPS locator. There are 22 players in the game. Each player carries a GPS locator. Each player is represented by colored numbers. The team A players all have the same color numbers. The team B players all have the same color numbers. The team A players and the team B players have numbers of different colors. Each player's number on his jersey is shown as his number.

Each GPS locator identifies the player carrying the locator i.e. by the player's jersey number encoded into its signal. Each GPS locator identifies the play object with a number i.e. football carrying the locator encoded into its signal. The system would work equally well if instead of GPS position locators, other generic surveillance sources were employed to capture the geographic coordinates of the players and play object.

The display has a start action button. The display has a stop action button. These buttons are displayed using a pull down menu. The spectator can choose to initiate the start of the growth of the tracks at any time using the start action button. The spectator can choose to terminate the further growth of the tracks at any time using the stop action button.

When the spectator chooses to initiate the start of the tracks, the initial geographic of each of the players is marked with the player's number at the start of the player's track. When the spectator chooses to initiate the start of tracks, the initial geographic of the play object is marked with the play object's number representing the play object at the start of the play object's i.e. football's track.

Referring to drawing FIG. 4, a preferred embodiment of the invention, the following is a description of the system installed at the sporting venue for deriving, delivering, and displaying the geographic coordinates tracks for each of the players, and for deriving, delivering, and displaying the geographic coordinates tracks for the play object F i.e. football on the play area D26.

In a preferred embodiment of the invention, each player is configured with a GPS locator. The GPS locator derives each player's geographic coordinates referenced to the play area D26. The GPS locator is worn on the player's clothing and equipment, carried in the player's pocket, attached physically to each of the players, or housed internally inside the players.

The position coordinates for each of the players are transmitted to the spectator's personal smart mobile devices at the sport's venue via at least one wireless application service provider (WASP). Many spectators in the audience have personal smart mobile devices.

Furthermore, the GPS locator is mounted inside each play object F i.e. football. The play object F is an instrumented football in this instance.

Each spectator's personal smart mobile device is configured with a display screen and an App. The App firstly checks the configuration of the spectator's personal smart mobile device to determine its capabilities and limitations for the tasks ahead. The App is configured with play-book software. The play-book software displays and animates real-time cartoon representations of the player's tracks at their actual geographic positions on the play area, on the display screen, as the players move on the play area, superimposed on a cartoon backdrop representing the play area boundaries and artifacts i.e. goal posts.

Furthermore, the play-book software simultaneously (i.e. with the player's tracks) displays and animates a real-time cartoon representation of the play object's tracks i.e. football's tracks, at its actual geographic positions as it moves on the play area, superimposed on the same cartoon backdrop representing the play area boundaries and artifacts.

The App furnished to the spectator's personal smart mobile device operates the animated play-book during the game. The App causes a backdrop representing the play area to be continuously displayed on the screen of the spectator's personal smart mobile device. The App causes each of the players and the play object to be continuously displayed on the screen (if the spectator chooses to do so) at the player's and play object's geographic coordinates superimposed on the backdrop representing the play area.

Each of the players and play object leaves its track superimposed on the backdrop representing the play area as the game progresses, and the player and play object moves from point to point on the play area. All of the players and play object's historical positions and present geographic are shown on the tracks. The arrowheads for the tracks point in the direction of motion. The number representing the player moves with the progress of the track. The track of the football is represented as a dashed line.

The initial conditions for the game are shown with each player and play object represented at its starting position. As each player and play object moves on the playing field i.e. play area D26, its track is shown superimposed on the playing field backdrop in real time from moment to moment for that player and play object as it geographically moves on the play area D26. The length of the track grows as the player and play object move further and further from its initial position. If a player or play object remains at its initial position, it will generate a track of zero length on the screen.

Referring to FIG. 4, the following is a typical example of the operation of the animated play-book during a game. The player movements displayed on the screen as tracks of increasing length with time are described below.

The players are football players. There are two teams. There is a red team and a blue team. Each team has 11 players. Each player has a number to identify it. Players D1 thru D11 are on the red team (figuratively speaking the colors to distinguish the teams from one another). Players D12 thru D22 are on the blue team.

Player D1 moves from the 43 yard line to the 45 yard line. Player D2 moves forward from the 43 yard line to the 35 yard line. Player D3 moves backward from the 43 yard line to the 35 yard line. Player D4 moves forward from the 45 yard line to the 51 yard line. Player D5 moves forward from the 43 yard line to the 51 yard line. Player D6 moves forward from the 45 yard line to the 35 yard line. Player D7 moves forward from the 45 yard line to the 35 yard line. Player D8 moves forward from the 43 yard line to the 33 yard line to position himself to receive the football from the quarterback player D11.

Player D9 moves backward from the 35 yard line to the 25 yard line to protect the quarterback, player D11. Player D10 the center snaps the football F from the 35 yard line backward to the quarterback player D11 on the 31 yard line. The track of the football F is shown as a dashed line with an arrow pointing in the direction of motion from the 35 yard line backward to the 31 yard line.

Player D11 moves backward from the 31 yard line to the 25 yard line, moving the football F from the 31 yard line to the 25 yard line. The track of the football F is shown as a dashed line with an arrow pointing in the direction of motion from the 31 yard line to the 25 yard line.

Player D11 passes the football F from the 25 yard line forward to the 31 yard line where it is received by player D8. The track of the football F from player D11 to player D8 is shown as a dashed line with an arrow pointing in the direction of motion and ending at player D8. Player D8 is tackled by player D22. The play i.e. the down is ended.

The game time is frozen i.e. stopped, by the spectator on his personal smart mobile device while the players assemble for the next play.

The spectator can now review the full tracks for the football and for each player.

All the tracks are stored for the spectators in the public web server for their future analysis and entertainment. The tracks are also stored for the spectators in their personal smart mobile devices if memory storage space permits. The location measurements for each of the players are transmitted to a streaming Internet audience via at least one Internet service provider.

The sports games are not restricted to just football. Games like golf, baseball, soccer, volleyball and basketball are further example of games where this system can be used. The ultra small micro-sized GPS locators are easily mounted inside play objects including golf balls, tennis balls, base balls, softballs, soccer balls, volleyballs and basketballs. See FIG. 5. Their batteries can be easily re-charged using time varying magnetic flux induction.

All symbols for the player's and the play object on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given.

FIG. 5

Figure 5:
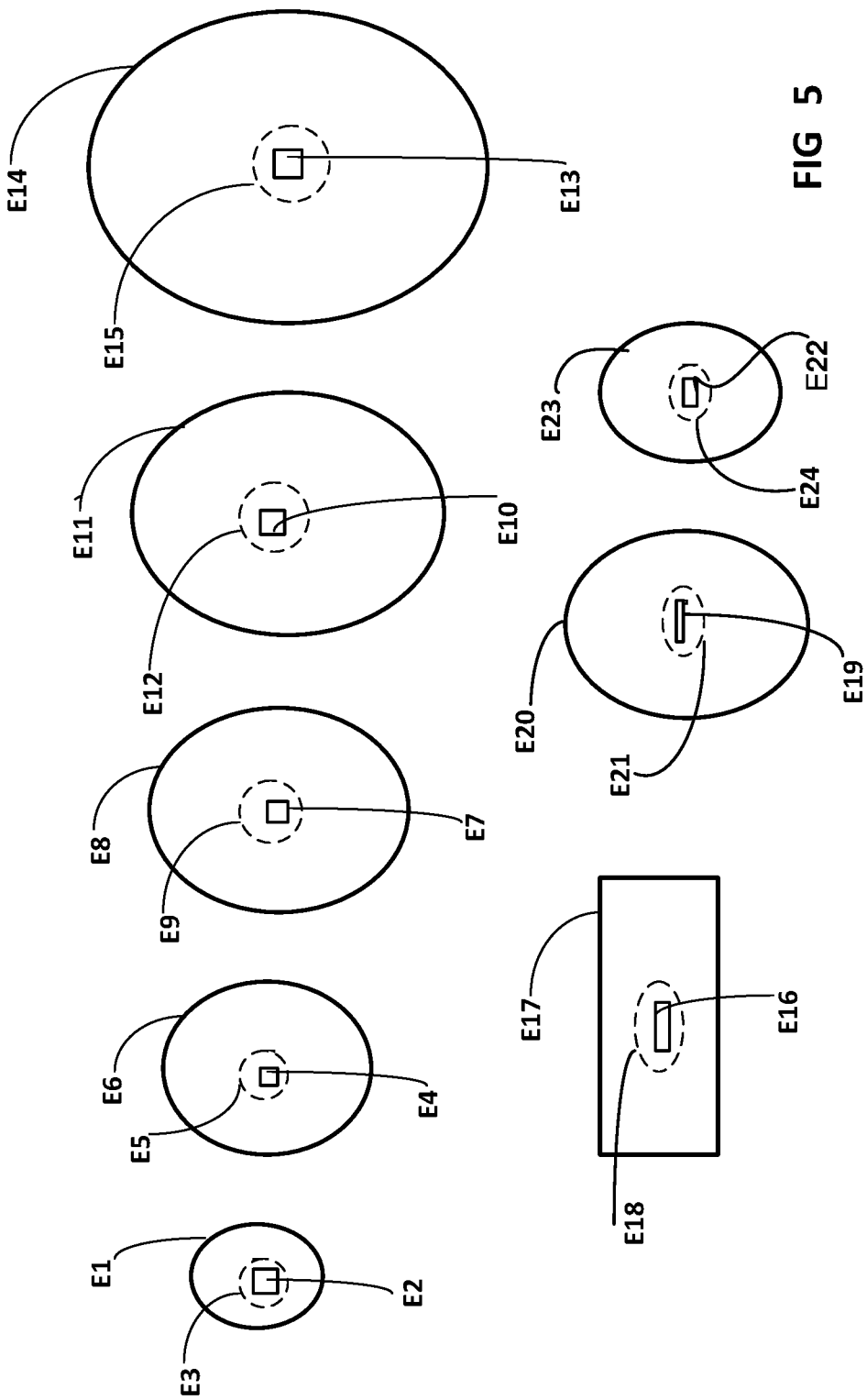
FIG. 5 shows some typical play objects with embedded GPS locator position encoders inside them.

FIG. 5 shows some typical play objects with embedded GPS locators position encoders inside them.

The detailed physical elements disclosed in the drawing shown in FIG. 5 are identified as follows: E1 is a golf ball. E2 is a GPS locator (position encoder). E3 is the mounting for GPS locator (position encoder) inside a golf ball E1. E4 is a GPS locator (position encoder). E5 the mounting for the GPS locator (position encoder) inside a base ball E6. E6 is a base ball. E7 is a GPS locator (position encoder). E8 is a soccer ball. E9 the mounting for the GPS locator (position encoder) inside a soccer ball E11. E10 is a GPS locator (position encoder). E11 is a volleyball. E12 the mounting for the GPS locator (position encoder) inside a volleyball E8. E13 is a GPS locator (position encoder). E14 is a basketball. E15 the mounting for the GPS locator (position encoder) inside a basket ball E6. E16 is a GPS locator (position encoder). E17 is an ice hockey puck. E18 the mounting for the GPS locator (position encoder) inside an ice hockey puck E17. E19 is a GPS locator (position encoder). E20 is a soft ball. E21 is the mounting for the GPS locator (position encoder) inside soft ball E20. E22 is a GPS locator (position encoder). E23 is a tennis ball. E24 is the mounting for the GPS locator (position encoder) inside the tennis ball E20.

Each GPS locator (position encoder) identifies the play object using that locator (position encoder) with its serial number encoded into its signal. Each GPS locator is a wireless source of geographic coordinates for its respective play object that it is mounted inside of. Each GPS locator wirelessly transmits an RF signal from inside its respective play object encoded with its geographic coordinates. The system would work equally well if instead of GPS position locators, other generic surveillance sources were employed to capture the geographic coordinates of the players and play object. The system would also work equally well if instead of geographic coordinates, generalized coordinates were used.

FIG. 6

Figure 6:
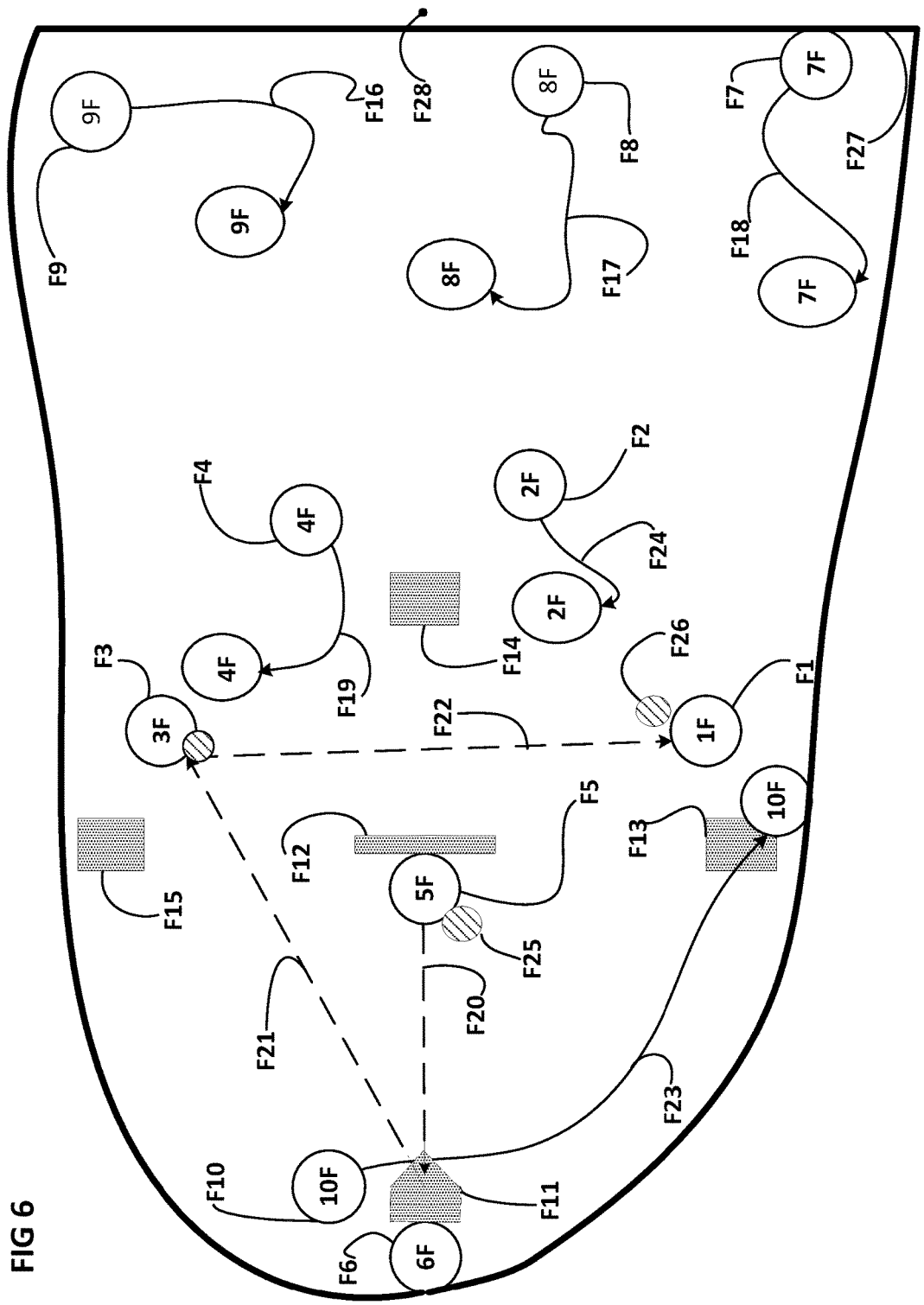
FIG. 6 shows a real-time animated display of baseball player tracks and baseball tracks during a baseball game presented on an animated section of a baseball field as a backdrop.

FIG. 6 shows a real-time animated display of baseball player tracks and baseball tracks during a baseball game presented on an animated section of a baseball field as a backdrop.

The detailed physical elements disclosed in the drawing shown in FIG. 6 are identified as follows: B is the instrumented baseball. F1 is the symbol for player 1F, the first baseman. F2 is the symbol for player 2F, the second baseman. F3 is the symbol for player 3F, the third baseman. F4 is the symbol for player 4F, the shortstop. F5 is the symbol for player 5F, the pitcher. F6 is the symbol for player 6F, the catcher. F7 is the symbol for player 7F, the right fielder. F8 is symbol for player 8F, the center fielder.

F9 is the symbol for player 9F, the left fielder. F10 is the symbol for player 10F, the batter. F11 is the symbol that represents the home plate. F12 is the symbol that represents the pitcher's rubber. F13 is the symbol that represents the first base. F14 is the symbol that represents the second base. F15 is the symbol that represents the third base. F16 is the track of player 9F, the left fielder. F17 is the track of player 8F, the center fielder. F18 is the track of player 7F, the right fielder. F19 is the track of player 4F, the shortstop. F20 is the track of the baseball when it is pitched. F21 is the track of the baseball after it is hit by the batter F10 to the third baseman F3. F22 is the track of the baseball after it is caught and thrown by the third baseman F3 to the first baseman. F23 is the track of player F10, the batter, after hitting the baseball and running to first base. F24 is the track of player F2, the second baseman.

F25 is the baseball being pitched by the pitcher F5 at the beginning of its track. F26 is the baseball being caught by the first baseman F1 at the end of its track. F27 is the boundary of the outfield, and the boundary to the home run scoring zone F28.

Each player's number on his jersey is shown in a circle in FIG. 6. The remaining player's shown with no tracks are making no tracks and assumed to be motionless in this example.

The system has in its data base the coordinates for the boundaries and artifacts for the play area including the home run zone. The home run zone is an example of a scoring boundary. In a preferred embodiment, the system has in its data base the coordinates for the boundaries and artifacts for the play area for each and every sports venue play area. In particular, the data base contains geographic coordinates for every play area's scoring boundaries. When a baseball penetrates the play area boundary in the home run zone (i.e. a scoring boundary), the geographic coordinates of the baseball coincide with those of the play area scoring boundary. The system does a comparison of the position coordinates of the play object with the geographic coordinates of the scoring zone boundaries. This coincidence of geographic coordinates enables the system to calculate that there has been a home run. This coincidence tells the system that there is a home run.

In a preferred embodiment, when the baseball penetrates the home run zone, the lights on the screen flash and the words "Home Run" come up on the screen for a few moments to notify the spectator that a run has been scored. For example, in a sports stadium there would be a multitude of spectators viewing their display screens on their personal smart mobile devices who would see the words "Home Run" come up on their screens.

In a preferred embodiment, the coincidence of the play object's position coordinates with the geographic coordinates of goal posts (i.e. like in football), goal nets (i.e. like in ice hockey and soccer) etc. is an indication that a player has scored. This enables the system to calculate that there has been a scoring event; that the play object has passed the scoring boundary of the play area. These calculations, which signal a scoring event, enable messages to be posted on the device screen to alert the spectator.

In a preferred embodiment, in a similar fashion, the data base contains geographic coordinates for every play area's fouling boundaries. This enables the system to calculate that there has been a foul event; that the play object has passed the fouling boundary of the play area. These calculations, which signal a fouling event, enable messages to be posted on the device screen to alert the spectator that a foul has taken place.

The detection system disclosed above for scoring and fouling enables the spectators in all the sports whose play objects are shown in FIG. 5 to be made aware of these events.

Each GPS locator identifies the player carrying that position encoder, by the player's jersey number encoded into its signal. Each GPS identifies the play object i.e. baseball using that position encoder with the play objects serial number encoded into its signal. Since there are many baseballs used during the game, each and every baseball carries a GPS locator identified with its serial number.

All the symbols for the player's and the play object appearing on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given. In a sports stadium there would be a multitude of spectators viewing their display screens on their personal smart mobile devices. The system would work equally well if instead of GPS position locators, generic surveillance sources were employed to capture the geographic coordinates of the players and play object.

FIG. 7

Figure 7:
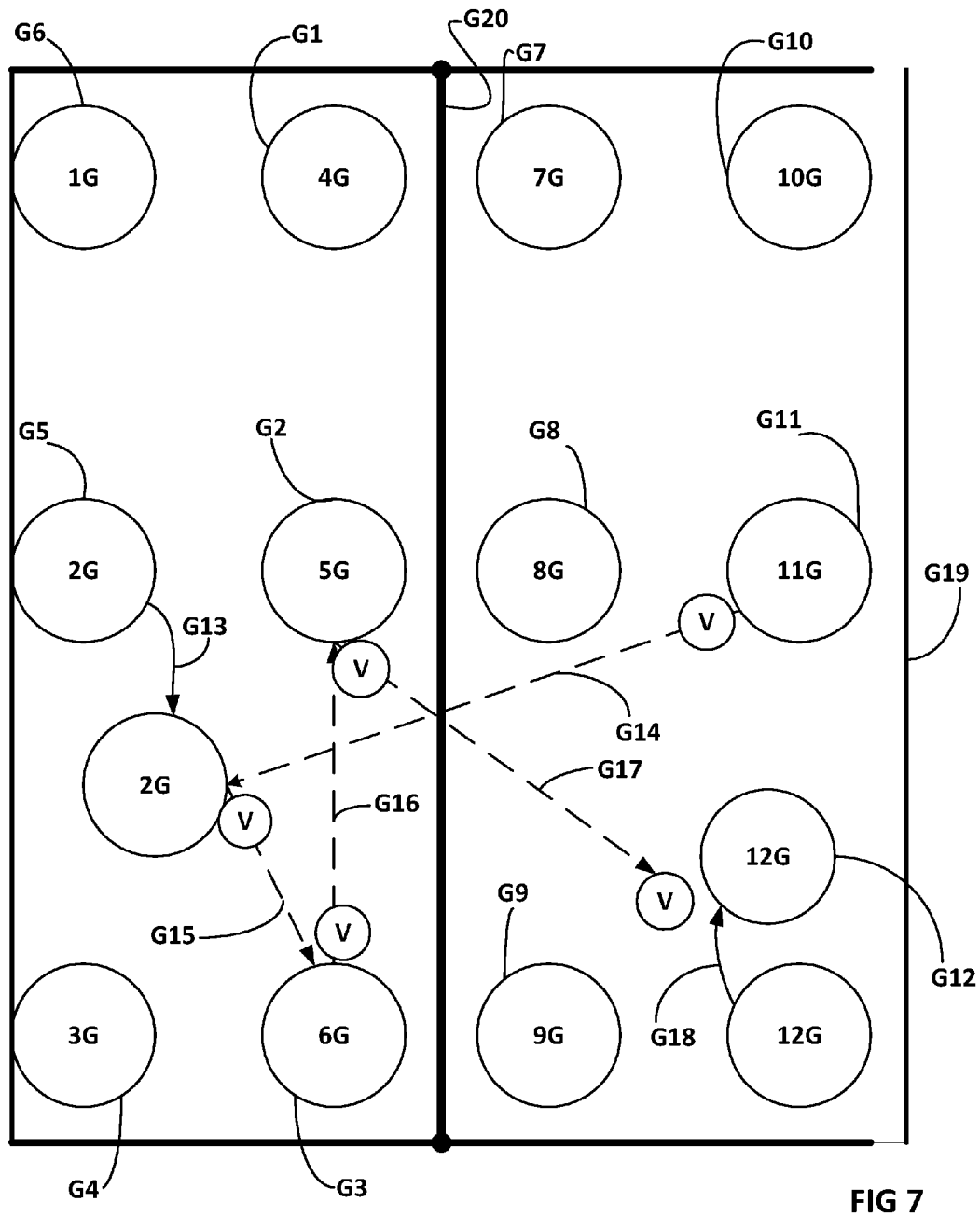
FIG. 7 shows a real-time animated display of volleyball player tracks and volleyball tracks during a volleyball game presented on an animated section of a volleyball court as a backdrop.

FIG. 7 shows a real-time animated display of volleyball player tracks and volleyball tracks during a volleyball game presented on an animated section of a volleyball court as a backdrop.

The detailed physical elements disclosed in the drawing shown in FIG. 7 are identified as follows: V is the instrumented volleyball. G1 is the symbol for player 4G. G2 is the symbol for player 5G. G3 is the symbol for player 6G. G4 is the symbol for player 3G. G5 is the symbol for player 2G. G6 is the symbol for player 1G. G7 is the symbol for player 7G. G8 is the track of player 8G. G9 is the symbol for player 9G. G10 is the symbol for player 10G. G11 is the symbol for player 11G. G12 is the symbol for player 12G. G13 is the symbol that represents the track of player 2G. G14 is the symbol that represents the track of the volleyball V after being served by player 11G. G15 is the symbol that represents the track of the volleyball V after being struck by player 2G. G16 is the symbol that represents the track of the volleyball V after being struck by player 6G. G17 is the symbol that represents the track of the volleyball after being served by player 5G. G18 is the symbol that represents the track of the volleyball after being served by player 12G. G19 is the symbol that represents the boundary of the volleyball court. The scoring zone is anyplace inside G19. G20 is the symbol that represents the volleyball net.

Each player's number on his jersey is shown in a circle in FIG. 7. The remaining player's shown with no tracks are making no tracks and assumed to be motionless in this example. Each GPS locator identifies the player carrying that position encoder by the player's jersey number encoded into its signal. Each GPS locator identifies the play object i.e. the volleyball using that position encoder, encoded in its signal.

All symbols for the player's and the play object appearing on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given. For example, in a sports stadium there would be a multitude of spectators viewing their display screens on their personal smart mobile devices. The system would work equally well if instead of GPS position locators, other generic surveillance sources were employed to capture the geographic coordinates of the players and play object.

FIG. 8

Figure 8:
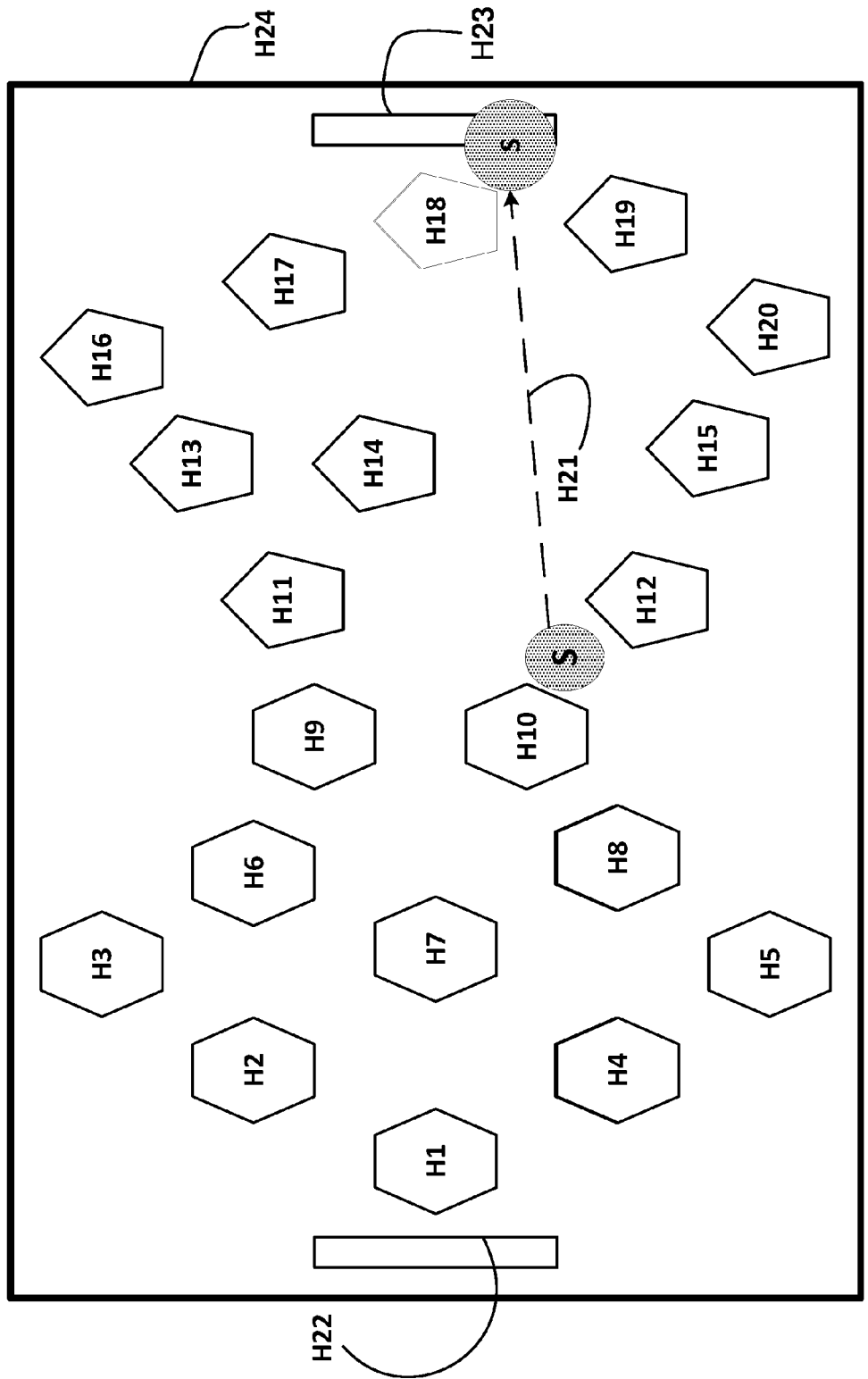
FIG. 8 shows a real-time animated display of soccer player tracks and soccer ball tracks during a soccer game presented on an animated section of a soccer field as a backdrop.

FIG. 8 shows a real-time animated display of soccer player tracks and soccer ball tracks during a soccer game presented on an animated section of a soccer field as a backdrop.

The detailed physical elements disclosed in the drawing shown in FIG. 8 are identified as follows: S is the instrumented soccer ball. H1 is the symbol for player H1. H2 is the symbol for player H2. H3 is the symbol for player H3. H4 is the symbol for player H4. H5 is the symbol for player H5. H6 is the symbol for player H6. H7 is the symbol for player H7. H8 is the symbol for player H8. H9 is the symbol for player H9. H10 is the symbol for player H10. H11 is the symbol for player H11. H12 is the symbol for player H12. H13 is the symbol for player H13. H14 is the symbol for player H14. H15 is the symbol for player H15. H16 is the symbol for player H16. H17 is the symbol for player H17. H18 is the symbol for player H18. H19 is the symbol for player H19. H20 is the symbol for player H20. H21 is the track that represents the movement of the soccer ball S from player H10 who kicks the soccer ball to the goal H23 and scores a goal. H22 is the symbol for the other goal. H22 is also a scoring zone. H23 is a scoring zone. H24 represents the boundary of the soccer field play area.

Each player's number on his jersey is shown in a circle in FIG. 8. The remaining player's shown with no tracks are making no tracks and assumed to be motionless in this example.

When a goal is scored, the goal post artifact on the device screen lights up and blinks for a few moments alerting the spectator that a goal has been scored.

Each GPS locator identifies the player carrying that position encoder by the player's jersey number encoded in its signal. Each GPS locator identifies the soccer ball play object using the serial number of the locator encoded in its signal.

All symbols for the player's and the play object appearing on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given. The system would work equally well if instead of GPS position locators, other generic surveillance sources were employed to capture the geographic coordinates of the players and play object.

FIG. 9

Figure 9:
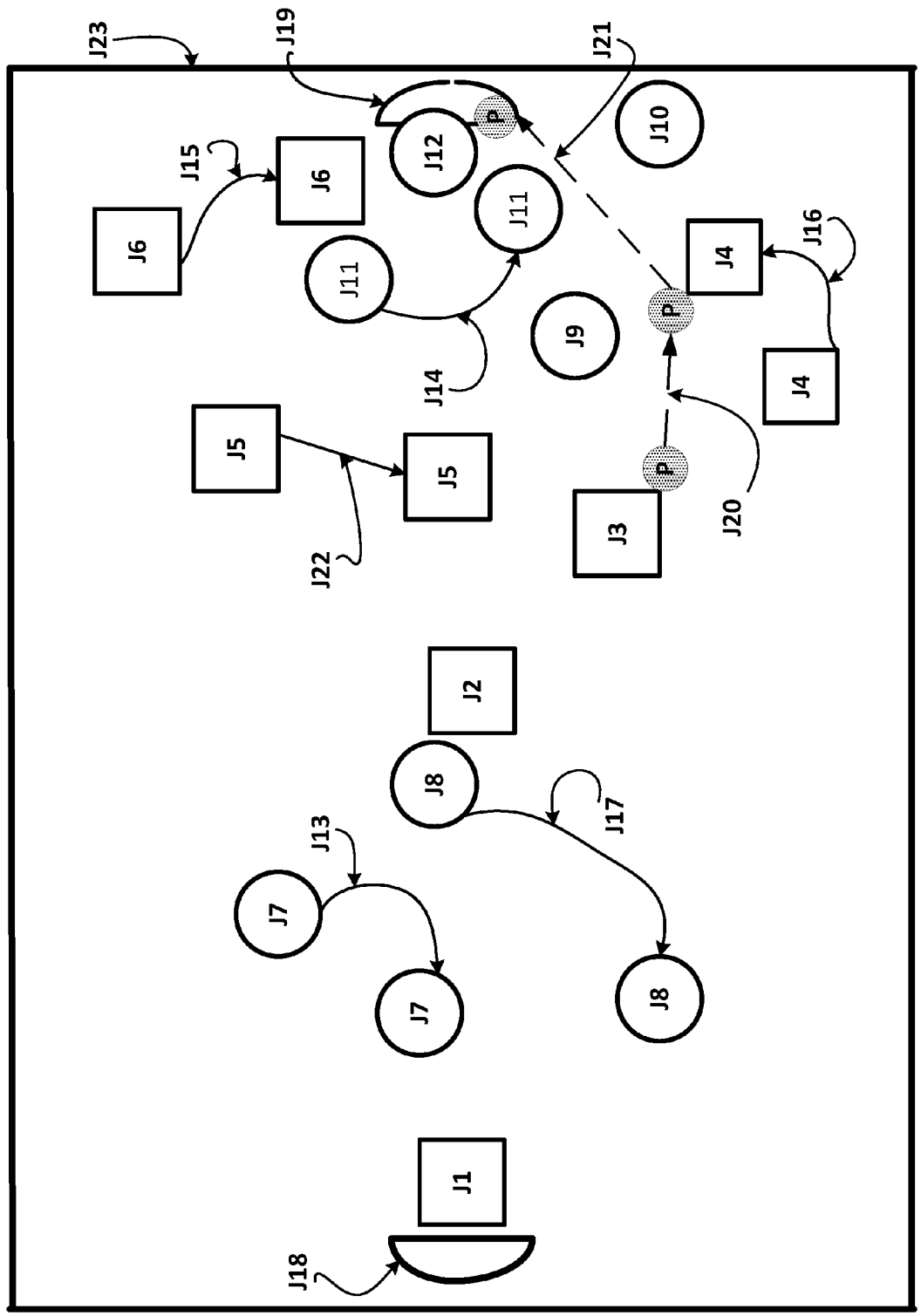
FIG. 9 shows a real-time animated display of ice hockey player tracks and ice hockey puck tracks during an ice hockey game presented on an animated section of an ice hockey rink as a backdrop.

FIG. 9 shows a real-time animated display of ice hockey player tracks and ice hockey puck tracks during an ice hockey game presented on an animated section of an ice hockey rink as a backdrop.

The detailed physical elements disclosed in the drawing shown in FIG. 9 are identified as follows: P is the instrumented ice hockey puck. J1 is the square symbol for player J1, a goal keeper. J2 is the square symbol for player J2. J3 is the square symbol for player J3. J4 is the square symbol for player J4. J5 is the square symbol for player J5. J6 is the square symbol for player J6. J7 is the circle symbol for player J7. J8 is the circle symbol for player J8. J9 is the circle symbol for player J9. J10 is the circle symbol for player J10. J11 is the circle symbol for player J11. J12 is the circle symbol for player J12, a goal keeper. J13 is the symbol that represents the track of player J7. J14 is the symbol that represents the track of player J11. J15 is the symbol that represents the track of player J6. J16 is the symbol that represents the track of player J4. J17 is the symbol that represents the track of player J8. J18 is the symbol that represents the goal. J18 is a scoring zone. J19 is the symbol that represents the goal. J19 is a scoring zone. J20 is the symbol that represents the track of the instrumented ice hockey puck after it is struck by player J3. J21 is the symbol that represents the track of the instrumented ice hockey puck after it is struck by player J4 who makes the goal. J22 is the symbol that represents the track of player J5. J23 represents the boundary and artifacts of the ice hockey rink playing area.

Each player's number on his jersey is shown in a circle in FIG. 9. The remaining player's shown with no tracks are making no tracks and assumed to be motionless in this example.

Each GPS locator identifies the player carrying that position encoder by the player's jersey number encoded in its signal. Each GPS locator identifies the play object i.e. ice hockey puck, using that position encoder, encoded in its signal. The system would work equally well if instead of GPS position locators, other generic surveillance sources were employed to capture the geographic coordinates of the players and play object.

When a goal is scored, the goal net artifact on the device screen lights up and blinks for a few moments alerting the spectator that a goal has been scored.

All symbols for the player's and the play object appearing on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given. In a sports stadium there would be a multitude of spectators viewing their display screens on their personal smart mobile devices.

FIG. 10

Figure 10:
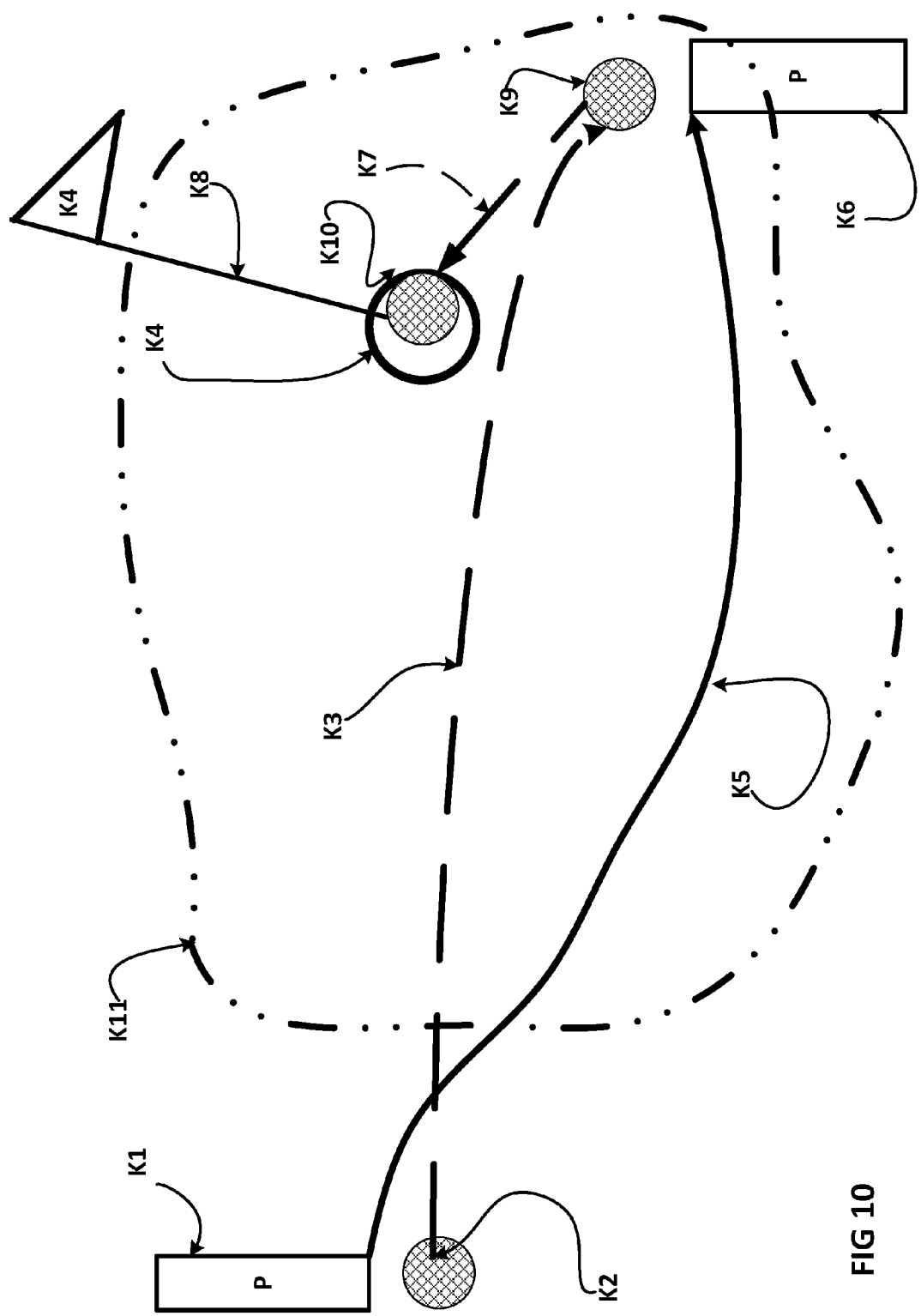
FIG. 10 shows a real-time animated display of golf player tracks and golf ball tracks during a golf game presented on an animated section of a golf course as a backdrop. In a golf tournament there are many golfers, and each one leaves his tracks and his golf ball's tracks on the golf course.

FIG. 10 shows a real-time animated display of golf player tracks and golf ball tracks during a golf game presented on an animated section of a golf course as a backdrop. In a golf tournament there are many golfers, and each one leaves his tracks and his golf ball's tracks on the golf course.

The detailed physical elements disclosed in the drawing shown in FIG. 10 are identified as follows: K1 is the symbol for the instrumented player P. The instrumented player carries a GPS locator. K2 is the symbol for the instrumented golf ball. The instrumented golf ball i.e. play object, carries a GPS locator. See FIG. 5.

K3 is the symbol that represents the track of the instrumented golf ball K2 after it is struck by player P and stops at K9. K4 is the symbol for the hole. K4 is a scoring zone. K5 is the symbol that represents the track of player K1 that ends at K6. K6 is the symbol for the instrumented player K1 at the end of track K5. K7 is the symbol that represents the track of the instrumented golf ball beginning at K9 and ending at K10 in the hole K4.

K8 is the symbol for the flag at hole K4. K9 is the symbol for the instrumented golf ball at the end of track K3. K10 is the symbol for the instrumented golf ball at the end of track K7 in hole K4. K11 represents the boundary of the green for hole K4.

All symbols shown are examples, and can be replaced with others. Each player's number on his jersey is shown in a circle in FIG. 10. The remaining player's shown with no tracks are making no tracks and assumed to be motionless in this example.

Each GPS locator identifies the player carrying that position encoder by the player's jersey number encoded in its signal. Each GPS locator identifies the play object using that position encoder by the play object's serial number encoded in its signal.

In a preferred embodiment, after each time that the golfer hits the golf ball, the golf ball comes to rest. The system senses that the golf ball has come to rest and is motionless because the position coordinates of the golf ball don't change. The system records this as a failed attempt by the golfer to score. The system adds up all these failed attempts plus the successful ones, and thereby keeps score of the golfer's progress during the game.

When the golf ball K2 goes into the hole K4, the lights flash on the spectator's device screen for a few moments, thereby letting the spectator know that a hole has been made. The golfer's total score, up to this point, is posted on the screen for a few moments.

All symbols for the player's and the play object appearing on the device screen can be changed at any time by the spectator. The spectator is enabled to choose different symbols by first selecting the word "menu" on the device screen in the margin; and then selecting the word "player" or "play object"; and then choosing and clicking on the word "symbol"; and then choosing and clicking on which symbol he wants from a list of symbols given. The system would work equally well if instead of GPS position locators, other generic surveillance sources were employed to capture the geographic coordinates of the players and play object. On a golf course there would be a multitude of spectators viewing their display screens on their personal smart mobile devices.

FIG. 11

Figure 11:
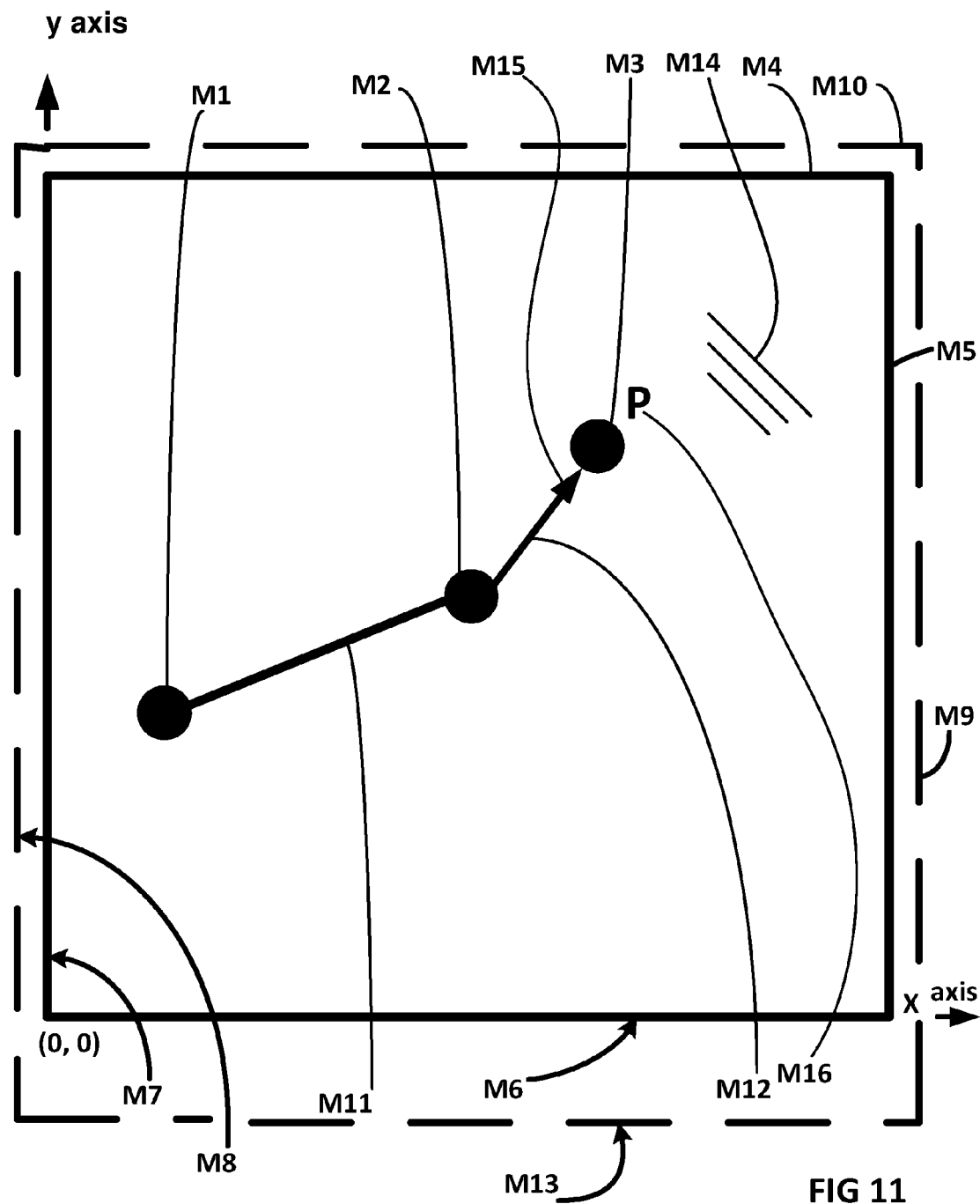
FIG. 11 shows the X-Y coordinate system of the player's and their play object's geographic coordinates superimposed on the animated boundaries of the play area as illustrated on the spectator's aide display screen. The track of a single player P is shown.

FIG. 11 shows the x-y Cartesian coordinate system of the player's and their play object's geographic coordinates superimposed on the animated boundaries of the play area as illustrated on the spectator's smart mobile device display screen. The track of a single player P is shown.

Figure 12:
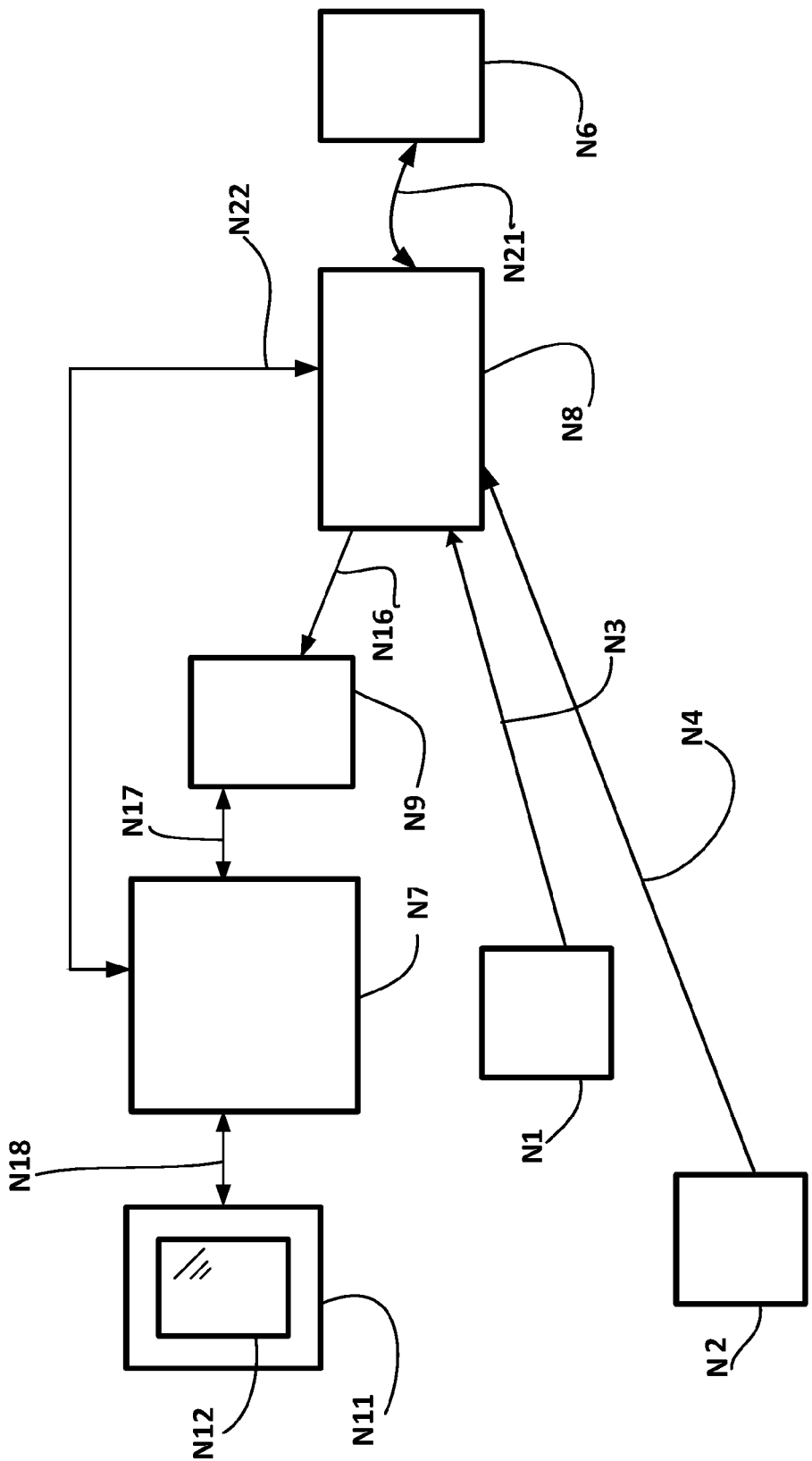
FIG. 12 shows a block diagram for a real-time animated sports entertainment system with a wireless connection to the internet for the spectator's personal smart mobile devices while using generic data sources of geographic coordinate data.

The detailed elements disclosed on the spectator's display screen shown in FIG. 12 are identified as follows:

M1 is a position coordinate p1(x1, y1) for the start of a typical track drawn on the display screen M14. M2 is a second position coordinate p2(x2, y2) for the track drawn on the display screen M14. M3 is a third position coordinate p3(x3, y3) for the track drawn on the display screen M14. M4 is an animation of the top boundary of the play area drawn as a backdrop on the display screen M14. M5 is an animation of the right boundary of the play area drawn as a backdrop on the display screen M14. M6 is an animation of the bottom boundary of the play area drawn as a backdrop on the display screen M14. M7 is the left edge of the display screen M14. M9 is the right edge of the display screen M14. M10 is the top edge of the display screen M14. M11 is an animated track line drawn on the display screen between M1 and M2. M12 is an animated track line segment drawn on the display screen between M2 and M3. M13 is the bottom edge of the display screen M14. M14 are the animated artifacts of the play area drawn on the display screen. Examples of such artifacts are play area ground color, lines, numbers, goal symbols, etc. M15 is an arrowhead pointing to M3 and pointing away from M2, and pointing along line segment M12. M16 is a letter (symbol) representing the identity of the player that made the track.

In a preferred embodiment, the symbol "P" is positioned for being pointed to by the arrowhead M15. In another preferred embodiment, the letter (symbol) P represents the player i.e. the player's number on his jersey.

The spectator's personal mobile smart device has what resembles playbook application software (i.e. an App) loaded and/or downloaded into it. The App instructs the spectator's personal mobile smart device to operate and display the player's tracks and the play object's tracks in the form of a playbook presentation. In a sports stadium there would be a multitudes of spectators viewing their display screens on their personal smart mobile devices.

The origin of the x-y Cartesian coordinate system is (0, 0). The origin (0, 0) lies at the intersection of the x axis and the y axis. The player's track is shown drawn on the device's screen. The player's track as drawn on this x-y coordinate system is represented as a sequence of: point M1, line M11, point M2, line M12, point M3, and the arrowhead at the end of line M12.

The spectator first chooses the sports venue's name and the sport being played from the pull-down menu on the display screen. The device retrieves all the play area boundary position coordinates and the play area artifacts from the system for that sport's venue. The device calculates and scales these coordinates to fit the device display screen. The device draws an animation of the play area boundaries and the play area artifacts onto the display screen. The scale of the tracks and the backdrop are made identical to one another to assure their alignment on the screen.

In this example, in order to simplify the display, the spectator chooses to track just one player P. Therefore only the player P's track will be displayed on the screen. The device will automatically zoom in at the start to a pre-determined zoom factor default setting. The zoom factor default setting calculates the scale factor needed to fit the play area boundaries and the play area artifacts animation onto the display screen with some pre-determined space in the margins for overhead spectator controls.

The spectator can choose other zoom factors to "start" with if the spectator desires. The spectator uses the pull down menu on the spectator's personal smart mobile device to make his choice.

The device will now retrieve all position coordinate data points on the play area for the spectator from the system for only player P as they occur in real time. The system wirelessly transmits a continuous stream of these real-time position coordinates for player P to the spectator's personal smart mobile device. The device processes the data and displays the points on the device display screen.

When the spectator hits "start", the device draws (plots) the player's present position on the play area which is represented as the point M1 on the device screen. The device will also write the letter P next to M1 to inform the spectator that he is tracking player M1 and that this is the start of player P's track. The device will retain point M1 drawn on the screen until the spectator tells the device to end the task by clicking "stop". The device will retain this point drawn on the screen with all subsequent points it has drawn on the screen until the spectator tells the device to end the task. Player P is initially located at position coordinate M1 on the play area. After player P moves from position coordinate M1 to position coordinate M2 on the play area, the device draws the point M2 on the device screen. After player P moves from position coordinate M1 to position coordinate M2, the device automatically draws a line M11 on the screen between M1 and M2. The device will retain this line on the screen with all subsequent lines it has drawn on the screen until the spectator tells the device to end the task. The device will now write the letter P next to M2 and erase the previous letter P it wrote next to M1. The device now draws an arrowhead on the end of the line between M1 and M2, where the arrowhead points to M2. (This arrowhead is not shown in FIG. 11 in order to reduce the clutter.)

Now player P moves from position coordinate M2 to position coordinate M3 on the play area. After player P moves from position coordinate M2 to position coordinate M3 on the play area, the device draws the point M3 onto the device screen. After player P moves from position coordinate M2 to position coordinate M3, the device automatically draws a line M12 on the screen between M2 and M3. The device will now write the letter P next to M3 and erase the previous letter P it wrote next to M2.

If the player now stops his movement on the play area as shown in this example, his position coordinate M3 will not change. The device continues to retrieve all position coordinate data points for player P as they occur in real time even though player P has become motionless at M3. The device calculates that player P has remained motionless for a predetermined time interval. The device now draws an arrowhead on the end of the line between M2 and M3, where the arrowhead points to M3. This arrowhead is to inform the spectator of the direction of the player's last motion. The device will retain this arrowhead on the screen until the spectator tells the device to end the task. The device now erases the arrowhead on the end of the line between M1 and M2.

As time passes, all subsequent coordinate data points (x, y) retrieved after player P has reached M3 will be the same as M3 because the player P is motionless at M3. The device will continue to draw and refresh M3.

When the spectator decides to end the task, he will hit "stop". The device will freeze the contents on the screen. The device erases the player's track from the screen when the spectator clicks "erase". The animated boundaries M4, M5, M6 and M7 of the play area drawn as a backdrop on the display screen will remain on the screen along with any play area artifacts M14.

All symbols shown are examples, and can be replaced with others. Each player's number on his jersey is shown in a circle in FIG. 11.

Each generic source of position coordinates for the players identifies the player with the player's jersey number encoded into its wireless signal. Each generic source of position coordinates for the play objects identifies the play objects with the serial number of the play objects encoded into its wireless signal. In addition, an identifier for the play area is encoded into the player's and play object's wireless signal. Furthermore, an identifier for the sport's venue, an identifier for the date, and an identifier for the time is encoded into the player's and play object's wireless signal.

Consider a player within the boundaries M4, M5, M6 and M7 of the animated play area backdrop displayed on the spectator's screen. Let the player move from point p1 to point p2 within the animated play area backdrop on the spectator's screen in a time interval dt. Therefore p1 and p2 represent two time consecutive contiguous geographic coordinate points on the player's path in the sports venue's play area. Let the coordinates of p1 be (x1, y1) and the coordinates of p2 be (x2, y2) on the spectator's screen. Then p1 can be represented as p1(x1, y1) and p2 can be represented as p2(x2, y2).

Then the distance Ds along the path between p1 and p2 that the player travels on the spectator's screen in the time interval dt is:

$$Ds = ((x2-x1)^2 + (y2-y^2))^{1/2}$$

Whereas, the actual distance that the player travels on the sports venue's play area is:

$$Dp = ((X2-X1)^2 + (Y2-Y1)^2)^{1/2}$$

where the player travels between geographic coordinates P1(X1, Y1) and P2(X2, Y2) on the play area.

In order to show p1 and p2 on the device screen of the spectator's personal smart mobile device, the distance between p1 and p2 must be scaled down in order to make the distance between them fit on the screen. Therefore a scale factor must be chosen. Therefore, in a preferred embodiment, the system must calculate the scale factor.

In a preferred embodiment the scale factor S is set equal to the device screen's diagonal dimension divided by the sports venue's play area's diagonal dimension. Using such a scale factor, we can fill the screen with an animated backdrop rendering of the entire play area showing the boundaries and artifacts of the play area.

The scale factor S between Ds and Dp is then given by:

$$S = Ds/Dp = ((x2-x1)^2 + (y2-y^1)^2)^{1/2} / ((X2-X1)^2 + (Y2-Y1)^2)^{1/2}$$

In a preferred embodiment, in order to show a smooth track on the screen we fill the spaces between the coordinate points, for example p1 and p2, on the screen with straight line segments 11. As an example, the length of the line segment 11 on the spectator's screen between p1 and p2 is given by:

$$Ds = ((x2-x1)^2 + (y2-y1)^2)^{1/2}$$

Therefore the slope M of the straight line segment displayed on the screen between p1 and p2 is:

$$M = (y2-y1)/(x2-x1)$$

In a preferred embodiment, we enable the spectator to zoom in on any specific player's track. The player's track is shown on an animated backdrop of the play area's familiar artifacts to orientate the spectator to the player's location on the play area. The purpose for giving the spectator this facility is to enable the spectator to clearly see the details of what any player is doing and where he is doing it. This facility enables the spectator to get closer to the chosen player on the screen. The details of what a specific player is doing would otherwise be difficult for the spectator to see on a small screen without zooming, if the screen for example were filled with the entire play area.

Therefore, in a preferred embodiment, the system must calculate the zoom scale factor required for the specific player chosen by the spectator. In a preferred embodiment, the spectator first uses the pull down menu. The spectator then selects the player's identifying number and hits enter. The system now takes any new incoming position coordinate point data from that instant and plots (i.e. draws) those coordinate points on the device screen. The first position coordinate point that the system sees is the beginning of the player's track and the player's starting point. The player's track will typically grow longer from that time onward and away from the player's starting position coordinate point. The system continuously calculates the length of the player's track.

In a preferred embodiment, the system slowly zooms out and away as the length of the player's track grows in length. This is to accommodate the increased track length on the screen. As before, the player's track is shown on a backdrop of the play area's familiar artifacts to orientate the spectator to the player's location on the play area. As the system slowly zooms out and away, the play area covered by the backdrop will widen. In a preferred embodiment, if the player elects to connect the player's position coordinate points along his track with straight line segments, the system will respond accordingly and do so.

In a preferred embodiment, we enable the spectator to zoom in on the play object's track. The process will be similar to the process used above for the player. Also, the play object's track will be shown on the backdrop of the play area's familiar artifacts to orientate the spectator to the play object's location on the play area in the same way as with the player's track.

Let Z be equal to the required zoom scale factor to enable the spectator to zoom in on any specific player's track. We do not want to zoom in too tightly at first if we believe that the tracks will grow very quickly. If we zoom in too tight, we would have to zoom away very quickly as the tracks grow quickly. In a preferred embodiment, as a compromise the system looks at the data base of historic tracks made by that player. The system calculates an average track length for the player using the track lengths of his most recent plays. Using the calculated average track length, the system calculates the zoom scale factor Z needed to fill the screen with the length of the average track.

In another preferred embodiment, the system looks at the data base of historic tracks made by that player using the track lengths of his most recent plays, and calculates an average track length rate of growth. This is the average velocity of the player. The system also calculates the average play time using the play times of his most recent plays.

Then, using the calculated average velocity of the player and the calculated average play time, the system calculates an average track length for the player by multiplying the two together. Using this calculated average track length, the system calculates the zoom scale factor Z needed to fill the screen with the length of the average track length.

Therefore, given a zoom factor Z and the scale factor S, the length of the track Dz between p1 and p2 displayed on the screen is:

$$Dz = Z \cdot S \cdot ((x2-x1)^2 + (y2-y1)^2)^{1/2}$$

Assume for simplicity and for purposes of illustration that the time intervals dt between coordinates are short and of equal length. Then assume that the players change direction as they move from coordinate to coordinate. Assume for realism that the players constantly accelerate and decelerate as they move.

If the average time for a play is T, then $n = T/dt$ where $n$ is the average number of coordinate points along a track.

If the x acceleration of the player can be written as Ax(t), and the y acceleration can be written as Ay(t), then the distances the players move in the play area during a time interval dt can be written as:

Distance moved in the x-direction=½Ax(t)·dt²

Distance moved in the y-direction=½Ay(t)·dt²

If the sports venue's play area lies in an X-Y plane of mathematical position coordinate points, then, any player position Pp or play object position Po on the sports venue's play area can be described as:

$Pp(X,Y)$ and $Po(X,Y)$ respectively

If the spectator's personal smart mobile device screen lie in an x-y plane of mathematical coordinate points, then, any player position pp or play object position po on the animated backdrop of the play area on the device screen can be described as:

$pp(x,y)$ and $po(x,y)$ respectively

Let S be an alternative scaling factor between the sports venue's play area dimensions (from the data base) and the device screen dimensions (from the data base); note that S<<1.0 in order to reduce the size of the play area to fit the device screen.

Then let the value of S be such that the size of the full animated backdrop play area fits on the device screen with allowance for some overhead in the margins for spectator control buttons. Then S is given by:

S=device screen dimensions/sports venue's play area dimensions

Assume now that a spectator chooses to zoom in on the tracks of a particular player such that the tracks of the player fill the screen (less the overhead required for the margins). Assume that the zoom scale factor to do this is Z. The system knows the player's track length without zooming from start to finish. The system also knows the spectator's screen dimensions. Then knowing the screen dimensions and the track length dimensions without zooming, the system calculates Z as:

Z=spectator's smart mobile device's screen dimensions/track length dimensions without zooming.

FIG. 12

FIG. 12 shows a block diagram for a real-time animated sports entertainment system with a wireless connection to the internet for the spectator's personal smart mobile devices while using generic sources of geographic coordinate data.

The detailed physical elements disclosed in the drawing shown in FIG. 12 are identified as follows: N1 is a generic source for each and every player's real time geographic coordinates on the play area during a game. N2 is a generic source for the play object's real time geographic coordinates on the play area during a game. The generic source is essentially a surveillance system for capturing the geographic coordinates of the players and the play object on the play area. N3 is the signal from N1 transmitted to a wireless application service provider (WASP) N7. The signal N3 is encoded with the position coordinates of the players on the play area. N4 is the signal from N2 transmitted to a wireless application service provider (WASP) N7. The signal is encoded with the position coordinates of the play object on the play area. N5 (is not shown). N6 is a laptop administrative PC terminal operated by the venue's field service personnel which is the human interface to the WASP N8 to operate the system. N7 is the internet service provider to the sport's venue. The internet service provider carries the inbound and outbound internet traffic from/to the outside world. In one preferred embodiment, the App is downloaded into N11 from N7.

N8 is a wireless application service provider (WASP). N8 receives encoded signals from N1 and N2. N8 is comprised of at least one CPU that muxes (i.e. multiplexes) the position coordinate data from all the player's and the play object's position coordinates into a single data stream of position coordinates. The CPU creates a master file for each sports event comprised of all of the real time and historical position coordinates of all the players and play objects during a game. The single data stream of position coordinates is derived from this master file. The single data stream of position coordinates is fed into N9 from N8. N8 has software algorithms installed within it to process the incoming data streams (i.e. generic source data packets) to reduce the position coordinates it receives from N3 and N4 to coordinates referenced to the play area on the display screen. The coordinates of the boundaries of the play area have been pre-programmed into N8.

In a preferred embodiment, the sports venue play area boundary coordinates are furnished to N8 from N7 via N22 from a play area data base on the internet via N7. The play area data base contains all the coordinates of all the current play area boundaries in all and every sport's venue.

In yet another preferred embodiment, GPS position encoders are disposed along each of the sports venue's play area boundaries. GPS position coordinate data from these position encoders is transmitted wirelessly or by cable to N8 where the data is processed.

N9 is a public web server for the sport's venue. N9 is comprised of a computer. N9 takes the single data stream of position coordinates derived from the master file created by N8 and hands it off to the internet service provider N7 for dissemination to the spectators at the sport's venue i.e. the stadium;

For example, in a sports stadium there would be a multitudes of spectators viewing their display screens on their personal smart mobile devices. N9 also hands the single data stream of position coordinates off to remote spectators by way of N7. In another preferred embodiment, the App is downloaded from N9 into N11 via N7. N10 (is not shown).

N11 is a typical spectator's device (aide). N11 is the spectator's personal mobile smart device that has what resembles playbook application software (i.e. the APP)

downloaded into it. The App is complex software that operates all the operations of the spectator's personal mobile smart device N11 including the display. N12 is the display screen of N11. N13 (is not shown). N14 (is not shown). N15 (is not shown). N16 is a unidirectional data communication link from N8 to N9 carrying a continuous single data stream of real-time position coordinates of the players and play object on the play area. N16 is a hard wired and/or a wireless link. Hard wiring is superior for performance and reliability. N17 is a bi-directional data communication link between N7 and N9. N17 carries the single data stream of position coordinates from N9 to N7. N17 also carries internet traffic from N7 to N9. N17 is comprised of internet traffic from and to the outside world. N17 is hard wired for performance and reliability.

N18 is a bi-directional data communication link between N7 and N11. In one preferred embodiment, N18 is configured with a broadband tower i.e. cell tower and/or an orbiting geostationary satellite. N18 carries internet traffic from N7 to N11. N18 carries internet traffic from the outside world. N18 is wireless for personal smart mobile spectator devices. Link N18 can take the form of any communication medium that the smart mobile device can talk to. For example, in one preferred embodiment, link N18 is wireless. In another preferred embodiment, link N18 is the internet. In yet another preferred embodiment, link N18 is WIFI. In still another preferred embodiment, link N18 is a LAN.

N19 (is not shown). N20 (is not shown). N21 is a bi-directional data communication link between N6 and N8. It carries administrative commands from N6 to N8, and human interface data from N8 for display on N6. For example, the battery life remaining on the GPS encoders. In general, N6 interrogates the GPS encoders N3 and N4 for their functional status. N21 is an important factor in servicing the field equipment. N21 is hard wired for performance and reliability. N22 is a bi-directional data communication link between N7 and N8. It carries the play area boundary coordinates from N7 to N8. N22 is hard wired for performance and reliability.

Each generic source of position coordinates for the players N1 identifies the player with the player's jersey number encoded into its wireless signal N3. Each generic source of position coordinates for the play objects N2 identifies the play objects with the serial number of the play objects encoded into its wireless signal N4. In addition, an identifier for the play area is encoded into the player's and play object's wireless signal. Furthermore, an identifier for the sport's venue, an identifier for the date, and an identifier for the time is encoded into the player's and play object's wireless signal to the WASP N8.

The system shown is an entertainment aide for sports spectators. It is also a work aide for sport's casters and coaches. It utilizes a real-time animated sports playbook screen display controlled by an App. The spectator's personal mobile smart device has playbook application software (i.e. an App) loaded and/or downloaded into it. The App instructs the spectator's personal mobile smart device to operate and display the player's tracks and the play object's tracks in the form of a playbook presentation. In the present invention we use the word "playbook" in a different way than it is used traditionally. In sports traditionally, the typical use of the word "playbook" means a book describing plays that a player or team may run in games. The playbook is traditionally a plan defining predetermined actions worked out ahead of time. In the present invention we use the word "playbook" to mean the tracks that the players and teams and play objects are playing now in real time; and the tracks that the players and teams and play objects have actually historically already performed. The tracks are displayed on a backdrop. The backdrop is an animated rendering of the play area. The backdrop provides the spectator with a visualization of where the players and play objects (i.e. their tracks) are on the play area. In the present invention, the tracks are a visualization of the actual real time paths that the players and play objects are making as they move and change positions on the play area; as well as the historical paths that the players and play objects have made as they moved and changed positions on the play area. The tracks in the present invention are visualizations of the actual geographic movements on the play area of the players and the play object. In the present invention, the tracks help the spectators understand what is actually happening on the play area, despite all the clutter. For example, even though many players may have landed on top of a football, thereby making the location of the football invisible to the spectators, the spectators using the present invention will still see the position of the football on the play area on their screens. This is due to the fact that light waves reflected from the football cannot pass through the players to the spectators, whereas radio waves from the GPS locator inside the football can pass through the players to the WASP.

The playbook in the present invention is similar to the traditional playbook in some ways however. They both present the players and play object using a diagram of colored lines and symbols against a backdrop or background of a rendering of the play area and its artifacts. For example, they both can use x's, o's, squares and triangular symbols.

The primary functional difference between the systems shown in FIG. 12 and FIG. 2 is that N11 talks directly to the internet via N7 in FIG. 12.

In this preferred embodiment, the position coordinates of the players and their play objects on a play area come from any available generic sources using prior art technologies, including prior art geographic systems.

The geographic coordinates of the players and play objects are processed at N8 to create a display of their movements as tracks on a common screen N12; wherein the tracks are aligned against a simulated play area backdrop comprised of boundaries and artifacts. In a preferred embodiment, the present invention uses the coordinate data derived from available generic prior art systems.

The system architecture disclosed in the present invention minimizes the time delay between when action occurs on the play area and when the tracks are displayed on the screen. The architectural configuration of the present invention is streamlined so that it is fast with low latency of no more than a few milliseconds. This assumes a viable low latency internet. The system displays tracks to the spectators at the sport's venue with latency so short that the tracks appear to occur in real time synchronized with the actual action on the play area. By looking at a player's tracks, spectators at the sport's venue will be able to quickly tell where a player is on the play area relative to the other players and the play object. By looking at a player's tracks, the spectators at the sport's venue will be able to quickly tell how a player is maneuvering on the play area relative to the other players and the play object.

The system shown is an entertainment aide for sports spectators. It is also a work aide for sport's casters and coaches. It utilizes a real-time animated sports playbook screen display form controlled by an App.

The primary functional difference between the systems shown in FIG. 1 and FIG. 2, is that the FIG. 2 position coordinates of the players and their play objects on a play area come from any available generic sources which may or may not include GPS encoders carried by the players and play object.

In this preferred embodiment, the position coordinates of the players and their play objects on a play area come from available generic sources using prior art technologies, including prior art geographic systems.

The position coordinates of the players and play objects are processed at N8 to create a display of their movements as tracks on a common screen N12; wherein the tracks are aligned against a simulated play area backdrop comprised of boundaries and artifacts. In a preferred embodiment, the present invention uses the coordinate data derived from available generic prior art systems.

The system architecture disclosed in the present invention minimizes the time delay between when action occurs on the play area and when the tracks are displayed on the screen. The architectural configuration of the present invention is streamlined so that it is fast with low latency of no more than a few milliseconds. The system displays tracks to the spectators at the sport's venue with latency so short that the tracks appear to occur in real time synchronized with the actual action on the play area. By looking at a player's tracks, spectators at the sport's venue will be able to quickly tell where a player is on the play area relative to the other players and the play object. By looking at a player's tracks, the spectators at the sport's venue will be able to quickly tell how a player is maneuvering on the play area relative to the other players and the play object.

The system calculates when the action starts and stops. The spectator's devices continuously receive encoded real-time location coordinate data derived from generic sources for each of the players in the play area and play object's real-time location coordinate data derived from generic sources. The position coordinates for the players and for the play objects change when the action starts. The system is configured to calculate these changes. The geographic coordinates of the players are invariant when the players are motionless. The geographic coordinates of the play objects are invariant when the players are motionless.

The generic sources of the geographic coordinates of the play object's location on the play area and the player's location on the play area output wireless and/or hard wired signals encoding the geographic coordinates of the play object's and player's movements and subsequent location changes continuously. The encoded geographic coordinate data stream carries the serial number of the play object and the jersey number of the players. The serial numbers and the jersey numbers identify the play object and players to the App contained in the mobile device receiving the encoded geographic coordinate data stream.

This serial number and jersey number identify the player's and play objects to the App contained in the mobile device receiving the encoded geographic coordinate data stream. The spectators seated in a sports stadium can use the stadium's WIFI system to receive the player's real-time geographic coordinate location data. The spectators seated in a sports stadium use the stadium's WIFI system to receive the real-time encoded geographic coordinate location data from each of the players and play objects in the play area.

The play object in the play area has a distinguishing electronic serial number to identify it to the system. This serial number is used by the app to separately process the location data received from the play object in the play area and to distinguish the play object's track data from other play objects that are not in the playing area. The play object's track is created on the screen by instructions from the App to the aide's CPU for the spectators to see. The play object's track seen on the screen by the spectators has a beginning and an end. Most often the tracks resemble a curved freeform line. The freeform line traces the path that the play objects take during the time interval chosen by the spectator separating the beginning and the end of the track. The length of the freeform line becomes progressively longer on the screen as the play object moves from place to place in the play area. Some tracks are designated with distinguishing colors which are spectator selectable so the tracks may be told apart from any neighboring tracks to avoid confusion. The spectator can start the play object's track whenever the spectator wishes by selecting his choice from a pull down menu. The spectator can stop the play object's track whenever the spectator wishes by clicking "stop" in the margin of the screen.

The jersey number is used by the App to separately process the location data received from each player on the play area and to distinguish the player's track data from other player's track data that are not in the playing area. The player's track is created on the screen by instructions from the App to the aide's CPU for the spectators to see. Each player's track seen on the screen has a beginning and an end. Most often the tracks resemble a curved freeform line. Each freeform line traces the path that each of the players takes in the play area during the chosen time interval separating the beginning and the end of the track. Some tracks may be designated with distinguishing colors which are spectator selectable so that they may be told apart from other player's neighboring tracks to avoid confusion. The spectator can start the player's tracks whenever the spectator wishes by selecting "start" in the margin of the screen. The spectator can stop the player's tracks whenever the spectator wishes by selecting "stop" in the margin of the screen.

Some spectator's have a television device. The television device can receive both wireless and hard wired signals. Some spectators have a computer device. The computer device can receive both wireless and hard wired signals. The mobile device has a display screen. The television device has a display screen. The computer device has a display screen. The spectator views the progress of a sports game on the display screen.

Many sport's games are complex and involved. Many games involve fast action plays. Many games involve multiple players. Most games involve a play object. Some play objects move quickly in the play area and some move slowly during different time intervals of the game. Some players move more quickly in the play area and some move more slowly during different time intervals of the game. Typical play objects in such games are golf balls, ice hockey pucks, tennis balls, baseballs, softballs, footballs, soccer balls, volleyballs and basketballs. Typical complex sports that have intervals of fast action plays are football, baseball, softball, tennis, ice hockey, volleyball, soccer and basketball.

Many of these fast action plays occur over short periods of time. Play objects typically move quickly from place to place in the play area. Players typically move quickly from place to place in the play area. Some plays are intricate and difficult for the spectators to see. Following the progression of events during a game is sometimes very challenging. The play object moves quickly from place to place in the play area and it is sometimes difficult for the spectators to determine its whereabouts. The players move quickly from place to place in the play area and it is sometimes difficult for the spectators to determine their whereabouts. To say the least, keeping track of the motions of the play object and the motions of the players during an action sequence is a challenge to many spectators and leads to increased excitement in the game. Spectators often wonder who (which player) did what, and who (which player) went where? Spectators often wonder where the play object is.

An important value of the present invention is that it sees through all the clutter and accurately follows the whereabouts of the play object and the players. This is especially true in the game of football. In order to help identify the players, the players typically wear a jersey or shirt. The jersey typically has an identifying color signifying the player's team. This helps the spectators to track a player's movements in the play area; particularly the players on the teams that they like.

Additionally, the players typically wear an identifying number on their jerseys. These numbers are typically made large enough so the spectators can tell who is who during a multi-player game. These identifying numbers are difficult for some spectators with poor vision to see at a distance and under varying weather conditions like rain and snow. Some spectators frequently use optical aides such as binoculars to overcome these difficulties.

A means would be useful to the users wherein the track of each player had an identifying symbol representing the number on the player's jersey. A means would be useful to the spectators wherein the track of the play object had an identifying symbol representing the play object to discern it from the player's tracks. A means would be useful to the users wherein each track of each player had an identifying graphical symbol showing the direction of motion of that player on his track. An example of such a symbol is an arrowhead pointing in the direction of motion of the player in the play area. A means would be useful to the users wherein the track of the play object had an identifying graphical symbol showing the direction of motion of the play object in the play area. An example of such a symbol is an arrowhead pointing in the direction of motion of the play object in the play area. A means would be useful to the users wherein the track of the play object and the tracks of each and all of the players were displayed together simultaneously. This is especially useful in displaying the interaction of the players with the play object.

Spectators sometimes have problems locating the play object during a play. Being able to view the track of the play object amongst the player's tracks, moment to moment, would help spectators overcome this problem. It would also clarify to the spectators where the play object is at any one time. This would help the spectators understand which player is doing what with the play object. It would also help spectators understand how and why which players are interacting with one another.

A means would be useful to the users wherein the combined tracks of the play object and the players were displayed together simultaneously on the mobile device screen. A means would be useful to the users wherein the combined tracks of the play object and the players were displayed together simultaneously on the mobile device screen against a graphical background representing boundaries of the play area. The App is pre-loaded with the geographic coordinates of the boundaries of the play area.

When a play object leaves the play area for example, the App raises a flag. When a play object leaves the play area, for example, this feature would help resolve issues arising from foul balls.

A means would be useful to the users wherein the combined tracks of the play object and the players were displayed on the mobile device screen against a graphical background representing the boundaries of play area. A means would be useful to the users wherein the track of the play object had an identifying symbol representing the play object to discern it from the player's tracks.

In a game like football for example, the football is held, carried or passed.

It is sometimes difficult for some of the spectators who do not have a good vantage point in the stadium stands to see who has the ball or where the ball is. Some spectators use binoculars to overcome these difficulties.

A means would be useful to the users for them to be able to keep track of each of the players on the play area as the sports game progresses. A means would be useful to the users for them to be able to keep track of the play object on the play area as the sports game progresses. A means would be useful to the users for them to simultaneously be able to see the player's name on the screen near to their identifying number. A means would be useful to the users for them to be able to keep track of each of the play object on the play area as the sports game progresses. Such a means would be especially useful to the users if it was lightweight, small and easy to use. Such a means would be especially useful to the users if it automatically tracked the progress of the game without the need for the users to use their hands (to keep their hands free to eat hot dogs and drink beer for example). Such a means would be especially useful to the users if each of the players left an identifying track on the display screen which the player created in real time as the player moved in the play area. Such a means would be additionally especially useful to the users if the play object simultaneously left an identifying track on the same display screen which the play object created in real time as the play object moved in the play area. Such a means would be especially useful to the users if each of the tracks of each of the players and could be zoomed-in on to reduce the clutter of overlapping and neighboring tracks Such a means would be especially useful to the users if the tracks of the play object could be zoomed-in on to reduce the clutter of overlapping and neighboring tracks.

A player's tracks are created by linking a series of each player's contiguous GPS location data point coordinates with lines where necessary to achieve a visually smooth track. Each player's track grows in length on the screen as the player moves in the playing area from place to place. The play object's track grows in length on the screen as the play object moves in the playing area from place to place. The play object's track is created by linking a series of the play object's contiguous GPS location data point coordinates with lines where necessary to achieve a visually smooth track where necessary. The spectators are frequently at the sport's venue viewing the sports game from the stands. Stadiums and arenas are typical sports venues for the sports gaming events. The play areas in these venues are typically playing fields, rinks, and courts The display screen gives the spectators a method by which they can keep track of the progress of a sports game more clearly than they could otherwise. The users look at their mobile device screen to track the motions of the players and the play object as each moves on the play area. The spectators use their mobile device to track the progress of the game. Many spectators view the game from home. They observe the game from a computer screen or television screen. The spectator's device screen displays the tracks of each of the players. The spectator's device screen displays the track of the play object.

The system shows the track of the play object as it develops over time as it moves. The system shows the track of each of the players as it develops over time as the players move.

Each player creates a track. Each track has a symbol identifying and representing the player. Each play object creates its own track. Each track has a symbol identifying and representing the play object. The length of the track created by each player grows as he moves. Each play object creates a track. The length of the track created by the play object grows as it moves. The system shows the track as it is developing in real-time wherein the track has a symbol identifying the player moving at the leading end of the track. The system shows the track as it is developing in real-time wherein the track has a symbol identifying the play object moving at the leading end of the track. The system shows the track of the player whether he be moving or motionless. The system shows the track of the play object whether it be moving or motionless. If the play object is motionless, its position coordinates remain unchanged. If a player is motionless, his position coordinates remain unchanged. The scale of the tracks and the backdrop are made identical to one another to assure their alignment on the screen.

FIG. 13

Figure 13:
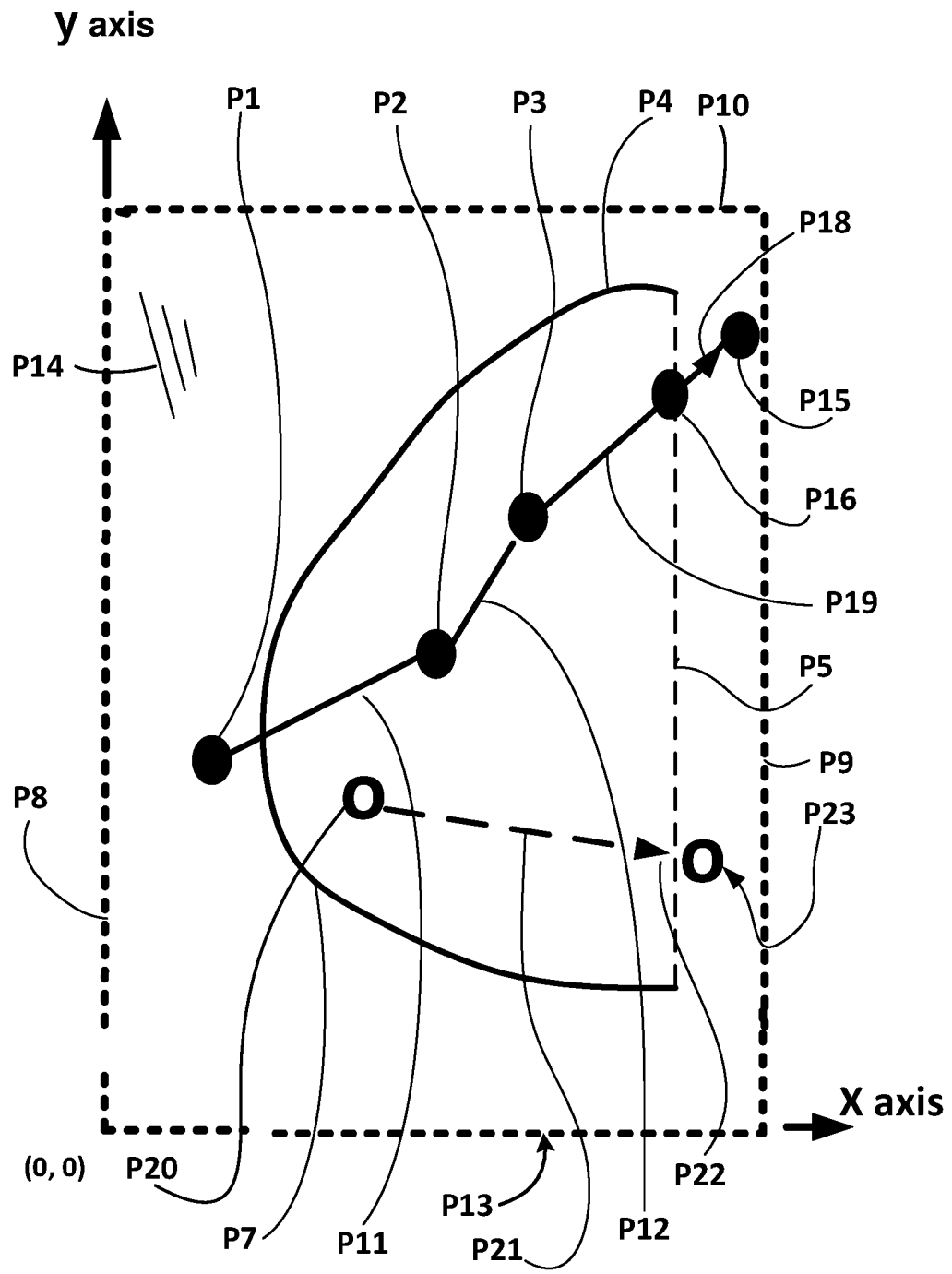
FIG. 13 shows the X—Y coordinate system of the player's and their play object's geographic coordinates on the play area presented superimposed on the animated boundaries of the play area as illustrated on the spectator's aide display screen, with the scoring zone shown.

FIG. 13 shows the x-y Cartesian coordinate system of the player's and their play object's geographic coordinates on the play area presented superimposed on the animated boundaries of the play area as illustrated on the spectator's aide display screen, with the scoring zone shown for the play object.

The detailed elements disclosed on the spectator's display screen shown in FIG. 13 are identified as follows:

P1 is a position coordinate p1(x1, y1) for the start of a typical track drawn on the display screen P14. In this example the track for the play object begins in the foul zone P2 is a second position coordinate p2(x2, y2) for the track drawn on the display screen P14. P3 is a third position coordinate p3(x3, y3) for the track drawn on the display screen P14. P4 is an animation of the top boundary of the play area drawn as a backdrop on the display screen P14. P4 is also known as the out of play zone or the foul zone. P5 is an animation of the right boundary of the play area drawn as a backdrop on the display screen P14. P5 is also a scoring zone for the play object on the boundary of the play area. P6 (is not shown). P7 is an animation of the lower boundary of the play area drawn as a backdrop on the display screen P14. P7 is also known as the out of play zone or the foul zone. P8 is the left edge of the display screen P14. P9 is the right edge of the display screen P14. P10 is the top edge of the display screen P14. P11 is an animated track line drawn on the display screen between P1 and P2. P12 is an animated track line drawn on the display screen between P2 and P3. P13 is the bottom edge of the display screen P14. P14 is the surface of the display screen. P15 is a fourth position coordinate p4(x4, y4) for the track drawn on the display screen P14. P16 is a fifth position coordinate p5(x5, y5) for the track drawn on the display screen P14. The track of the play object at position coordinate p5(x5, y5) has crossed over the scoring zone of P5 on the play area boundary. P17 (is not shown). P18 is an animated track line drawn on the display screen between P16 and P15. P19 is an animated track line drawn on the display screen between P3 and P16. P20 is the start of a track for a play object. In a preferred embodiment, the track begins an ends as an open dot i.e. an "O", to distinguish it from a solid dot used for players.

P21 is the path of the play object. In a preferred embodiment, the path is animated as a dashed or broken line to distinguish it from the path of a player i.e. like P19 for example. P21 joins P20 and P23. P22 is an arrowhead pointing away from P20, and pointing toward P23. The arrowhead represents the direction of forward motion of the play object. P23 is the end of the play object's track, and in a preferred embodiment, is an open dot i.e. an "O", to distinguish it from a solid dot used for the players.

The spectator's personal mobile smart device has what resembles playbook application software (i.e. an App) loaded and/or downloaded into it. The App instructs the spectator's personal mobile smart device to operate and display the player's tracks and the play object's tracks in the form of a playbook presentation. The App is complex software that operates all the operations of the spectator's smart mobile device including the display. For example, the App controls all the data transfers into and out of the spectator's smart mobile device. It controls the movement of data into and out of the CPU's memory. It provides instructions to the CPU to operate the system. It takes control of the system.

In yet another preferred embodiment, the player's tracks have finite length on the screen, and consist of a series of sequential points on the screen. The points have pre-determined finite diameters and are uniform in size. The points represent geographic coordinate points or physical locations of the players and play objects on the play area from moment to moment. The points appear in chronological order on the track. The points, i.e. each pair of chronologically adjacent points, are joined with straight lines of pre-determined finite width in order to give the tracks a smooth aesthetic appearance. The points are colored in order for the spectators to distinguish tracks from one another, i.e. particularly adjacent tracks. The lines are colored in order for the spectators to distinguish tracks from one another, i.e. particularly adjacent tracks. There is an arrowhead at the end of the last line on the track. The arrowhead points to the last chronological point on the track. The arrowhead points in the direction of forward motion of the player or play object. A colored symbol is positioned outside the end of the track. The arrowhead points to the symbol. The symbol identifies each of the players of play objects from one another. In the event that the space at the end of the track is too congested, the symbol is positioned to a less dense area as close to the end of the track as possible. In another preferred embodiment, the play object's tracks are displayed as dashed or broken lines on the screen to distinguish the play objects from the player's tracks. The dashed or broken lines have finite pre-determined width and have colored arrowheads at their forward end pointing in the direction of forward motion of the play object. In a preferred embodiment, the App instructs the display to modify the color of the points, lines and arrowheads after the track is completed in order to optimize the colors to distinguish the tracks from one another, especially in areas where there is dense activity on the play area causing the tracks to be close to one another. The spectator is given an option as to whether he or she wants to activate this feature.

In the present invention we use the word "playbook" in a different way than it is used traditionally. In sports traditionally, the typical use of the word "playbook" means a book describing plays that a player or team may run in games. The playbook is traditionally a plan defining predetermined actions worked out ahead of time. In the present invention we use the word "playbook" to mean the tracks that the players and teams and play objects are playing now in real time; and the tracks that the players and teams and play objects have actually historically already performed. In the present invention, the tracks are the actual real time paths that the players and play objects are making as they move and change positions on the play area; as well as the historical paths that the players and play objects have made as they moved and changed positions on the play area. The tracks in the present invention are visualizations of the actual geographic movements on the play area of the players and the play object. The tracks are a series of sequential visual points on the screen of the smart mobile device. The gap between the adjacent points is filled with a visible straight line. The points are connected via straight lines to smooth out the tracks.

In the present invention, the tracks help the spectators understand what is actually happening on the play area, despite all the clutter. For example, even though many players may have landed on top of a football, thereby making the location of the football invisible to the spectators, the spectators using the present invention will still see the position of the football on the play area on their screens. This is due to the fact that light waves reflected from the football cannot pass through the players to the spectators for them to see the football ie the use of light waves has limitations in complex game situations, whereas radio waves from the GPS locator inside the football can pass through the players to the to the generic resource and be displayed as tracks to the spectator. In a sports stadium there would be a multitudes of spectators viewing their display screens on their personal smart mobile devices in order to unravel complex game situations.

The playbook in the present invention is similar to the traditional playbook in some ways however. They both present the players and play object using a diagram of colored lines and symbols against a backdrop or background of a rendering of the play area and its artifacts. For example, they both can use x's, o's squares and triangular symbols. The scale of the tracks and the backdrop are made identical to one another to assure their alignment on the screen.

The origin of the x-y Cartesian coordinate system is (0, 0). The origin (0, 0) lies at the intersection of the x axis and the y axis in the plane of the screen.

The track of the play object in this example begins in the foul zone at P1, and ends in the scoring zone at P15. The play object's track in this example has five position coordinate points shown for the duration of its movements. The five position coordinate points are joined with four straight line segments to smooth out the track. There is an arrowhead on the end of line segment P18 showing the spectator the direction of the play object between P15 and P16. The play area boundary scoring zone is P5 in this example. This play area boundary scoring zone for the play object would be appropriate for a game like baseball for example. In baseball, the right field fence line and the center field fence line and the left field fence line are the scoring boundaries. If the play object i.e. the baseball goes over the fence line, a home run is scored.

The play areas have physical geographic boundaries given by their geographic position coordinates. The play areas also have visible artifacts like for example lines, circles, symbols and numbers. The location of these artifacts is also be given by their geographic position coordinates. The scoring zone P5 physical geographic boundaries given by their geographic position coordinates. The fouling zones P4 and P7 have physical geographic boundaries given by their geographic position coordinates.

In games like ice hockey however, the scoring goal nets lay within the play area boundaries. Therefore, the position coordinates of the two goal nets identify the scoring zones for ice hockey. Each different type of game has its own scoring zones. Similarly, each type of game has its own foul zones.

The spectator's personal smart mobile device is continually making a comparison between the points on the play object's track and the coordinates of the scoring zone on the play area boundary. The system has in its data base the coordinates of all the scoring zones of all the play areas in all the sport's venues. Since P16 is on the scoring zone boundary P5, the system calculates that the play object has scored.

In a preferred embodiment, the screen will light up for a few moments with the word "score" notifying the spectator that the team in control (i.e. possession) of the play object has scored. The system knows which player or team has scored by looking at the serial number of the scoring play object making the track and the number of the scoring player. If the position coordinates of the player and the play object coincide for a pre-determined interval of time before the play object enters the scoring zone, the player is credited with the score. The player is assumed to have had control of the play object causing it to score. The device calculates that the coincidence of position coordinates for the player and the play object over the pre-determined interval of time means that the player and the play object have been moving together. This is a necessary condition for control of the play object by the player. For example, if the player and the play object have position coordinate P2 followed by P3, it is assumed by the spectator's device that the player had moved with the play object from P2 to P3 together and then caused the play object to score at P16.

If the play object has a track that goes outside of P4 and P7, the device knows that the play object has gone out of bounds and may be considered to have gone foul. If the device considers that the play object has gone foul, the device screen will light up for a few moments with the word "foul" notifying the spectator that the team in control (i.e. in possession) of the play object has fouled. As before, the device knows which player or team has fouled by looking at the serial number of the fouling play object making the track and who was in control of the play object just before the play object went into foul territory.

Each of the position coordinates on the play area for the players identifies the player with the player's jersey number encoded into its wireless signal. Each of the position coordinates on the play area for the play objects identifies the play objects with the serial number of the play object encoded into its wireless signal. In addition, an identifier for the play area P5 is encoded into the player's and play object's wireless signal. Furthermore, an identifier for the sport's venue (not shown), an identifier for the date (not shown), and an identifier for the time (not shown) is encoded into the player's and play object's wireless signal to the WASP (not shown).

In a preferred embodiment, a data base external to the smart mobile device is configured with encoded geographic position coordinates Pp(X,Y) of the boundaries of said play area; and with encoded geographic position coordinates Ps(X,Y) of the boundaries of said play area scoring zone; and with encoded geographic position coordinates Pf(X,Y) of the boundaries of said play area fouling zone; and with encoded geographic position coordinates Pa(X,Y) of the boundaries of said play area artifacts. The data base is built to hold data for all the play areas in all the sports venues in the world. The architecture of the system is such that the App is first downloaded into the smart mobile device. The App then directs the smart mobile device to contact an internet service provider (ISP). The App then directs the smart mobile device to contact the internet address of the data base. The App then directs the spectator to identify the sports venue, and the sport type, and the play date of the sport, and the start time, on a pull down menu on the screen of the smart mobile device. The data base then signals the spectator on the screen when it has completed its search and found the data. The App then directs the smart mobile device to receive a download of the data into its memory. The App then directs the smart mobile device to compute and structure the animated rendering for the backdrop. The App then directs the smart mobile device to display the rendering of the backdrop on the screen of the smart mobile device. The App then directs the smart mobile device to start receiving the multiplexed single encoded real time stream of geographic position coordinates of the players and the play objects. The App then directs the smart mobile device to demultiplex the stream back into the encoded real time geographic position coordinates of the players and the encoded real time geographic position coordinates of the play objects. The App then directs the smart mobile device to mathematically transform the position coordinate points P(X, Y) on the X-Y Cartesian coordinate system on the play area into points p(x, y) with the x-y Cartesian coordinate system on said screen. The App then directs the smart mobile device to display the demultiplexed stream of the geographic position coordinates of the players and the play objects on to the screen as a series of points p(x, y) in real time as individual visible animated tracks for each of the players and for the play object to the sports spectator. The animated tracks appear as an overlay on the backdrop.

In another preferred embodiment, in order to increase the speed of the system i.e. reduce latency time, and decrease the latency time, the mathematical transformation of the player and the play object position coordinate points P(X, Y) having the X-Y Cartesian coordinate system on the play area into a series of points p(x, y) having the x-y Cartesian screen coordinate system, is performed externally to the smart mobile device. In one preferred embodiment the transformation is performed at a site on the internet. In another preferred embodiment, the transformation is performed at the WASP. In yet another preferred embodiment, the transformation is performed at a smart data base (see FIG. 14 and FIG. 19). The screen coordinates for the players and the play objects are then externally multiplexed into a single encoded real time stream of screen coordinates of the players and the play objects. The App then directs the smart mobile device to start receiving the multiplexed single encoded real time stream of screen coordinates of the players and the play objects. The App then directs the smart mobile device to demultiplex the stream back into the encoded real time screen coordinates of the players and play objects. As before, the App then directs the smart mobile device to display the demultiplexed stream of the screen coordinates of the players and the play objects on to the screen as a series of points p(x, y) in real time, and seen by the spectator as individual visible animated tracks for each of the players and for the play object. The animated tracks appear as an overlay on the backdrop. The external CPU's and memories are larger and faster than the smart mobile device CPU thereby reducing the latency time.

In yet another preferred embodiment, the App directs the smart mobile device to contact the data base. The App enables the smart mobile device to interrogate itself and identify itself to the data base via a user agent ID. The data base contains specifications on all known (past, present, updated and upgraded) smart mobile devices and their unique operating systems. The data base recognizes the user agent ID and communicates a code back to the smart mobile device. This code enables the App to derive all the parameters that the smart mobile device needs to display data it receives from the data base, on its screen. The data base is continuously updated.

In still another preferred embodiment, we allow the generic source to supply generalized coordinates to locate the players and play object's positions on the play area. The term generalized coordinates refers to the parameters that describe the configuration of the system relative to some reference configuration. These parameters uniquely define the configuration of the system relative to the reference configuration.

FIG. 14

Figure 14:
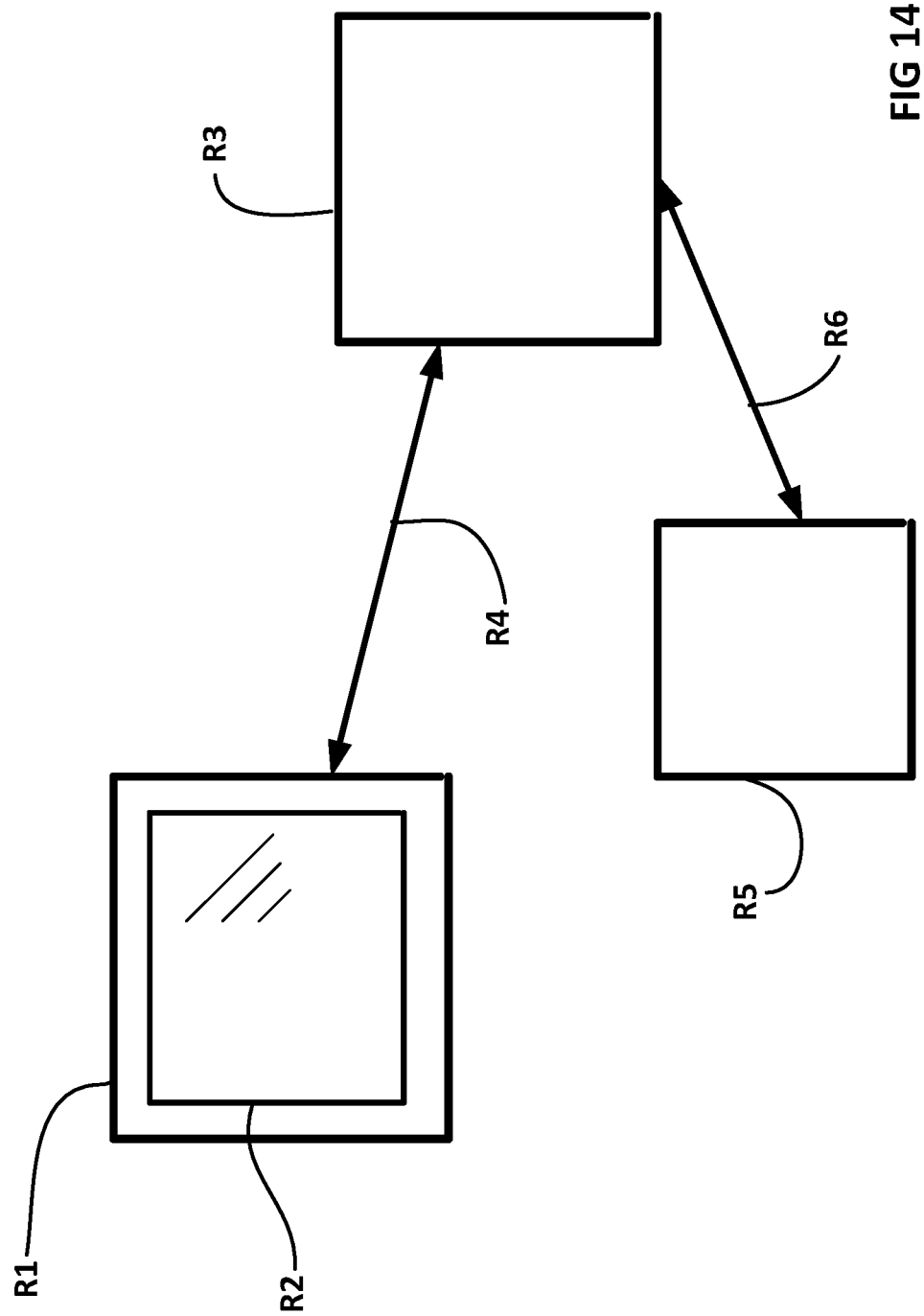
FIG. 14 shows a block diagram for a real-time animated sports entertainment system where at least one spectator use their personal smart mobile devices together with a generic data source of geographic coordinates for both the players and the play object, in conjunction with a smart database, to display tracks on an animated play area background.

FIG. 14 shows a block diagram for a real-time animated sports entertainment system where at least one spectator uses their personal smart mobile devices together with a downloaded generic data source of geographic coordinates for both the players and the play object in conjunction with a smart database to display tracks on an animated play area background.

The detailed physical elements disclosed in the drawing shown in FIG. 14 are identified as follows: R1 is the spectator's personal smart mobile device. R2 is the display screen on the spectator's personal smart mobile device. For example, in a sports stadium there would be a multitudes of spectators viewing their display screens on their personal smart mobile devices. R3 is a smart database. At the request of the spectator, the smart mobile device R1 is downloaded from R3 into R1 with a mobile App. The purpose of the mobile App is to instruct the smart mobile device's CPU to receive data from the smart database R3 and to display animated real-time or historic scaled tracks of the players and play object on the smart mobile device's screen R2 against an animated backdrop of the sports venue's play area. The scale of the tracks and the backdrop are made identical to one another to assure their alignment on the screen R2 as they overlay. In one preferred embodiment, the App is downloaded into R1 from R3.

In another preferred embodiment, the mobile App is downloaded into R1 from any other alternate site. For example, the App can be made available on flash memory and on the internet.

R3 is configured to receive encoded signals from generic source R5 comprising each player's real time position geographic coordinates on the play area, and the play object's real time position coordinates on the play area during a game. R3 is comprised of a CPU and a CPU memory. R3 stores all of the player's real time moment to moment position coordinates on the play area and the play object's real time position coordinates on the play area during a game. The CPU creates a master file comprised of all of the historical geographic coordinates of all the player's and play objects during a game. R3 acts as an archival memory storage site as well as a real time memory site.

In one preferred embodiment, R3 multiplexes the geographic coordinate data from all the player's and the play objects into a single continuous data stream of geographic coordinates. The single continuous data stream of geographic coordinates is fed from R3 into R1 via link R4. Link R4 is a bi-directional communications link. Link R4 can take the form of any communication medium that the smart mobile device can talk to. For example, in one preferred embodiment, link R4 is wireless. In another preferred embodiment, link R4 is the internet. In yet another preferred embodiment, link R4 is WIFI. In still another preferred embodiment, link R4 is a LAN.

The App in R1 furnishes software algorithms installed within it to process the incoming data streams from R3 to reduce the geographic coordinates it receives into coordinates referenced to the display screen's coordinate system so that the data streams can be displayed as scaled tracks on the screen R2.

In another preferred embodiment, R3 processes the geographic coordinate data from all the player's and the play object's and transforms the data into coordinates referenced to the display screen's coordinate system so that the data streams can be displayed as scaled tracks on the screen R2. This mode does the heavy processing in R3 rather 121 and reduces latency time. R3 has considerably more processing power than R1 principally because R3 is larger and has no need to be as compact as R1 thereby enabling it to have many larger and faster processing units. The architecture of FIG. 14 has less latency time therefore than the architecture of FIG. 16 in this regard, because the FIG. 16 architecture requires the slower smart mobile devices to do the transformation thereby increasing the latency time. R3 multiplexes the transformed data into a single continuous data stream which it communicates to R1 via R4. R3 has software algorithms installed within it to process and transform the position coordinates it receives from R5 to coordinates referenced to the display screen's coordinate system.

The geographic coordinates of the boundaries of all known play areas have been pre-programmed into R3. The geographic coordinates of the boundaries of the play area scoring zones of all known play areas have been pre-programmed into R3. The geographic coordinates of the boundaries of the play area fouling zones of all known play areas have been pre-programmed into R3. The geographic coordinates of the artifacts of all known play areas have been pre-programmed into R3. R3 is also a repository in memory for the App. The spectator uses R1 to make a request to R3 via R4 to download the App. The App then downloads to R1 via R4 from R3.

In addition, R3 has software to comprise a scaled backdrop of the play area used during the sports event at the sports venue. In one preferred embodiment, R3 configures the scaled backdrop and downloads the backdrop into R1 for display on R2. R3 initiates the communication link with R5. Upon a request from R3 for data from R5, R5 begins to transmit a continuous uninterrupted data stream to R3. When the sporting event is over, R3 signals R5 to end its transmission. The scale of the tracks and the backdrop are identical to assure that the tracks and the backdrop align.

R5 is a generic data source for each and every player's real time geographic coordinates on the play area and the play object's real time position coordinates on the play area during a sporting event. R5's primary function is to provide R3 with a continuous unbroken sequence or stream of geographic position coordinates for the players and play object. In one preferred embodiment, R6 originates from one generic source R5. In another preferred embodiment, there is more than one generic source for R6 in order to have a backup in the event that one of the generic sources fails to perform its function during the sporting event. The generic sources are essentially surveillance systems for capturing the geographic coordinates of the players and the play object on the play area.

R6 is the link between R5 and R3 that carries signals from the generic source R5 transmitted to the database R3. Some administrative handshaking between R3 and R5 takes place via R6 before and after the sporting event. The transmission of R6 to R3 can be by hard wire and/or wirelessly depending on the nature of the technology of R5. The signal R6 is encoded with the real time position coordinates of the players and play object on the play area and carries a continuous stream of data.

In one preferred embodiment, the App is downloaded into R1 from R3. The smart mobile device R1 is configured to be downloaded with the App. The colors for the player's symbols and numbers and tracks on the screen are chosen automatically by the App or the database R3 software as a default setting. The colors for the player's symbols and numbers and tracks on the screen can be chosen alternatively by the spectator using the pull down menu. The colors for the artifact's symbols and numbers and tracks on the screen are chosen automatically by the App or the smart database R3 as a default setting. The colors for the artifact's symbols and numbers and tracks on the screen can be chosen alternatively by the spectator using the pull down menu.

In a preferred embodiment, a complete set of every known sports venue play area boundary coordinates are stored in R3. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to R3 where the data is processed and the files are kept up to date.

The system comprises at least one generic data source of real time geographic position coordinates for the players and the play object on the play area. The generic data source generates real time geographic position coordinates for each and every player and play object on the play area and communicates the real time geographic position coordinates to the database in real time. The smart database R3 is configured with at least one CPU and a CPU memory. The CPU memory acts as a memory repository for data files. Application system software, i.e. the App is also resident in the CPU memory after it has been downloaded. The purpose of the application system software is to provide instructions to the CPU to operate the system.

The generic data source is a resource of the system. The generic data source offers its data services to smart data bases like R3. The generic data source is a pre-existing resource of the system. The generic data source is configured for furnishing the real-time player and play object geographic position coordinates to the smart database. The generic data source is a generic surveillance means for capturing the real-time geographic position coordinates of the players and the play objects moving on the play area. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic position coordinates of the players and the play objects in real time to the smart database. The generic data source is a resource for a continuous stream of geographic position coordinates to the smart database. The smart database then in turn relays the geographic (or generalized coordinates) to the smart mobile device. The smart database can transform the coordinates to a form used by the smart mobile device to display the coordinates as tracks. Doing the transformation in the smart database improves the throughput of the system more than doing the transformation in the smart mobile device because the smart data base has more computing power than the smart mobile device and can do the transformation more quickly with smaller latency.

The smart database R3 is configured as a repository for the real time geographic position coordinates that are continuously replenished by signals R6 from at least one generic data source R5 of real time geographic position coordinates for each and every player and play object on the play area of the sports venue. The signals R6 are encoded with the identity of each and every player and play object on the play area; and with the identity of the play area and the sporting event and the sports venue and the local time and date of the sports event; and wherein furthermore the smart database R3 is configured as a repository for all historic geographic position coordinates for each and every player and play object on a play area.

Furthermore the smart database R3 is configured as a repository for lists of all known past and present and future sporting events including the type of the sporting event, the name of sports venue, the start time of sporting events and the date of sporting events.

Furthermore the smart database R3 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen R2.

The smart mobile device 121 is configured with its pre-determined user agent ID for identifying the type of the smart mobile device.

The App configures the smart mobile device R1 to interrogate itself to determine its user agent ID.

The smart data base R3 is configured as a repository for lists of pre-determined screen parameters where each screen parameter is for configuring the display of the tracks and the backdrop on the screen R2 of the smart mobile device R1 for which they correspond.

The App is configured with the address of the smart data base R3 for the smart mobile device R1 to communicate with the smart data base via R4.

The App programs the smart mobile device R1 to communicate with the smart data base via R4.

The smart mobile device R1 identifies itself to the smart data base R3 using the user agent ID. The spectator identifies the sporting event's name, date and venue that the spectator wishes to observe to the smart data base. The spectator can choose a past sporting event to observe or a current sporting event.

Using the sporting venue and date, the smart data base R3 selects the corresponding play area for the sporting event from its memory.

The smart data base R3 multiplexes the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into a single data packet signal for transmission to said smart mobile device.

The smart data base R3 recognizes the identity of the smart mobile device R1 by its user agent ID and searches the lists of pre-determined screen parameters for the screen parameters for which the spectator's smart mobile device R1 corresponds.

The smart data base communicates the screen parameters to the smart mobile device R1 via R4. The screen parameters are used furthermore by the smart data base R3 for transforming the real time geographic position coordinates of the players and the play object on the play area into real time screen coordinates for displaying the tracks on the screen R2.

For the selected play area, the smart data base R3 multiplexes the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into a play area data packet for transmission to the smart mobile device R1.

The smart data base R3 communicates the screen parameters to the smart mobile device R1 via R4.

The smart data base R3 recognizes the identity of the smart mobile device R1 by its user agent ID and searches for said screen parameters corresponding to the user agent ID.

The screen parameters are used by the smart data base R3 for transforming the real time geographic position coordinates of the players and the play object on the play area into real time position coordinates of the tracks of the players and the play object on the screen R2 of the smart mobile device R1 for scaling and displaying the tracks on the screen R2.

R4 is configured for communicating the play area data packet to the smart mobile device R1. The smart mobile device R1 is further configured by the App for demultiplexing the play area data packet. The smart mobile device R1 is further configured by the App for displaying the demultiplexed play area data packet as a backdrop of the play area on the screen R2.

The smart data base R3 recognizes the user agent ID and communicates an encoded signal back to the smart mobile device R1 via R4. The encoded signal carries data used by the App to instruct the smart mobile device R1 to configure its screen R2 to display the tracks against the backdrop.

The backdrop of the play area, which is displayed on the screen R2 as a background for the player's and play object's tracks, is configured by the App as an animated rendering of the play area. The primary purpose of the backdrop is to acclimate the spectator as to the location of the players and play object on the play area during the game.

The tracks and the backdrop are configured mutually by the App to be aligned with the x-y Cartesian coordinate system on the screen R2.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App as an animated rendering of the pre-determined artifacts of the play area displayed on the screen R2. The backdrop is further configured by the App as an animated rendering of the play area's scoring zone displayed on the screen R2. The backdrop is further configured by the App as an animated rendering of the play area's fouling zone displayed on the screen R2. The backdrop is further configured by the App to be aligned with the x-y Cartesian coordinate system of the screen R2.

FIG. 15

Figure 15:
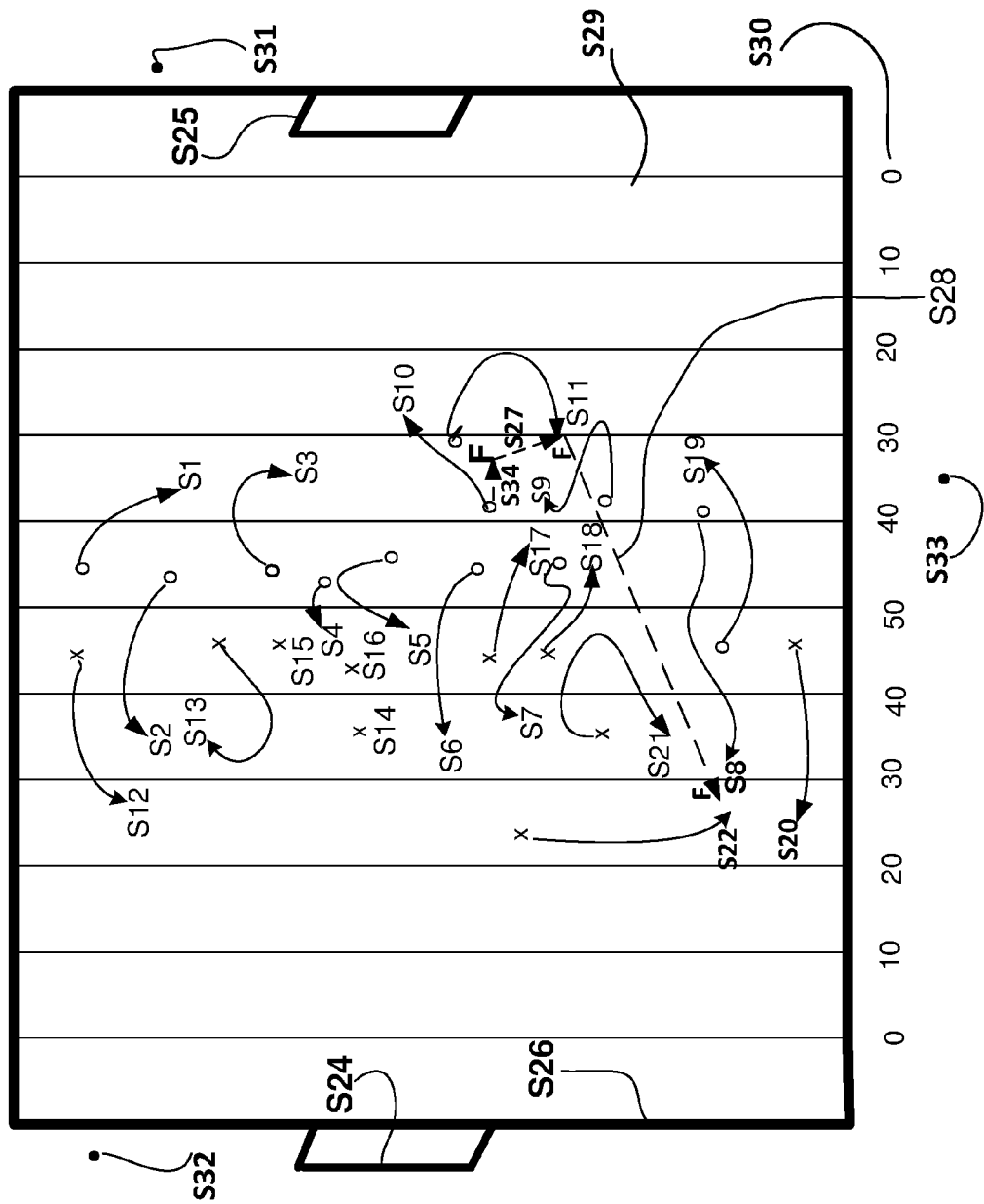
FIG. 15 shows a real-time animated display of football player tracks and football play object tracks on the screen of the spectator's smart mobile device during a football game presented on an animated section of a football field as a backdrop, where the more traditional playbook "o's" and "x's" are used together with jersey number nuances to represent the players.

FIG. 15 shows a real-time animated display of football player tracks and football play object tracks on the screen of the spectator's smart mobile device during a football game presented on an animated section of a football field as a backdrop, with the more traditional playbook "o's" and "x's" used together with jersey number nuances to represent the players. The "o's" and the "x's" represent the starting positions of the players. The arrow heads point to the final position of the players. The alpha-numeric codes identify the player and the player's tracks where the arrowhead shows the direction of motion of the player along his track.

In FIG. 15, the alpha-numerics on the player's tracks on the play area represent each player's jersey numbers and identify each player to the spectator.

The detailed physical elements disclosed in the drawing shown in FIG. 15 are identified as follows: S1 represents player S1. S2 represents player S2. S3 represents player S3. S4 represents player S4. S5 represents player S5. S6 represents player S6. S7 represents player S7. S8 represents player S8. S9 represents player S9. S10 represents player S10 the center. S11 represents player S11. S12 represents player S12. S13 represents player S13. S14 represents motionless player S14. S15 represents motionless player S15. S16 represents motionless player S16. S17 represents player S17. S18 represents player S18. S19 represents player S19. S20 represents player S20. S21 represents player S21. S22 represents player S22. S23 is the animated play area displayed as a backdrop on a spectator's personal smart mobile device screen. S24 represents a goal post and part of the backdrop. S25 represents a goal post and part of the backdrop. S26 is the geographic play area boundary and artifacts. S34 is the track created by the football F as it moves from player S10 to the quarterback S11. S27 is the track created by the football as it is carried by the quarterback S11. S28 is the track created by the football as it is passed from the quarterback S11 and received by player S8. S29 is a play area artifact and part of the backdrop. S30 is a play area artifact and part of the backdrop. S31 is a scoring zone. S32 is a scoring zone. S33 is a fouling zone.

The primary difference between FIG. 15 and FIG. 4 are the "o's" and "x's" used at the start of the player's tracks to identify the players with their teams. Another primary difference between FIG. 15 and FIG. 4 is that FIG. 15 refers to the system shown in FIG. 14, whereas FIG. 4 refers to the systems shown in FIG. 1 and FIG. 2.

FIG. 15 is a preferred embodiment. FIG. 15 shows a view of the animated football play-book display.

FIG. 15 shows an instance on the display screen of the spectator's personal smart mobile device i.e. aide, for the game of football. For example, in a sports stadium there would be a multitudes of spectators viewing their display screens on their personal smart mobile devices. The display screen of the spectator's personal smart mobile device shows an animated top view i.e. computer graphics, of a football field's boundaries and artifacts i.e. lines, markings etc. The real-time tracks of each of the football players and the football are presented aligned with an animated backdrop of play area boundaries and artifacts of the football field, i.e. play area. The scales of the players and football are made identical to the scale of the backdrop to assure their alignment.

The play object, a football identified on the smart mobile device screen display is shown by the letter "F", and its track is shown as a dashed line with arrowheads showing its direction of travel. There are 22 players in the game. Each player is represented by colored jersey numbers and tracks. The team "A" players all have the same color numbers. The team "B" players all have the same color numbers. The team "A" players and the team "B" players have numbers of different colors. Each player's number on his jersey is shown as his number. The player's tracks, especially adjacent ones, are configured with different colors to enhance the players from one another and avoid confusion.

Each generic source of geographic position coordinates identifies the player by the player's jersey number which is encoded into the generic source's transmitted signal. Each generic source of geographic position coordinates identifies the play object with a number encoded into its transmitted signal.

The display screen has a "start action button". The display screen has a "stop action button". These buttons are displayed using a pull down menu. The spectator can choose to initiate the start of the growth of the tracks at any time using the start action button. The spectator can choose to terminate the further growth of the tracks at any time using the stop action button.

When the spectator chooses to initiate the start of the tracks, the initial geographic position of each of the players is marked with an "x" or "o" at the start of the player's track. The "x" or "o" represents the player's team. When the spectator chooses to initiate the start of tracks, the initial geographic position of the play object is marked with the play object's "F" representing the play object at the start of the football play object's track. An "F" is displayed automatically on the screen wherever control of the football changes from one player to another. The CPU in the database calculates when this transition occurs by using the algorithms in the App software. The Control of the football is judged by the database's CPU by noting the congruence of the player's position coordinates with the position coordinates of the football.

The generic source derives each player's geographic coordinates referenced to the play area S26. The position coordinates for each of the players are transmitted to the spectator's personal smart mobile devices at the sport's venue via the database S3 shown in FIG. 14. Many spectators in the audience have personal smart mobile devices S1.

Each spectator's personal smart mobile device S1 is configured with a display screen S2 and an App. In a preferred embodiment, the App is resident in the database S3, from which it is downloaded upon request of the spectator, via communication link S4, into S11.

As an example, let us assume that as a game progresses, the players move on the play area from their initial positions. The track for each of the players grows in length corresponding to the movement of the player away from their initial position. The length of the track continues to increase as the player moves from his initial position. The track on the screen follows the geographic coordinate changes on the play area. During a game, the spectator sees the length of the track increasing in the direction of motion of the player on the play area. In a similar fashion, the length of the track of the play object increases as the play object is moved from place to place on the play area and its geographic coordinates change. The screen will appear full of action as the game progresses with tracks increasing in length everywhere. Of course if we were observing a chess game on the screen, there would be no change in the player's tracks on the play area, the chess board, because the players do not typically move from their initial positions, because they are typically seated with their positions fixed on the play area. The players would appear simply as two stationary colored dots on the screen accompanied by their colored identifying numbers or symbols beside the dots. An instance of the backdrop would be the animated rendering of the eight-by-eight matrix of squares on the screen. The boundaries of the play area would be the four sides of the chess board. The artifacts would be the squares of the board. The foul zone would be anyplace off the board outside of the play area. The scoring zone would be anyplace within the play area on the board. There would be no arrowheads to denote the direction of motion, because there is no motion (except maybe at intermission when the players get up for a coffee break, etc.) and move from their table and the chess board. In one preferred embodiment, their might be an exception however if the spectators wished to look just at the motion of the player's hands. In that case, as players moved their pieces from place to place on the chess board, their hands would produce tracks on the screen because the geographic coordinates of their hands would change, however small, with each move of a piece. The spectator would note that the two tracks on the screen would grow alternately as one player's move would follow the other in succession. Initially before the game began, there would be no dots on the screen because neither player's hands are permitted in the play area before the game begins, that is no player is permitted to touch his pieces. Only the backdrop would show on the screen before the game begins. In a preferred embodiment, the backdrop would consist of an 8×8 matrix of squares mimicking the look of a chessboard. The backdrop would fill the screen superimposed on its invisible Cartesian coordinate axes. When the game begins, the hand of the first player to make a move would show as the first colored dot on the screen on the square where the piece that he or she moved initially resided. As the first player moves his piece to another square on the board, another dot of the same color would show on the screen against the backdrop of that square. A line would then show on the screen connecting the dots. An arrowhead would then show on the screen at the location of the second dot and pointing away from the first dot along the direction of the line. As the game progressed the arrowhead would move to the most recent dot, and as before, point away from the previous dot. Then as the second player made his/her move, the hand of the second player to make a move would show on the screen as a colored dot of another color on the screen on the square where the piece that he or she moved initially resided. The action on the screen would progress as before. There are 32 pieces in the game of chess. When one player takes another player's piece, his colored dot would appear in one of the same squares with the other player's colored dot. When this event occurs, a momentary message appears on the screen that the player has scored a piece. When the player's hand removes his opponent's piece from the board, he places the piece in the foul zone. In a preferred embodiment, the spectator has the option of showing the motion (tracks) of the player's hand only on the board or off the board as well. As a note, showing the movements of the player's hands "off the board" on the screen, might be considered as confusing. When "checkmate" finally occurs, all activity on the play area ceases, and the tracks on the screen stop growing.

Therefore there are 32 play objects. Chess is considerably different from "a game of racing around the track" where there are only runners (players) and no play objects. If a baton were used, like in a marathon, then the baton would become the play object because it would be passed from player to player (runner to runner) and move with the runners as it is carried by them around the track.

In another preferred embodiment, playing the piano for example, each of the fingers on a person's hand becomes the players. Each finger would produce a track on the screen because the geographic coordinates of their fingers on the keyboard would change. We assume here that the vertical distance traveled by a key when depressed is recorded by a change in the position coordinate of the key in a vertical Cartesian coordinate system. The keyboard becomes the play area. The backdrop appears as an animated keyboard. There are a total of ten fingers. Therefore there are ten players. Each single key on the keyboard represents a play object. The depression distance of the key when depressed represents a distance traveled by the key or play object. This system has an advantage over many prior art piano training methods because we are able to see what each of the fingers on the person's two hands are doing over time. In music this is important because it relates directly to "technique". "Technique" in music in playing the piano is normally very difficult to teach. The present invention is an aide to teaching piano "technique".

After being downloaded, the smart mobile device's CPU, via the App, firstly checks the configuration of the spectator's personal smart mobile device to determine its capabilities and limitations for the tasks ahead. The App is configured with a form of play-book software to display the player's tracks and the football's tracks on the screen. The play-book software displays and animates a real-time cartoon representations of the player's tracks at their actual geographic scaled positions at the play area, on the display screen, as the players move on the play area, superimposed on a cartoon backdrop representing the play area boundaries and artifacts i.e. goal posts, lines, and numbers, etc.

Furthermore, the App simultaneously displays and animates a real-time cartoon representation of the football's play object tracks at the football's actual geographic positions as it moves on the play area, superimposed on the same cartoon backdrop representing the play area boundaries and artifacts. The player tracks and the football's tracks are displayed simultaneously side by side in real time on the smart mobile device's display screen.

The App furnished to the spectator's personal smart mobile device operates the animated play-book during the game. The App causes a backdrop representing the play area to be continuously displayed on the screen of the spectator's personal smart mobile device. The App causes each of the players and the play object to be continuously displayed on the screen (if the spectator chooses to do so) at the player's and play object's position coordinates superimposed on the backdrop representing the play area.

Each of the players and play object leaves its real time track superimposed on the backdrop that represents the play area as the game progresses and the players and football play object moves from point to point on the play area. All of the players and play object's historical positions and present geographic are shown on the tracks over the time interval chosen by the spectator.

The arrowheads on the tracks point in the direction of motion of the players and the football. The database CPU (see FIG. 14 element 3) calculates the slope, length and direction of the track during each time interval between position coordinate points. The arrowheads appear on the tracks on the most recent position coordinate point on the screen.

The jersey number representing the player moves at the tip of the track arrowhead with the progress of the player's track. The track of the football is represented as a dashed line. The "F" representing the football moves at the tip of the track arrowhead with the progress of the football's track.

The initial conditions for the game are shown with each player and play object represented at its starting position by a "o" or an "x" with the player's jersey number by its side. As each player and play object moves on the play area playing field S26, its track is shown superimposed on the playing field backdrop in real time from moment to moment for that player and play object as it geographically moves on the play area S26. The length of the track grows as the player and play object move further and further from their initial positions. If a player or play object remains at its initial position, it will generate a track of zero length on the screen. The player's "o" or "x" with the player's jersey number will remain in place on the screen at their original positions. Similarly, if the football were not to move on the play area, the football's "F" will remain in place on the display screen.

Referring to FIG. 15, the following is a typical example for the operation of the App animated play-book during a game. The player movements displayed on the screen as tracks grow with increasing length with time as described below. The moves shown in this example are meant to demonstrate the tracks and the backdrop. The moves do not necessarily follow the etiquette and rules of the game.

The players are football players. There are two teams identified as player's "o's" and "x's". In a preferred embodiment, there is a red team and a blue team. The "o's" are red color, and the "x's" are blue color. The "o's" and the "x's" are different colors to make the team players easily distinguishable from one another. Each team has 11 players. Each player has a number to identify himself. Players S1 thru S11 are on the red team; players S12 thru S22 are on the blue team.

Player S1 moves from the 43 yard line to the 37 yard line. Player S2 moves forward from the 43 yard line to the 35 yard line. Player S3 moves backward from the 43 yard line to the 35 yard line. Player S4 moves forward from the 45 yard line to the 51 yard line. Player S5 moves forward from the 43 yard line to the 51 yard line. Player S6 moves forward from the 45 yard line to the 35 yard line. Player S7 moves forward from the 45 yard line to the 39 yard line.

Player S8 moves forward from the 43 yard line to the 32 yard line to position himself to receive the football from the quarterback player S11.

Player S9 moves backward from the 37 yard line to the 35 yard line to protect the quarterback player S11 and to receive the football from player S10.

Player S10, the center, snaps the football "F" from the 39 yard line backward to player S9 at the 35 yard line. The quarterback, player S11, moves from the 31 yard line to the 30 yard line to receive the football.

Player S9 passes the football "F" at the 35 yard line to the quarterback on the 30 yard line. The track of the football "F" is shown as a dashed line with an arrow at its tip pointing in the direction of motion from the 35 yard line backward to the 30 yard line.

Player S11, the quarterback, receives the football "F" from S9 on the 30 yard line. The track of the football "F" is shown as a dashed line with an arrow pointing in the direction of motion from the 35 yard line to the 30 yard line.

Player S11 now passes the football "F" from the 30 yard line forward to the 32 yard line where it is received by player S8.

The track S28 of the football F from player S11 to player S8 is shown as a dashed line with an arrow at its tip pointing in the direction of forward motion an ending at player S8.

Player S8 is tackled by player S22 where player S22 gains control of the football F. The database (see FIG. 14) CPU sees that the position coordinates of S22 and S8 coincide for a pre-determined time duration and interprets this event as a tackle. The CPU sees that the coordinates of S22 have not changed for a pre-determined period of time. The database (see FIG. 14) CPU sees that the position coordinates of S22 and "F" coincide for a pre-determined time. The football "F" is now with S22 and their position coordinates are identical. The football "F" is calculated by the database CPU to be under the control of S22. The play i.e. the down, is ended.

The spectator can freeze the game on his personal smart mobile device while the players assemble for the next play.

The spectator, for his or her entertainment, can now review prior tracks of the football play object and the players. The spectator may choose to have only a particular players' tracks shown; or to have only certain player's tracks shown.

All the tracks are stored for the spectators in the database for future analysis and entertainment. The tracks are also stored for the spectators in their personal smart mobile devices if memory storage space permits. As a backup, the position coordinates for each of the players and play objects can be made available via at least one internet service provider (ISP).

The sporting events are not restricted to just football. Games like golf, baseball, soccer, volleyball, softball, tennis, ice hockey and basketball are further examples of games where this system can be used.

We should note that the ultra small micro-sized GPS locators are easily mounted inside play objects including golf balls, tennis balls, base balls, softballs, soccer balls, volleyballs, ice hockey pucks and basketballs. See FIG. 5. Their batteries can be easily re-charged using time varying magnetic flux induction.

All the symbols and colors for the player's and the play objects on the smart mobile device screen can be changed at any time by the spectator using a pull down menu of choices. The spectator is enabled to choose different symbols by first selecting the word "menu" in the margin of the device screen; and then selecting the word "player" or "play object"; and then choosing and clicking on the word "symbol" or "color"; and then choosing and clicking on which symbol or color he wants from a list of given symbols and colors.

The spectator may wish to see a game recreated that was performed in the past. In order to produce this historical game, the spectator inputs the identity of the sporting venue with the start time and date of the sporting event. The smart mobile device takes this input and looks into its repertoire of data files for the historic track and backdrop parameters necessary to display this historic game. In yet another preferred embodiment, the App configures the smart mobile device to display past games on its screen. In order to display the tracks of past games on the screen, the App furnishes a repository of past player's tracks and past play object's tracks for past sporting events, and a repository of past backdrops, to the smart mobile device's CPU memory so the smart mobile device's CPU can reconstruct the game on the screen. The repository of past player's tracks and play object's tracks comprises the historical tracks and detailed historical geographic coordinates of the players and the play objects throughout the historical game selected by the spectator. The repository of past backdrops comprises an animated historical rendering of said play area defined by the pre-determined historical geographic coordinates of its physical boundaries; an animated historical rendering of the artifacts defined by their pre-determined form and their pre-determined historical geographic coordinates; and an animated historical rendering of the scoring zones defined by the pre-determined historical geographic coordinates of their physical boundaries; and an animated historical rendering of the fouling zones defined by the pre-determined historical geographic coordinates of their physical boundaries. As new games are performed, their data becomes part of the App's repositories thereby updating the repositories and keeping them current. As the contents of the repositories grows, the App's contents can be maintained by receiving downloaded updates to the spectator's smart mobile device from a specialized internet site configured for this purpose. The App configures the smart mobile device using these parameters to scale the coordinate points to display the coordinate points on the screen, thereby making the coordinate points on the play area, i.e. positions of the players and the play objects on the play area, correspond to the coordinate points of the players and the play objects on the screen.

In a preferred embodiment, the present invention faithfully reproduces historic games. In order to faithfully reproduce historic games, the smart mobile device must have access to all the parameters having to do with each and every historic game going back into the past for a finite pre-determined time period covering the game selected by the spectator. The system provides access to a repository of these parameters. One important parameter that should be noted is the exact time of occurrence for each coordinate point occupied by players and play objects on the play area. This time parameter is gleaned from the encoded signals transmitted by the generic resource during the original actual real-time game. Each coordinate point, be it generalized or otherwise, is tagged or encoded with its exact time of occurrence on the play area by the generic resource, whether it is for the player or for the play object. The time difference between sequential points and the distance between sequential points is used by the system to calculate the velocity, acceleration and deceleration of the player and the play object during any time interval that the spectator wishes. Another important set of parameters that should be noted pertains to the backdrop. In order to faithfully reproduce historic games, the smart mobile device must have access to all the parameters having to do with the backdrop of each and every historic game. It is a necessary but insufficient condition that only the players and play object's tracks be reproduced faithfully in order to reproduce historic games. It is necessary that the historic backdrop be faithfully reproduced as well. The smart mobile device has access to all the parameters having to do with the historic backdrop for the game that the spectator wishes to reproduce. The reason for this is that the historic tracks overlay onto the historic backdrop, so in order for the spectators to see, measure, and analyze the historic tracks they must do so in the context of the original backdrop, i.e. on the original precise background on which the game was historically performed. Therefore the smart mobile device must have access to a repository of historic backdrops. In the present invention, the smart mobile device has access to at least one repository of historic backdrops. For example, the App provides the repository for the backdrops; or an internet site provides the repository for the backdrops or a separate database provides the repository for the backdrops. All these repositories are kept up to date with new parameters as new games are played.

The App is for configuring the smart mobile device to display past player's tracks and past play object's tracks for historic sporting events.

In a preferred embodiment, the App is comprised of a software instruction set for configuring said smart mobile device to recreate historic games. This instruction set tells the smart mobile device how to find the parameters, and what it needs to do with the parameters to display the historic tracks and the historic backdrop. In order to support the instruction software with the historical data i.e. parameters, it needs to recreate the games, the App carries with it the historic parameters as part of its data base. The App comprises a repository of historic said player's tracks and historic play object's tracks for historic sporting events, a repository of historic said backdrops configured as: an animated historical rendering of the play area; and the play area is defined by the pre-determined historical geographic coordinates of its physical boundaries, an animated historical rendering of at least one artifact; and the artifact is defined by its pre-determined historic form and its pre-determined historical geographic coordinates, an animated historical rendering of at least one scoring zone; and the scoring zone is defined by the pre-determined historical geographic coordinates of its physical boundaries, an animated historical rendering of at least one fouling zone; and the fouling zone is defined by the pre-determined historical geographic coordinates of its physical boundaries.

FIG. 16

Figure 16:
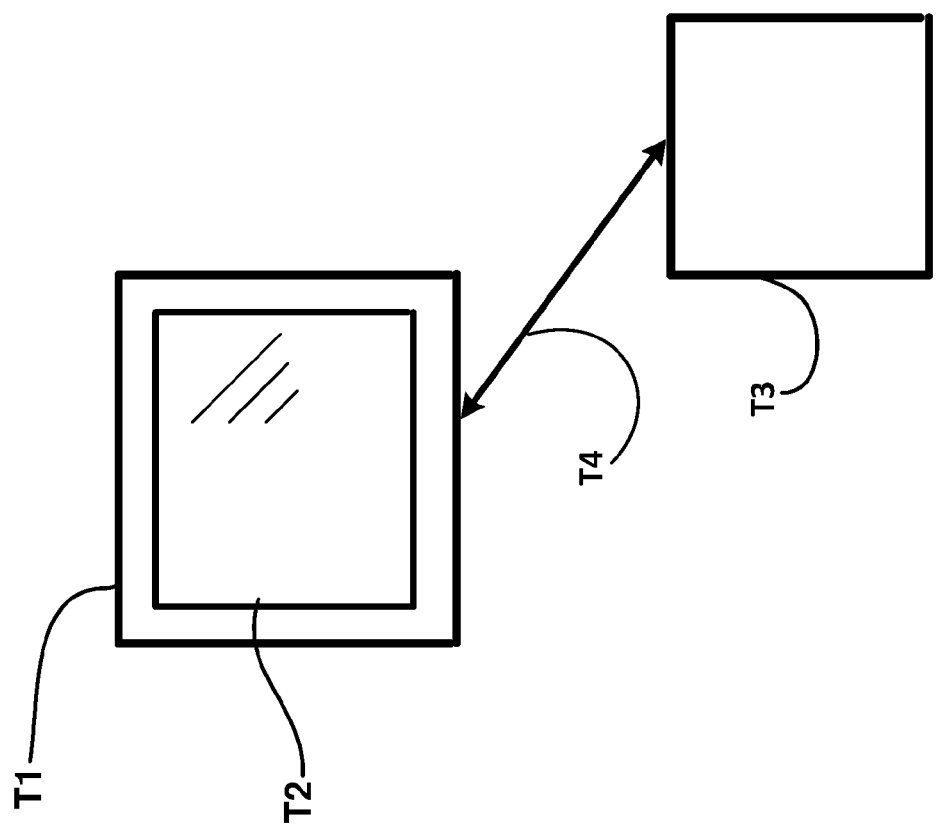
FIG. 16 shows a block diagram for a real-time animated sports entertainment system where spectators use their personal smart mobile devices together with a generic data source of geographic coordinates for both the players and the play object to display tracks on an animated play area background against an animated backdrop of the play area.

FIG. 16 shows a block diagram for a real-time animated sports entertainment system where spectators use their personal smart mobile devices together with a generic data source of geographic coordinates for both the players and the play object to display tracks on an animated play area background against an animated backdrop of the play area.

The detailed physical elements disclosed in the drawing shown in FIG. 16 are identified as follows: T1 is the spectator's personal smart mobile device.

T2 is the display screen on the spectator's personal smart mobile device. For example, in a sports stadium there would be a multitudes of spectators viewing their display screens on their personal smart mobile devices.

At the request of the spectator, the smart mobile device Ti is downloaded with a mobile App from the internet or from any other site including from flash memory. The purpose of the mobile App is to instruct the smart mobile device's CPU to receive data from the generic data source T3 and to display animated real-time or historic scaled tracks of the players and play object on the smart mobile device's screen T2 against an animated backdrop of the sports venue's play area. The scale of the tracks and the backdrop are made identical to one another to assure their alignment on the screen T2 as they overlay.

T1 is configured to receive encoded signals from generic source T3 comprising each player's real time position geographic coordinates on the play area, and the play object's real time position coordinates on the play area during a game. T1 is comprised of a CPU and a CPU memory.

T1 stores all of the player's real time moment to moment position coordinates on the play area and the play object's real time position coordinates on the play area during a game. The CPU creates a file comprised of all of the historical geographic coordinates of all the player's and play objects during a game. T1 acts as an archival memory storage site as well as a real time memory site.

Link T4 is a bi-directional communications link. Link T4 can take the form of any communication medium that the smart mobile device can talk to. For example, in one preferred embodiment, link T4 is wireless. In another preferred embodiment, link T4 is the internet. In yet another preferred embodiment, link T4 is WIFI. In still another preferred embodiment, link T4 is a LAN.

The App furnishes T1 with software algorithms to process the incoming data streams from T3 to reduce the geographic coordinates it receives from T3 into coordinates referenced to the display screen's coordinate system so that the data streams can be displayed as scaled tracks on the screen T2.

The geographic coordinates of the boundaries of the play area boundaries of all known play areas have been stored on the App. The geographic coordinates of the boundaries of the play area scoring zones of all known play areas have been stored on the App. The geographic coordinates of the boundaries of the play area fouling zones of all known play areas have been stored on the App. The geographic coordinates of the artifacts of all known play areas have been stored on the App.

In addition, the App has software used by the CPU in T1 to configure a scaled backdrop of the play area used during the sports event at the sports venue. T1 initiates the communication link T4 with T3. Upon a request from T1 for data from T3, T3 begins to transmit a continuous uninterrupted data stream to T1. When the sporting event is over, T1 signals T3 to end its transmission. The scale of the tracks and the backdrop are identical to assure that the tracks and the backdrop align properly.

T3 is a generic data source for each and every player's real time geographic coordinates on the play area and the play object's real time position coordinates on the play area during a sporting event. T3's primary function is to provide T1 with a continuous unbroken sequence or stream of geographic coordinates for the players and play object. In one preferred embodiment, the geographic coordinates originate from just one generic source T3. In another preferred embodiment, there is more than one generic source of geographic coordinates in order to have a backup in the event that one of the generic sources fails to perform its function during the sporting event. The generic sources are essentially surveillance systems for capturing the geographic coordinates of the players and the play object on the play area.

T4 is the bi-directional communications link between T1 and T3 that carries signals from the generic source T3 transmitted to T1. Some administrative handshaking between T1 and T3 takes place via T4 before, during and after the sporting event. The transmission of T3 to T1 can be by hard wire and/or wirelessly depending on the nature of the technology of T3. The signal from T3 carried by T4 is encoded with the real time position coordinates of the players and play object on the play area and carries a continuous stream of data.

In another preferred embodiment, the App is downloaded into T1 from T3. The smart mobile device T1 is configured to be downloaded with the App.

The colors for the player's symbols and numbers and tracks on the screen T2 are chosen automatically by the App in T1 as a default setting or by the spectator as an option. The colors for the player's symbols and numbers and tracks on the screen can be chosen alternatively by the spectator using the pull down menu. The colors for the artifact's symbols and numbers and tracks on the screen are chosen automatically by the App. The colors for the artifact's symbols and numbers and tracks on the screen can be chosen alternatively by the spectator using the pull down menu.

In a preferred embodiment, a complete set of every known sports venue play area boundary coordinates are stored at an internet site or in the App. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to T1 where the data is processed and the files are kept up to date.

The system comprises at least one generic data source of real time geographic coordinates for the players and the play object on the play area. The generic data source generates real time geographic coordinates for each and every player and play object on the play area and communicates the real time geographic position coordinates to the smart mobile devices T1 in real time. There are a multitude of smart mobile devices receiving real time geographic coordinates from T3. The smart mobile devices T1 are configured with at least one CPU and a CPU memory. The CPU memory acts as a memory repository for the App and for all data files. Application system software is also resident in the CPU memory. The purpose of the application system software is to provide instructions to the CPU to operate the system.

The generic data source is a resource of the system. The generic data source offers its data services to spectators having smart mobile devices like T1. The generic data source is a pre-existing resource of the system. The generic data source is configured for furnishing the real-time player and play object geographic coordinates to the smart mobile devices T1. The generic data source is a generic surveillance means for capturing the real-time geographic position coordinates of the players and the play objects moving on the play area. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic coordinates of the players and the play objects in real time to the smart mobile devices T1. The generic data source is a resource providing a continuous stream of geographic coordinates to the smart database.

T1 is configured as a repository for the real time geographic position coordinates that are continuously replenished by signals via T3 from at least one generic data source T3 of real time geographic coordinates for each and every player and play object on the play area of the sports venue. The signals are encoded with the identity of each and every player and play object on the play area; and with the identity of the play area and the sporting event and the sports venue and the local time and date of the sports event; and furthermore the smart mobile device T1 is configured as a repository for all historic geographic position coordinates for each and every player and play object on a play area.

Furthermore the smart mobile device T1 is configured as a repository for lists of all known past and present and future sporting events including the type of the sporting event, the name of sports venue, the start time of sporting events and the date of sporting events.

Furthermore the smart mobile device T1 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen T2.

The smart mobile device T1 is configured with its pre-determined user agent ID for identifying the type of the smart mobile device.

The App configures the smart mobile device T1 to interrogate itself to determine its user agent ID.

The App configures smart mobile device T1 as a repository for lists of pre-determined screen parameters where each screen parameter is for configuring the display of the tracks and the backdrop on the screen T2 of the smart mobile device T1 for which they correspond.

The App is configured with the address of T3 for the smart mobile device T1 to communicate with via T4.

The App programs the smart mobile device T1 to communicate with the smart data base via T4.

The smart mobile device T1 identifies itself to T3 using the user agent ID. The spectator identifies the sporting event's name, date and venue to T1 that the spectator wishes to observe. The spectator can choose a past sporting event to observe or a current sporting event.

Using the sporting venue and date, the smart mobile device T1 selects the corresponding play area for the sporting event from its memory.

The smart mobile device T1 searches the lists of pre-determined screen parameters for the screen parameters for which the spectator's smart mobile device T1 corresponds.

The screen parameters are used by the smart mobile device T1 for transforming the real time geographic coordinates of the players and the play object on the play area into real time screen coordinates for displaying the tracks on the screen T2.

The screen parameters are used by the smart mobile device T1 for transforming the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into an animated backdrop of the play area. The tracks are displayed on the screen against the backdrop. The backdrop is scaled to the same scale factor as the tracks so that they align together on the screen. The App instructs the smart mobile device T1 to configure its screen T2 to display the tracks against the backdrop.

The backdrop of the play area, which is displayed on the screen T2 as a background for the player's and play object's tracks, is configured by the App as an animated rendering of the play area. The primary purpose of the backdrop is to acclimate the spectator as to the location of the players and play object on the play area during the game.

The tracks and the backdrop are configured mutually by the App to be aligned with the x-y Cartesian coordinate system on the screen T2.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App as an animated rendering of the pre-determined artifacts of the play area displayed on the screen T2. The backdrop is further configured by the App as an animated rendering of the play area's scoring zone displayed on the screen T2. The backdrop is further configured by the App as an animated rendering of the play area's fouling zone displayed on the screen T2. The backdrop is further configured by the App to be aligned with the x-y Cartesian coordinate system of the screen T2.

The App configures the backdrop. The backdrop is configured as an animated rendering of the play area. The play area is configured with an animated rendering of pre-determined boundary lines wherein the boundary lines are defined by their geographic coordinates; and an animated rendering of at least one pre-determined artifact wherein the artifact is defined by its form and of its geographic coordinates; and an animated rendering of at least one pre-determined scoring zone wherein the scoring zone is defined by its boundaries and by the form of its geographic coordinates; and an animated rendering of at least one pre-determined fouling zone wherein the fouling zone is defined by its boundaries and by the form of its geographic coordinates.

As an example, let us assume that as a game progresses, the players move on the play area from their initial positions. The track for each of the players grows in length corresponding to the movement of the player away from their initial position. The length of the track continues to increase as the player moves from his initial position. The track on the screen follows the geographic coordinate changes on the play area. During a game, the spectator sees the length of the track increasing in the direction of motion of the player on the play area. In a similar fashion, the length of the track of the play object increases as the play object is moved from place to place on the play area and its geographic coordinates change. The screen will appear full of action as the game progresses with tracks increasing in length everywhere. Of course if we were observing a chess game on the screen, there would be no change in the player's tracks on the play area, the chess board, because the players do not typically move from their initial positions, because they are typically seated with their positions fixed on the play area. The players would appear simply as two stationary colored dots on the screen accompanied by their colored identifying numbers or symbols beside the dots. An instance of the backdrop would be the animated rendering of the eight-by-eight matrix of squares on the screen. The boundaries of the play area would be the four sides of the chess board. The artifacts would be the squares of the board. The foul zone would be anyplace off the board outside of the play area. The scoring zone would be anyplace within the play area on the board. There would be no arrowheads to denote the direction of motion, because there is no motion (except maybe at intermission when the players get up for a coffee break, etc.) and move from their table and the chess board. In one preferred embodiment, their might be an exception however if the spectators wished to look just at the motion of the player's hands and not their bodies or the 32 play objects. In that case, as players moved their pieces from place to place on the chess board, their hands would produce tracks on the screen because the geographic coordinates of their hands would change, however small, with each move of a piece. The generic source of the geographic coordinates for each player's hands would relay the coordinates in real time so they can be processed to produce the player's hand's tracks on the screen of the spectator's smart mobile device. The spectator would note that the two tracks on the screen would grow alternately as one player's move would follow the other in succession. Initially before the game began, there would be no dots on the screen because neither player's hands are permitted in the play area before the game begins, that is no player is permitted to touch his pieces. Only the backdrop would show on the screen before the game begins. In a preferred embodiment, the backdrop would consist of an 8×8 matrix of squares mimicking the look of a chessboard. The backdrop would fill the screen superimposed on its invisible Cartesian coordinate axes. When the game begins, the hand of the first player to make a move would show as the first colored dot on the screen on the square where the piece that he or she moved initially resided. As the first player moves his piece to another square on the board, another dot of the same color would show on the screen against the backdrop of that square. A line would then show on the screen connecting the dots. An arrowhead would then show on the screen at the location of the second dot and pointing away from the first dot along the direction of the line. As the game progressed the arrowhead would move to the most recent dot, and as before, point away from the previous dot. Then as the second player made his/her move, the hand of the second player to make a move would show on the screen as a colored dot of another color on the screen on the square where the piece that he or she moved initially resided. The action on the screen would progress as before. There are 32 pieces in the game of chess. When one player takes another player's piece, his colored dot would appear in one of the same squares with the other player's colored dot. When this event occurs, a momentary message appears on the screen that the player has scored a piece. When the player's hand removes his opponent's piece from the board, he places the piece in the foul zone. In a preferred embodiment, the spectator has the option of showing the motion (tracks) of the player's hand only on the board or off the board as well. As a note, showing the movements of the player's hands "off the board" on the screen, might be considered as confusing. When "checkmate" finally occurs, all activity on the play area ceases, and the tracks on the screen stop growing. Therefore there are 32 play objects. Chess is considerably different from "a game of track" where there are only runners (players) and no play objects. If a baton were used, like in a marathon, then the baton would become the play object because it would be passed from player to player (runner to runner) and move with the runners as it is carried by them around the track.

FIG. 17

Figure 17:
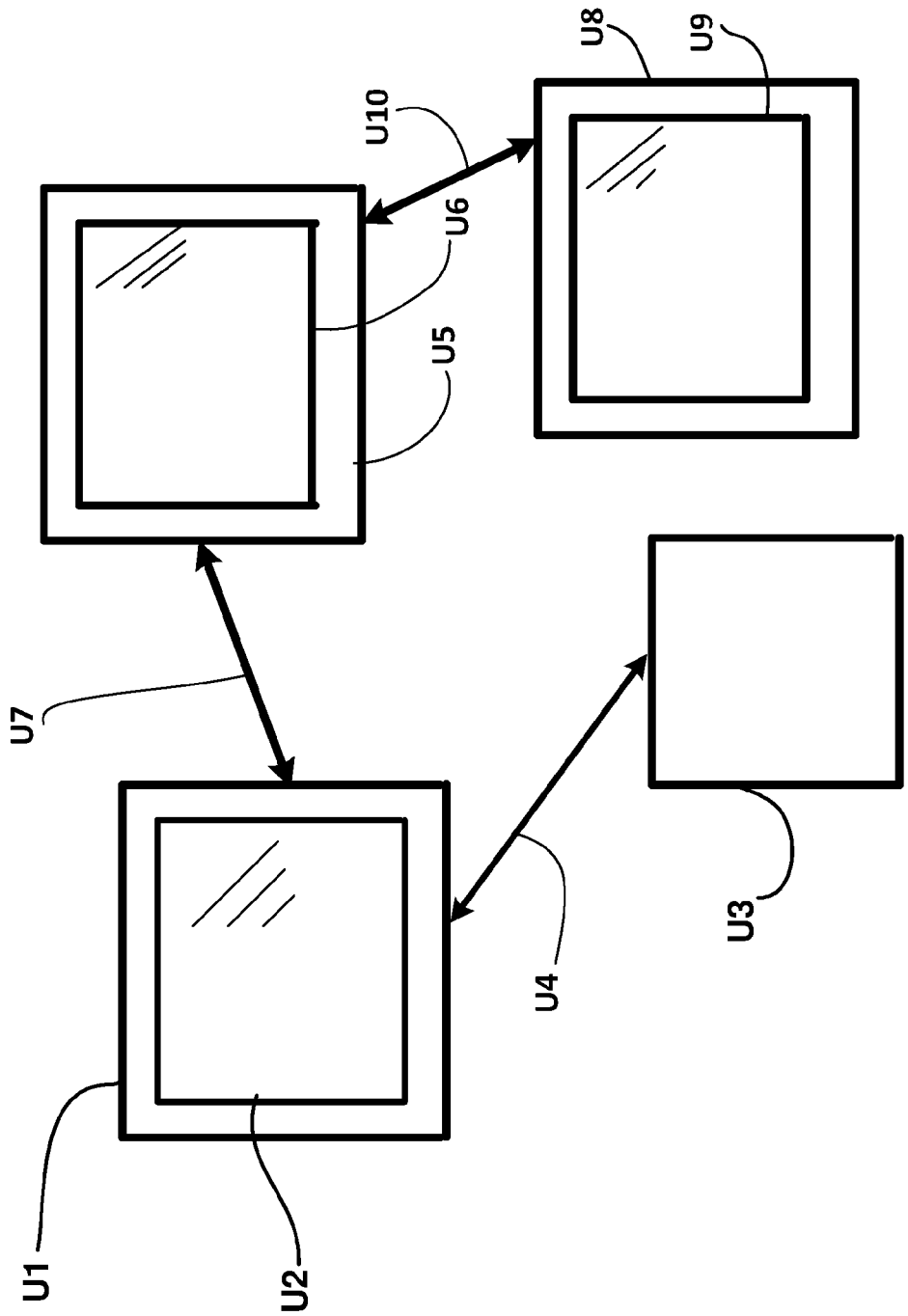
FIG. 17 shows a block diagram for a real-time animated sports entertainment system where spectators use their personal smart mobile devices networked together with a generic data source of geographic coordinates for both the players and the play object to display tracks on an animated backdrop of the play area.

FIG. 17 shows a block diagram for a real-time animated sports entertainment system where spectators use their personal smart mobile devices networked together with a generic data source of geographic coordinates for both the players and the play object to display tracks on an animated backdrop of the play area.

The detailed physical elements disclosed in the drawing shown in FIG. 17 are identified as follows: U1 is the spectator's personal smart mobile device.

U2 is the display screen of U1 on the spectator's personal smart mobile device U1. For example, in a sports stadium there would be a multitudes of spectators viewing their display screens on their personal smart mobile devices.

U3 is a generic data source of real time geographic coordinates for the players and the play object on the play area.

U4 is a bi-directional communications link between U1 and U3.

U5 is another spectator's personal smart mobile device.

U6 is the display screen of U5.

U7 is a bi-directional communications link between U1 and U5.

U8 is yet another spectator's personal smart mobile device.

U9 is the display screen of U8.

U10 is a bi-directional communications link between U5 and U8.

U1 and U5 and U8 are located with their spectators in the same stadium looking at the same sports event on the same play area. U1 and U5 and U8 may each be of a different type of smart mobile device from one another. U1 and U5 and U8 are daisy chained together.

At the request of the spectator, the smart mobile device U1 is downloaded with a mobile App from the internet or from any other site including from flash memory. The purpose of the mobile App is to instruct the smart mobile device's CPU to receive data from the generic data source U3 and to display animated real-time or historic scaled tracks of the players and play object on the smart mobile device's screen U2 against an animated backdrop of the sports venue's play area. The scale of the tracks and the backdrop are made identical to one another to assure their alignment on the screen U2 as they overlay.

U1 is configured to receive encoded signals from generic source U3 comprising each player's real time position geographic coordinates on the play area, and the play object's real time position coordinates on the play area during a game. U1 is comprised of a CPU and a CPU memory.

U1 stores all of the player's real time moment to moment position coordinates on the play area and the play object's real time position coordinates on the play area during a game. The CPU creates a file comprised of all of the historical geographic coordinates of all the player's and play objects during a game. U1 acts as an archival memory storage site as well as a real time memory site.

Link U4 is a bi-directional communications link. Link U4 can take the form of any communication medium that the smart mobile device can talk to. For example, in one preferred embodiment, link U4 is wireless. In another preferred embodiment, link U4 is the internet. In yet another preferred embodiment, link U4 is WIFI. In still another preferred embodiment, link U4 is a LAN.

The App furnishes U1 with software algorithms to process the incoming data streams from U3 to reduce the geographic coordinates it receives from U3 into coordinates referenced to the display screen's coordinate system so that the data streams can be displayed as scaled tracks on the screen U2.

The geographic coordinates of the boundaries of the play area boundaries of all known play areas have been stored on the App. The geographic coordinates of the boundaries of the play area scoring zones of all known play areas have been stored on the App. The geographic coordinates of the boundaries of the play area fouling zones of all known play areas have been stored on the App. The geographic coordinates of the artifacts of all known play areas have been stored on the App.

In addition, the App has software used by the CPU in U1 to configure a scaled backdrop of the play area used during the sports event at the sports venue. U1 initiates the communication link U4 with U3. Upon a request from U1 for data from U3, U3 begins to transmit a continuous uninterrupted data stream to U1. When the sporting event is over, U1 signals U3 to end its transmission. The scale of the tracks and the backdrop are identical to assure that the tracks and the backdrop align properly.

U3 is a generic data source for each and every player's real time geographic coordinates on the play area and the play object's real time position coordinates on the play area during a sporting event. U3's primary function is to provide U1 with a continuous unbroken sequence or stream of geographic coordinates for the players and play object. In one preferred embodiment, the geographic coordinates originate from just one generic source U3. In another preferred embodiment, there is more than one generic source of geographic coordinates in order to have a backup in the event that one of the generic sources fails to perform its function during the sporting event. The generic sources are essentially surveillance systems for capturing the geographic coordinates of the players and the play object on the play area.

U4 is the bi-directional communications link between U1 and U3 that carries signals from the generic source U3 transmitted to U1. Some administrative handshaking between U1 and U3 takes place via U4 before, during and after the sporting event. The transmission of U3 to U1 can be by hard wire and/or wirelessly depending on the nature of the technology of U3. The signal from U3 carried by U4 is encoded with the real time position coordinates of the players and play object on the play area and carries a continuous stream of data.

In another preferred embodiment, the App is downloaded into U1 from U3. The smart mobile device U1 is configured to be downloaded with the App.

The colors for the player's symbols and numbers and tracks on the screen U2 are chosen automatically by the App in U1 as a default setting or by the spectator as an option. The colors for the player's symbols and numbers and tracks on the screen can be chosen alternatively by the spectator using the pull down menu. The colors for the artifact's symbols and numbers and tracks on the screen are chosen automatically by the App. The colors for the artifact's symbols and numbers and tracks on the screen can be chosen alternatively by the spectator using the pull down menu.

In a preferred embodiment, a complete set of every known sports venue play area boundary coordinates are stored at an internet site or in the App. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to U1 where the data is processed and the files are kept up to date.

The system comprises at least one generic data source of real time geographic coordinates for the players and the play object on the play area. The generic data source generates real time geographic coordinates for each and every player and play object on the play area and communicates the real time geographic position coordinates to the smart mobile devices U1 in real time. There are a multitude of smart mobile devices receiving real time geographic coordinates from U3. The smart mobile devices U1 are configured with at least one CPU and a CPU memory. The CPU memory acts as a memory repository for the App and for all data files. Application system software is also resident in the CPU memory. The purpose of the application system software is to provide instructions to the CPU to operate the system.

The generic data source is a resource of the system. The generic data source offers its data services to spectators having smart mobile devices like U1, U5 and U8. The generic data source is a pre-existing resource of the system. The generic data source is configured for furnishing the real-time player and play object geographic coordinates to the smart mobile devices U1. The generic data source is a generic surveillance means for capturing the real-time geographic position coordinates of the players and the play objects moving on the play area. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic coordinates of the players and the play objects in real time to the smart mobile devices U1. The generic data source is a resource providing a continuous stream of geographic coordinates to the smart database.

U1 is configured as a repository for the real time geographic position coordinates that are continuously replenished by signals via U3 from at least one generic data source U3 of real time geographic coordinates for each and every player and play object on the play area of the sports venue. The signals are encoded with the identity of each and every player and play object on the play area; and with the identity of the play area and the sporting event and the sports venue and the local time and date of the sports event; and furthermore the smart mobile device U1 is configured as a repository for all historic geographic position coordinates for each and every player and play object on a play area.

Furthermore the smart mobile device U1 is configured as a repository for lists of all known past and present and future sporting events including the type of the sporting event, the name of sports venue, the start time of sporting events and the date of sporting events.

Furthermore the smart mobile device U1 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen U2.

The smart mobile device U1 is configured with its pre-determined user agent ID for identifying the type of the smart mobile device.

The App configures the smart mobile device U1 to interrogate itself to determine its user agent ID.

The App configures smart mobile device U1 as a repository for lists of pre-determined screen parameters where each screen parameter is for configuring the display of the tracks and the backdrop on the screen U2 of the smart mobile device U1 for which they correspond.

The App is configured with the address of U3 for the smart mobile device U1 to communicate with via U4.

The App programs the smart mobile device U1 to communicate with the smart data base via U4.

The smart mobile device U1 identifies itself to U3 using the user agent ID. The spectator identifies the sporting event's name, date and venue to U1 that the spectator wishes to observe. The spectator can choose a past sporting event to observe or a current sporting event.

Using the sporting venue and date, the smart mobile device U1 selects the corresponding play area for the sporting event from its memory.

The smart mobile device U1 searches the lists of pre-determined screen parameters for the screen parameters for which the spectator's smart mobile device U1 corresponds.

The screen parameters are used by the smart mobile device U1 for transforming the real time geographic coordinates of the players and the play object on the play area into real time screen coordinates for displaying the tracks on the screen U2.

The screen parameters are used by the smart mobile device U1 for transforming the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into an animated backdrop of the play area. The tracks are displayed on the screen against the backdrop. The backdrop is scaled to the same scale factor as the tracks so that they align together on the screen. The App instructs the smart mobile device U1 to configure its screen U2 to display the tracks against the backdrop.

The backdrop of the play area, which is displayed on the screen U2 as a background for the player's and play object's tracks, is configured by the App as an animated rendering of the play area. The primary purpose of the backdrop is to acclimate the spectator as to the location of the players and play object on the play area during the game.

The tracks and the backdrop are configured mutually by the App to be aligned with the x-y Cartesian coordinate system on the screen U2.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App as an animated rendering of the pre-determined artifacts of the play area displayed on the screen U2. The backdrop is further configured by the App as an animated rendering of the play area's scoring zone displayed on the screen U2.

The backdrop is further configured by the App as an animated rendering of the play area's fouling zone displayed on the screen U2. The backdrop is further configured by the App to be aligned with the x-y Cartesian coordinate system of the screen U2.

At the request of their respective spectators, the smart mobile devices U5 and U8 are downloaded with the mobile App from the internet, or from any other site, including from flash memory, and from U1, and even from their point of manufacture or distribution. In the case of downloading from U1, U5 would load from U1 via U7. U8 would load from U5 via U10. In another preferred embodiment, in the case of downloading from U1, U5 would load from U1 via U7, and U8 would load from U1 by being passed through U5 from U1 and on to U8 via U10.

In one preferred embodiment a purpose of the mobile App is to instruct the smart mobile device U5 CPU to receive data from U1; and the U8 CPU to receive data from U5; and U5 to display animated real-time or historic scaled tracks of the players and play object on the smart mobile device's screen U6 against an animated backdrop of the sports venue's play area; and U8 to display animated real-time or historic scaled tracks of the players and play object on the smart mobile device's screen U9 against an animated backdrop of the sports venue's play area; The backdrop for U1, U5 and U8 are identical except for options exercised by their spectators, and differences in scaling due to the differences between the types of smart mobile devices.

The App configures the backdrop. The backdrop is configured as an animated rendering of the play area. The play area is configured with an animated rendering of pre-determined boundary lines wherein the boundary lines are defined by their geographic coordinates; and an animated rendering of at least one pre-determined artifact wherein the artifact is defined by its form and of its geographic coordinates; and an animated rendering of at least one pre-determined scoring zone wherein the scoring zone is defined by its boundaries and by the form of its geographic coordinates; and an animated rendering of at least one pre-determined fouling zone wherein the fouling zone is defined by its boundaries and by the form of its geographic coordinates.

Additionally the purpose of the mobile App is to instruct the smart mobile device's U5 and U8 CPU's to receive data from U1 and U5 respectively and to display animated real-time or historic scaled tracks of the players and play object on the smart mobile device's screen U6 and U9 respectively against an animated backdrop of the sports venue's play area.

The scale of the tracks in U5 and the backdrop in U5 are made identical to one another to assure their alignment on the screen U6 as they overlay. The scale of the tracks in U8 and the backdrop in U8 are made identical to one another to assure their alignment on the screen U9 as they overlay.

The spectator using U5 sees the same tracks displayed on screen U6 as the spectator using U1 sees on screen U2. The spectator using U5 sees the same backdrop displayed on screen U6 as the spectator using U1 sees on screen U2. The only differences between the displays will be due to different display options exercised by the two spectators.

The spectator using U8 sees the same tracks displayed on screen U9 as the spectator using U1 sees on screen U2. The spectator using U8 sees the same backdrop displayed on screen U9 as the spectator using U1 sees on screen U2. The only differences between the displays will be due to different display options exercised by the two spectators.

Now, in the event that U5 and/or U8 want to watch a different sporting event than the one that U1 is watching, then U5 and/or U8 would have to get the geographic coordinates of the players and play object from a different generic data source than U3. In order for them to have access to other generic data sources, U5 and/or U8 would have to have access to the internet or to WIFI for example.

As an example, let us assume that as a game progresses, the players move on the play area from their initial positions. The track for each of the players grows in length corresponding to the movement of the player away from their initial position. The length of the track continues to increase as the player moves from his initial position. The track on the screen follows the geographic coordinate changes on the play area. During a game, the spectator sees the length of the track increasing in the direction of motion of the player on the play area. In a similar fashion, the length of the track of the play object increases as the play object is moved from place to place on the play area and its geographic coordinates change. The screen will appear full of action as the game progresses with tracks increasing in length everywhere. Of course if we were observing a chess game on the screen, there would be no change in the player's tracks on the play area, the chess board, because the players do not typically move from their initial positions, because they are typically seated with their positions fixed on the play area. The players would appear simply as two stationary colored dots on the screen accompanied by their colored identifying numbers or symbols beside the dots. An instance of the backdrop would be the animated rendering of the eight-by-eight matrix of squares on the screen. The boundaries of the play area would be the four sides of the chess board. The artifacts would be the squares of the board. The foul zone would be anyplace off the board outside of the play area. The scoring zone would be anyplace within the play area on the board. There would be no arrowheads to denote the direction of motion, because there is no motion (except maybe at intermission when the players get up for a coffee break, etc.) and move from their table and the chess board. In one preferred embodiment, their might be an exception however if the spectators wished to look just at the motion of the player's hands and not their bodies or the 32 play objects. In that case, as players moved their pieces from place to place on the chess board, their hands would produce tracks on the screen because the geographic coordinates of their hands would change, however small, with each move of a piece. The generic source of the geographic coordinates for each player's hands would relay the coordinates in real time so they can be processed to produce the player's hand's tracks on the screen of the spectator's smart mobile device. The spectator would note that the two tracks on the screen would grow alternately as one player's move would follow the other in succession. Initially before the game began, there would be no dots on the screen because neither player's hands are permitted in the play area before the game begins, that is no player is permitted to touch his pieces. Only the backdrop would show on the screen before the game begins. In a preferred embodiment, the backdrop would consist of an 8×8 matrix of squares mimicking the look of a chessboard. The backdrop would fill the screen superimposed on its invisible Cartesian coordinate axes. When the game begins, the hand of the first player to make a move would show as the first colored dot on the screen on the square where the piece that he or she moved initially resided. As the first player moves his piece to another square on the board, another dot of the same color would show on the screen against the backdrop of that square. A line would then show on the screen connecting the dots. An arrowhead would then show on the screen at the location of the second dot and pointing away from the first dot along the direction of the line. As the game progressed the arrowhead would move to the most recent dot, and as before, point away from the previous dot. Then as the second player made his/her move, the hand of the second player to make a move would show on the screen as a colored dot of another color on the screen on the square where the piece that he or she moved initially resided. The action on the screen would progress as before. There are 32 pieces in the game of chess. When one player takes another player's piece, his colored dot would appear in one of the same squares with the other player's colored dot. When this event occurs, a momentary message appears on the screen that the player has scored a piece. When the player's hand removes his opponent's piece from the board, he places the piece in the foul zone. In a preferred embodiment, the spectator has the option of showing the motion (tracks) of the player's hand only on the board or off the board as well. As a note, showing the movements of the player's hands "off the board" on the screen, might be considered as confusing. When "checkmate" finally occurs, all activity on the play area ceases, and the tracks on the screen stop growing. Therefore there are 32 play objects. Chess is considerably different from "a game of track" where there are only runners (players) and no play objects. If a baton were used, like in a marathon, then the baton would become the play object because it would be passed from player to player (runner to runner) and move with the runners as it is carried by them around the track.

FIG. 18

Figure 18:
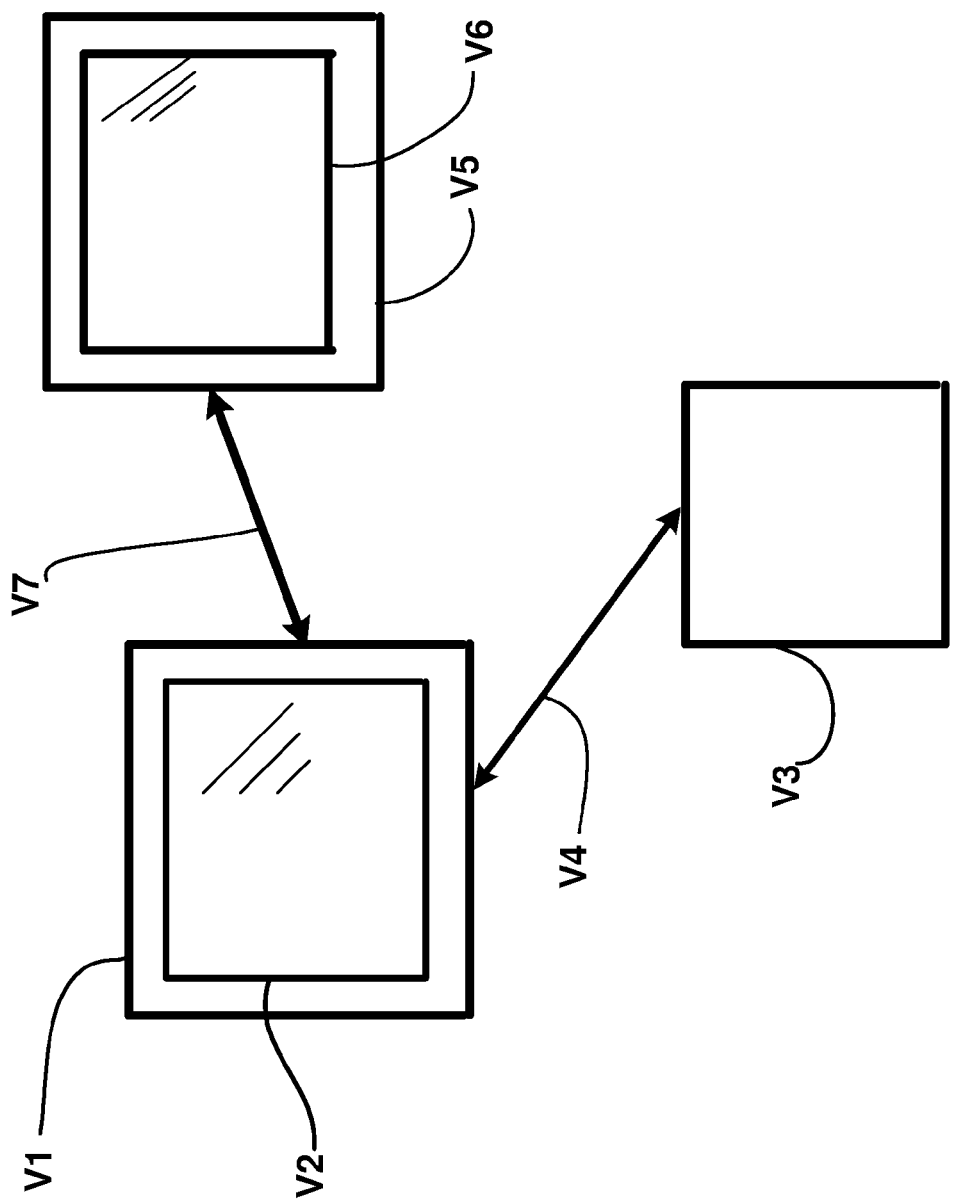
FIG. 18 shows a block diagram for a real-time animated sports entertainment system where spectators use their personal smart mobile devices networked together at a venue with a generic data source of geographic coordinates for both the players and the play object to display tracks on an animated play area background against an animated backdrop of the play area.

FIG. 18 shows a block diagram for a real-time animated sports entertainment system where spectators use their personal smart mobile devices networked together at a venue with a generic data source of geographic coordinates for both the players and the play object to display tracks on an animated play area background against an animated backdrop of the play area.

The detailed physical elements disclosed in the drawing shown in FIG. 18 are identified as follows: V1 is the spectator's personal smart mobile device.

V2 is the display screen of V1 on the spectator's personal smart mobile device V1. For example, in a sports stadium there would be a multitudes of spectators viewing their display screens on their personal smart mobile devices.

V3 is a generic data source of real time geographic coordinates for the players and the play object on the play area.

V4 is a bi-directional communications link between V1 and V3.

V5 is another spectator's personal smart mobile device.

V6 is the display screen of V5.

V7 is a bi-directional communications link between V1 and V5.

V1 and V5 are located with their spectators in the same stadium looking at the same sports event on the same play area. V1 and V5 may each be of a different type of smart mobile device from one another.

At the request of the spectator, the smart mobile device V1 is downloaded with a mobile App from the internet or from any other site including from flash memory. The purpose of the mobile App is to instruct the smart mobile device's CPU to receive data from the generic data source V3 and to display animated real-time or historic scaled tracks of the players and play object on the smart mobile device's screen V2 against an animated backdrop of the sports venue's play area. The scale of the tracks on V2 and the backdrop on V2 are made identical to one another to assure their alignment on the screen V2 as they overlay.

V1 is configured to receive encoded signals from generic source V3 comprising each player's real time position geographic coordinates on the play area, and the play object's real time position coordinates on the play area during a game. V1 is comprised of a CPU and a CPU memory.

V1 stores all of the player's real time moment to moment position coordinates on the play area and the play object's real time position coordinates on the play area during a game. The CPU creates a file comprised of all of the historical geographic coordinates of all the player's and play objects during a game. V1 acts as an archival memory storage site as well as a real time memory site.

Link V4 is a bi-directional communications link. Link V4 can take the form of any communication medium that the smart mobile device can talk to. For example, in one preferred embodiment, link V4 is wireless. In another preferred embodiment, link V4 is the internet. In yet another preferred embodiment, link V4 is WIFI. In still another preferred embodiment, link V4 is a LAN.

The App furnishes V1 with software algorithms to process the incoming data streams from V3 to reduce the geographic coordinates it receives from V3 into coordinates referenced to the display screen's coordinate system so that the data streams can be displayed as scaled tracks on the screen V2.

The geographic coordinates of the boundaries of the play area boundaries of all known play areas have been stored on the App of V1. The geographic coordinates of the boundaries of the play area scoring zones of all known play areas have been stored on the App. The geographic coordinates of the boundaries of the play area fouling zones of all known play areas have been stored on the App. The geographic coordinates of the artifacts of all known play areas have been stored on the App.

In addition, the App has software used by the CPU in V1 to configure a scaled backdrop of the play area used during the sports event at the sports venue. V1 initiates the communication link V4 with V3. Upon a request from V1 for data from V3, V3 begins to transmit a continuous uninterrupted data stream to V1. When the sporting event is over, V1 signals V3 to end its transmission. The scale of the tracks and the backdrop are identical to assure that the tracks and the backdrop align properly.

V3 is a generic data source for each and every player's real time geographic coordinates on the play area and the play object's real time position coordinates on the play area during a sporting event. V3's primary function is to provide V1 with a continuous unbroken sequence or stream of geographic coordinates for the players and play object. In one preferred embodiment, the geographic coordinates originate from just one generic source V3. In another preferred embodiment, there is more than one generic source of geographic coordinates in order to have a backup in the event that one of the generic sources fails to perform its function during the sporting event. The generic sources are essentially surveillance systems for capturing the geographic coordinates of the players and the play object on the play area.

V4 is the bi-directional communications link between V1 and V3 that carries signals from the generic source V3 transmitted to V1. Some administrative handshaking between V1 and V3 takes place via V4 before, during and after the sporting event. The transmission of V3 to V1 can be by hard wire and/or wirelessly depending on the nature of the technology of V3. The signal from V3 carried by V4 is encoded with the real time position coordinates of the players and play object on the play area and carries a continuous stream of data.

In another preferred embodiment, the App is downloaded into V1 from V3. The smart mobile device V1 is configured to be downloaded with the App.

The colors for the player's symbols and numbers and tracks on the screen V2 are chosen automatically by the App or the spectator as a default setting. The colors for the player's symbols and numbers and tracks on the screen V2 can be chosen alternatively by the spectator using the pull down menu. The colors for the artifact's symbols and numbers and tracks on the screen V2 are chosen automatically by the App or the smart database V3 as a default setting. The colors for the artifact's symbols and numbers and tracks on the screen V2 can be chosen alternatively by the spectator using the pull down menu.

In a preferred embodiment, a complete set of every known sports venue play area boundary coordinates are stored at an internet site or in the App. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to V1 where the data is processed and the files are kept up to date.

The system comprises at least one generic data source of real time geographic coordinates for the players and the play object on the play area. The generic data source generates real time geographic coordinates for each and every player and play object on the play area and communicates the real time geographic position coordinates to the smart mobile devices V1 in real time. There are a multitude of smart mobile devices receiving real time geographic coordinates from V3. The smart mobile devices V1 are configured with at least one CPU and a CPU memory. The CPU memory acts as a memory repository for the App and for all data files. Application system software is also resident in the CPU memory. The purpose of the application system software is to provide instructions to the CPU to operate the system.

The generic data source is a resource of the system. The generic data source pre-exists. The generic data source is a pre-existing resource of the system. The generic data source is configured for furnishing the real-time player and play object geographic coordinates to the smart mobile devices V1. The generic data source is a generic surveillance means for capturing the real-time geographic position coordinates of the players and the play objects moving on the play area. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic coordinates of the players and the play objects in real time to the smart mobile devices V1. The generic data source is a resource providing a continuous stream of geographic coordinates to the smart database.

V1 is configured as a repository for the real time geographic position coordinates that are continuously replenished by signals via V3 from at least one generic data source V3 of real time geographic coordinates for each and every player and play object on the play area of the sports venue. The signals are encoded with the identity of each and every player and play object on the play area; and with the identity of the play area and the sporting event and the sports venue and the local time and date of the sports event; and furthermore the smart mobile device V1 is configured as a repository for all historic geographic position coordinates for each and every player and play object on a play area.

Furthermore the smart mobile device V1 is configured as a repository for lists of all known past and present and future sporting events including the type of the sporting event, the name of sports venue, the start time of sporting events and the date of sporting events.

Furthermore the smart mobile device V1 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen V2.

The smart mobile device V1 is configured with its pre-determined user agent ID for identifying the type of the smart mobile device.

The App configures the smart mobile device V1 to interrogate itself to determine its user agent ID.

The App configures smart mobile device V1 as a repository for lists of pre-determined screen parameters where each screen parameter is for configuring the display of the tracks and the backdrop on the screen V2 of the smart mobile device V1 for which they correspond.

The App is configured with the address of V3 for the smart mobile device V1 to communicate with V3 via V4.

The App programs the smart mobile device V1 to communicate with the smart data base via V4.

The smart mobile device V1 identifies itself to V3 using the user agent ID. The spectator identifies the sporting event's name, date and venue to V1 that the spectator wishes to observe. The spectator can choose a past sporting event to observe or a current sporting event.

Using the sporting venue and date, the smart mobile device V1 selects the corresponding play area for the sporting event from its memory.

The smart mobile device V1 searches the lists of pre-determined screen parameters for the screen parameters for which the spectator's smart mobile device V1 corresponds.

The screen parameters are used by the smart mobile device V1 for transforming the real time geographic coordinates of the players and the play object on the play area into real time screen coordinates for displaying the tracks on the screen V2.

The screen parameters are used by the smart mobile device V1 for transforming the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into an animated backdrop of the play area. The tracks are displayed on the screen against the backdrop. The backdrop is scaled to the same scale factor as the tracks so that they align together on the screen. The App instructs the smart mobile device V1 to configure its screen V2 to display the tracks against the backdrop.

The App configures the backdrop. The backdrop is configured as an animated rendering of the play area. The play area is configured with an animated rendering of pre-determined boundary lines wherein the boundary lines are defined by their geographic coordinates; and an animated rendering of at least one pre-determined artifact wherein the artifact is defined by its form and of its geographic coordinates; and an animated rendering of at least one pre-determined scoring zone wherein the scoring zone is defined by its boundaries and by the form of its geographic coordinates; and an animated rendering of at least one pre-determined fouling zone wherein the fouling zone is defined by its boundaries and by the form of its geographic coordinates.

The backdrop of the play area, which is displayed on the screen V2 as a background for the player's and play object's tracks, is configured by the App as an animated rendering of the play area. The primary purpose of the backdrop is to acclimate the spectator as to the location of the players and play object on the play area during the game.

The tracks and the backdrop are configured mutually by the App to be aligned with the x-y Cartesian coordinate system on the screen V2.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App in V1 as an animated rendering of the pre-determined artifacts of the play area displayed on the screen V2. The backdrop is further configured by the App as an animated rendering of the play area's scoring zone displayed on the screen V2. The backdrop is further configured by the App as an animated rendering of the play area's fouling zone displayed on the screen V2. The backdrop is further configured by the App to be aligned with the x-y Cartesian coordinate system of the screen V2.

At the request of its spectator, the smart mobile device V5 is downloaded with the mobile App from its manufactures, or from the internet, or from any other site including from flash memory, or from V1 (for example, V5 would load from V1 via V7).

The backdrop of the play area is configured by the App in V5 as an animated rendering of the pre-determined artifacts of the play area displayed on the screen V6. The backdrop is further configured by the App in V5 as an animated rendering of the play area's scoring zone displayed on the screen V6. The backdrop is further configured by the App in V5 as an animated rendering of the play area's fouling zone displayed on the screen V6. The backdrop is further configured by the App in V5 to be aligned with the x-y Cartesian coordinate system of the screen V6.

Additionally the purpose of the mobile App in V5 is to instruct the smart mobile device V5 CPU to receive real time geographic coordinate data from V3 passed through V1 and to display animated real-time scaled tracks or historic scaled tracks of the players and play object on the smart mobile device's screen V6 against the animated backdrop of the sports venue's play area. The backdrop for V1 and V5 are identical except for menu options exercised by their spectators.

The scale of the tracks and the backdrop in V5 are made identical to one another to assure their alignment on the screen V6 as they overlay.

The spectator using V5 sees the same tracks displayed on screen V6 as the spectator using V1 sees on screen V2. The spectator using V5 sees the same backdrop displayed on screen V6 as the spectator using V1 sees on screen V2. The only differences between the displays will be due to different display options exercised by the spectators.

V5 is configured to receive encoded signals from generic source V3 comprising each player's real time position geographic coordinates on the play area, and the play object's real time position coordinates on the play area during a game. V5 is comprised of a CPU and a CPU memory.

V5 stores all of the player's real time moment to moment position coordinates on the play area and the play object's real time position coordinates on the play area during a game. The CPU creates a file comprised of all of the historical geographic coordinates of all the player's and play objects during a game. V5 acts as an archival memory storage site as well as a real time memory site.

Link V7 is a bi-directional communications link. Link V7 can take the form of any communication medium that the smart mobile device can talk to. For example, in one preferred embodiment, link V7 is wireless. In another preferred embodiment, link V7 is the internet. In yet another preferred embodiment, link V7 is WIFI. In still another preferred embodiment, link V7 is a LAN.

The App furnishes V5 with software algorithms to process the incoming data streams from V3 to reduce the geographic coordinates it receives from V3 into coordinates referenced to the display screen's coordinate system so that the data streams can be displayed as scaled tracks on the screen V6.

The geographic coordinates of the boundaries of the play area boundaries of all known play areas have been stored on the App for V5. The geographic coordinates of the boundaries of the play area scoring zones of all known play areas have been stored on the App for V5. The geographic coordinates of the boundaries of the play area fouling zones of all known play areas have been stored on the App for V5. The geographic coordinates of the artifacts of all known play areas have been stored on the App for V5.

In addition, the App has software used by the CPU in V5 to configure a scaled backdrop of the play area used during the sports event at the sports venue. V5 initiates the communication link V7 with V3 through V1. Upon a request from V5 for data from V3, V1 begins to pass through the continuous uninterrupted data stream it receives from V3 to V5. When the sporting event is over, V5 signals V1 to end the pass through of coordinates to V5. The scale of the tracks and the scale of the backdrop are calculated to be identical to assure that the tracks and the backdrop align properly on screen V6.

V3 is a generic data source for each and every player's real time geographic coordinates on the play area and the play object's real time position coordinates on the play area during a sporting event. V3's primary function is to provide V1 and V5 with a continuous unbroken sequence or stream of geographic coordinates for the players and play object. In one preferred embodiment, the geographic coordinates originate from just one generic source V3. In another preferred embodiment, there is more than one generic source of geographic coordinates in order to have a backup in the event that one of the generic sources fails to perform its function during the sporting event. The generic sources are essentially surveillance systems for V1 and V5 for capturing the geographic coordinates of the players and the play object on the play area.

V7 is the bi-directional communications link between V1 and V5 that carries signals from the generic source V3 transmitted to V1. Some administrative handshaking between V1 and V5 takes place via V7 before, during and after the sporting event. The signals transmitted from V1 to V5 via V7 can be by hard wire and/or wirelessly depending on the nature of the technology of V1 and V5. The signal from V1 carried by V7 is encoded with the real time position coordinates of the players and play object on the play area and carries a continuous stream of data.

In another preferred embodiment, the App in V5 is downloaded into V5 from V3. The smart mobile device V5 is configured to be downloaded with the App. In this embodiment the App would be resident in V3.

The colors for the player's symbols and numbers and tracks on the screen V6 are chosen automatically by the App in V5 as a default setting or by the spectator as an option. The colors for the player's symbols and numbers and tracks on the screen can be chosen alternatively by the spectator using the pull down menu. The colors for the artifact's symbols and numbers and tracks on the screen are chosen automatically by the App in V5. The colors for the artifact's symbols and numbers and tracks on the screen V6 can be chosen alternatively by the spectator using the pull down menu.

In a preferred embodiment, a complete set of every known sports venue play area boundary coordinates are stored at an internet site or in the App in V5. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to V1 and passed through via V7 to V5 where the data is processed and the files are kept up to date.

The system comprises at least one generic data source of real time geographic coordinates for the players and the play object on the play area. The generic data source generates real time geographic coordinates for each and every player and play object on the play area and communicates the real time geographic position coordinates to the smart mobile device V1 and passed through V1 to V5 via V7 in real time. The smart mobile devices V5 are configured with at least one CPU and a CPU memory. The CPU memory acts as a memory repository for the App in V5 and for all data files. Application system software is also resident in the CPU memory of V5. The purpose of the application system software is to provide instructions to the CPU in V5 to operate the system.

The generic data source is a resource of the system. The generic data source offers its data services to spectators having smart mobile devices like V1 and V5. The generic data source is configured for furnishing the real-time player and play object geographic coordinates to the smart mobile devices V1 and V5. The generic data source is a generic surveillance means for capturing the real-time geographic position coordinates of the players and the play objects moving on the play area and delivering them to V5. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic coordinates of the players and the play objects in real time to the smart mobile devices V1. The generic data source is a resource providing a continuous stream of geographic coordinates to the smart mobile devices.

V5 is configured as a repository for the real time geographic position coordinates that are continuously replenished by signals via V7 from at least one generic data source V3 of real time geographic coordinates for each and every player and play object on the play area of the sports venue. The signals are encoded with the identity of each and every player and play object on the play area; and with the identity of the play area and the sporting event and the sports venue and the local time and date of the sports event; and furthermore the smart mobile device V5 is configured as a repository for all historic geographic position coordinates for each and every player and play object on a play area.

Furthermore the smart mobile device V5 is configured as a repository for lists of all known past and present and future sporting events including the type of the sporting event, the name of sports venue, the start time of sporting events and the date of sporting events.

Furthermore the smart mobile device V5 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen V2.

The smart mobile device V5 is configured with its pre-determined user agent ID for identifying the type of the smart mobile device.

The App configures the smart mobile device V5 to interrogate itself to determine its user agent ID.

The App configures smart mobile device V5 as a repository for lists of pre-determined screen parameters where each screen parameter is for configuring the display of the tracks and the backdrop on the screen V6 of the smart mobile device V5 for which they correspond.

The App is configured with the address of V3 for the smart mobile device V5 to communicate with V3 via V7 through V1.

The smart mobile device V5 identifies itself to V1 using the user agent ID. The spectator identifies the sporting event's name, date and venue to V1 that the spectator wishes to observe. The spectator chooses the current sporting event being tracked by V1.

Using the sporting venue and date, the smart mobile device V5 selects the corresponding play area for the sporting event from its memory.

The smart mobile device V5 searches the lists of pre-determined screen parameters for the screen parameters for which the spectator's smart mobile device V5 corresponds.

The screen parameters are used by the smart mobile device V5 for transforming the real time geographic coordinates of the players and the play object on the play area into real time screen coordinates for displaying the tracks on the screen V6.

The screen parameters are used by the smart mobile device V5 for transforming the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into an animated backdrop of the play area. The tracks are displayed on the screen against the backdrop. The backdrop is scaled to the same scale factor as the tracks so that they align together on the screen. The App instructs the smart mobile device V5 to configure its screen V6 to display the tracks against the backdrop. The backdrop of the play area, which is displayed on the screen V6 as a background for the player's and play object's tracks, is configured by the App in V5 as an animated rendering of the play area. The primary purpose of the backdrop is to acclimate the spectator as to the location of the players and play object on the play area during the game.

The tracks and the backdrop are configured mutually by the App in V5 to be aligned with the x-y Cartesian coordinate system on the screen V6.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App in V5 as an animated rendering of the pre-determined artifacts of the play area displayed on the screen V6. The backdrop is further configured by the App in V5 as an animated rendering of the play area's scoring zone displayed on the screen V6. The backdrop is further configured by the App in V5 as an animated rendering of the play area's fouling zone displayed on the screen V6. The backdrop is further configured by the App in V5 to be aligned with the x-y Cartesian coordinate system of the screen V6.

FIG. 19

FIG. 19 shows a block diagram for a real-time animated sports entertainment system where two or more spectators use their personal smart mobile devices together with a downloaded generic data source of geographic coordinates for both the players and the play object in conjunction with a smart database to display tracks on an animated play area background.

The detailed physical elements disclosed in the drawing shown in FIG. 19 are identified as follows: W1 is the spectator's personal smart mobile device. W2 is the display screen on the spectator's personal smart mobile device. For example, in a sports stadium there would be a multitudes of spectators viewing their display screens on their personal smart mobile devices. W3 is a smart database. At the request of the spectator, the smart mobile device W1 is downloaded from W3 into W1 with a mobile App. The purpose of the mobile App is to instruct the smart mobile device's CPU to receive data from the smart database W3 and to display animated real-time or historic scaled tracks of the players and play object on the smart mobile device's screen 2 against an animated backdrop of the sports venue's play area. The scale of the tracks and the backdrop are made identical to one another to assure their alignment on the screen W2 as they overlay. In one preferred embodiment, the App is downloaded into W1 from W3. In another preferred embodiment, the mobile App is downloaded into W1 from any other alternate site. For example, the App can be made available on flash memory and on the internet.

W3 is configured to receive encoded signals from generic source W5 comprising each player's real time position geographic coordinates on the play area, and the play object's real time position coordinates on the play area during a game. W3 is comprised of a CPU and a CPU memory. W3 stores all of the player's real time moment to moment position coordinates on the play area and the play object's real time position coordinates on the play area during a game. The CPU creates a master file comprised of all of the historical geographic coordinates of all the player's and play objects during a game. W3 acts as an archival memory storage site as well as a real time memory site.

In one preferred embodiment, W3 multiplexes the geographic coordinate data from all the player's and the play objects into a single continuous data stream of geographic coordinates. The single continuous data stream of geographic coordinates is fed from W3 into W1 via link W4. Link W4 is a bi-directional communications link. Link W4 can take the form of any communication medium that the smart mobile device can talk to. For example, in one preferred embodiment, link W4 is wireless. In another preferred embodiment, link W4 is the internet. In yet another preferred embodiment, link W4 is WIFI. In still another preferred embodiment, link W4 is a LAN.

The App in W1 furnishes software algorithms installed within it to process the incoming data streams from W3 to reduce the geographic coordinates it receives into coordinates referenced to the display screen's coordinate system so that the data streams can be displayed as scaled tracks on the screen W2.

In another preferred embodiment, W3 processes the geographic coordinate data from all the player's and the play object's and transforms the data into coordinates referenced to the display screen's coordinate system so that the data streams can be displayed as scaled tracks on the screen W2. W3 multiplexes the transformed data into a single continuous data stream which it communicates to W1 via W4. W3 has software algorithms installed within it to process and transform the position coordinates it receives from W5 to coordinates referenced to the display screen's coordinate system.

The geographic coordinates of the boundaries of all known play areas have been pre-programmed into W3. The geographic coordinates of the boundaries of the play area scoring zones of all known play areas have been pre-programmed into W3. The geographic coordinates of the boundaries of the play area fouling zones of all known play areas have been pre-programmed into W3. The geographic coordinates of the artifacts of all known play areas have been pre-programmed into W3. W3 is also a repository in memory for the App. The spectator uses W1 to make a request to W3 via W4 to download the App. The App then downloads to W1 via W4 from W3.

In addition, W3 has software to comprise a scaled backdrop of the play area used during the sports event at the sports venue. In one preferred embodiment, W3 configures the scaled backdrop and downloads the backdrop into W1 for display on W2. W3 initiates the communication link with W5. Upon a request from W3 for data from W5, W5 begins to transmit a continuous uninterrupted data stream to W3. When the sporting event is over, W3 signals W5 to end its transmission. The scale of the tracks and the backdrop are identical to assure that the tracks and the backdrop align.

W5 is a generic data source for each and every player's real time geographic coordinates on the play area and the play object's real time position coordinates on the play area during a sporting event. W5's primary function is to provide W3 with a continuous unbroken sequence or stream of geographic position coordinates for the players and play object. In one preferred embodiment, W6 originates from one generic source W5. In another preferred embodiment, there is more than one generic source for W6 in order to have a backup in the event that one of the generic sources fails to perform its function during the sporting event. The generic sources are essentially surveillance systems for capturing the geographic coordinates of the players and the play object on the play area.

W6 is the link between W5 and W3 that carries signals from the generic source W5 transmitted to the database W3. Some administrative handshaking between W3 and W5 takes place via W6 before and after the sporting event. The transmission of W6 to W3 can be by hard wire and/or wirelessly depending on the nature of the technology of W5. The signal W6 is encoded with the real time position coordinates of the players and play object on the play area and carries a continuous stream of data.

W7 is another spectator's personal smart mobile device. W8 is the display screen on the spectator's personal smart mobile device W7. For example, in a sports stadium there would be a multitudes of spectators viewing their display screens on their personal smart mobile devices. At the request of the spectator, the smart mobile device W7 is downloaded from W3 into W7 with a mobile App. The purpose of the mobile App is to instruct the smart mobile device's CPU to receive data from the smart database W3 and to display animated real-time or historic scaled tracks of the players and play object on the smart mobile device's screen W7 against an animated backdrop of the sports venue's play area. The scale of the tracks and the backdrop are made identical to one another to assure their alignment on the screen W8 as they overlay. In one preferred embodiment, the App is downloaded into W7 from W3.

In another preferred embodiment, the mobile App is downloaded into W7 from any other alternate site. For example, the App can be made available on flash memory and on the internet.

In one preferred embodiment, the App is downloaded into W7 from W3. The smart mobile device W7 is configured to be downloaded with the App. The colors for the player's symbols and numbers and tracks on the screen are chosen automatically by the App or the database W3 software as a default setting. The colors for the player's symbols and numbers and tracks on the screen can be chosen alternatively by the spectator using the pull down menu. The colors for the artifact's symbols and numbers and tracks on the screen are chosen automatically by the App or the smart database W3 as a default setting. The colors for the artifact's symbols and numbers and tracks on the screen can be chosen alternatively by the spectator using the pull down menu.

In a preferred embodiment, a complete set of every known sports venue play area boundary coordinates are stored in W3. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to W3 where the data is processed and the files are kept up to date.

The system comprises at least one generic data source of real time geographic position coordinates for the players and the play object on the play area. The generic data source generates real time geographic position coordinates for each and every player and play object on the play area and communicates the real time geographic position coordinates to the database in real time. The smart database W3 is configured with at least one CPU and a CPU memory. The CPU memory acts as a memory repository for data files. Application system software is also resident in the CPU memory. The purpose of the application system software is to provide instructions to the CPU to operate the system.

The generic data source is a resource of the system. The generic data source offers its data services to smart data bases like W3. The generic data source is a pre-existing resource of the system. The generic data source is configured for furnishing the real-time player and play object geographic position coordinates to the smart database. The generic data source is a generic surveillance means for capturing the real-time geographic position coordinates of the players and the play objects moving on the play area. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic position coordinates of the players and the play objects in real time to the smart database. The generic data source is a resource for a continuous stream of geographic position coordinates to the smart database.

The smart database W3 is configured as a repository for the real time geographic position coordinates that are continuously replenished by signals W6 from at least one generic data source W5 of real time geographic position coordinates for each and every player and play object on the play area of the sports venue. The signals W6 are encoded with the identity of each and every player and play object on the play area; and with the identity of the play area and the sporting event and the sports venue and the local time and date of the sports event; and wherein furthermore the smart database W3 is configured as a repository for all historic geographic position coordinates for each and every player and play object on a play area.

Furthermore the smart database W3 is configured as a repository for lists of all known past and present and future sporting events including the type of the sporting event, the name of sports venue, the start time of sporting events and the date of sporting events.

Furthermore the smart database W3 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen W8.

The smart mobile device W7 is configured with its pre-determined user agent ID for identifying the type of the smart mobile device.

The App configures the smart mobile device W7 to interrogate itself to determine its user agent ID.

The smart data base W3 is configured as a repository for lists of pre-determined screen parameters where each screen parameter is for configuring the display of the tracks and the backdrop on the screen W8 of the smart mobile device W7 for which they correspond.

The App in W7 is configured with the address of the smart data base W3 for the smart mobile device W7 to communicate with the smart data base via W9.

The App programs the smart mobile device W1 to communicate with the smart data base via W9.

The smart mobile device W7 identifies itself to the smart data base W3 using the user agent ID. The spectator identifies the sporting event's name, date and venue that the spectator wishes to observe to the smart data base. The spectator can choose a past sporting event to observe or a current sporting event.

Using the sporting venue and date, the smart data base W3 selects the corresponding play area for the sporting event from its memory.

The smart data base W3 multiplexes the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into a single data packet signal for transmission to said smart mobile device.

The App configures the backdrop. The backdrop is configured as an animated rendering of the play area. The play area is configured with an animated rendering of pre-determined boundary lines wherein the boundary lines are defined by their geographic coordinates; and an animated rendering of at least one pre-determined artifact wherein the artifact is defined by its form and of its geographic coordinates; and an animated rendering of at least one pre-determined scoring zone wherein the scoring zone is defined by its boundaries and by the form of its geographic coordinates; and an animated rendering of at least one pre-determined fouling zone wherein the fouling zone is defined by its boundaries and by the form of its geographic coordinates.

The smart data base W3 recognizes the identity of the smart mobile device W7 by its user agent ID and searches the lists of pre-determined screen parameters for the screen parameters for which the spectator's smart mobile device W7 corresponds.

The smart data base communicates the screen parameters to the smart mobile device W7 via W9. The screen parameters are used furthermore by the smart data base W3 for transforming the real time geographic position coordinates of the players and the play object on the play area into real time screen coordinates for displaying the tracks on the screen W8. The smart data base communicates screen parameters to the smart mobile device that meet each individual smart mobile device type's requirements to display the tracks on the screen. In a preferred embodiment where the player and play object's locations on the play area are given in terms of generalized coordinates (rather than geographic coordinates), the smart data base transforms whatever the generalized coordinates are into real time screen coordinates of the players and play object. In addition, when the play area boundaries are given in generalized coordinates, and the scoring zone boundaries are given as generalized coordinates, and the fouling zone boundaries are given as generalized coordinates, and the artifacts boundaries have generalized coordinates, the smart data base transforms whatever the generalized coordinates are into real time screen coordinates so the backdrop can be displayed on the screen.

For the selected play area, the smart data base W3 multiplexes the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into a play area data packet for transmission to the smart mobile device W7.

The smart data base W3 communicates the screen parameters to the smart mobile device W7 via W8. The smart data base W3 recognizes the identity of the smart mobile device W7 by its user agent ID and searches for said screen parameters corresponding to the user agent ID.

The screen parameters are used by the smart data base W3 for transforming the real time geographic position coordinates of the players and the play object on the play area into real time position coordinates of the tracks of the players and the play object on the screen W9 of the smart mobile device W7 for scaling and displaying the tracks on the screen W8.

W9 is configured for communicating the play area data packet to the smart mobile device W7. The smart mobile device W7 is further configured by the App for demultiplexing the play area data packet. The smart mobile device W7 is further configured by the App for displaying the demultiplexed play area data packet as a backdrop of the play area on the screen W8.

The smart data base W3 recognizes the user agent ID and communicates an encoded signal back to the smart mobile device W7 via W9. The encoded signal carries data used by the App to instruct the smart mobile device W7 to configure its screen W8 to display the tracks against the backdrop.

The backdrop of the play area, which is displayed on the screen W8 as a background for the player's and play object's tracks, is configured by the App as an animated rendering of the play area. The primary purpose of the backdrop is to acclimate the spectator as to the location of the players and play object on the play area during the game.

The tracks and the backdrop are configured mutually by the App to be aligned with the x-y Cartesian coordinate system on the screen W8.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App as an animated rendering of the pre-determined artifacts of the play area displayed on the screen W8. The backdrop is further configured by the App as an animated rendering of the play area's scoring zone displayed on the screen W8. The backdrop is further configured by the App as an animated rendering of the play area's fouling zone displayed on the screen W8. The backdrop is further configured by the App to be aligned with the x-y Cartesian coordinate system of the screen W8.

FIG. 20

FIG. 20 shows a block diagram for a real-time animated sports entertainment system where spectators use their personal smart mobile devices networked together with a generic data source of geographic coordinates for both the players and the play object to display tracks on an animated backdrop of the play area.

The detailed physical elements disclosed in the drawing shown in FIG. 17 are identified as follows:

X1 is the spectator's personal smart mobile device.

X2 is the display screen of X1 on the spectator's personal smart mobile device X1. For example, in a sports stadium there would be a multitudes of spectators viewing their display screens on their personal smart mobile devices.

X3 is a generic data source of real time geographic coordinates for the players and the play object on the play area.

X4 is a bi-directional communications link between X1 and X3.

X5 is another spectator's personal smart mobile device.

X6 is the display screen of X5.

X7 is a bi-directional communications link between X1 and X5.

X8 is yet another spectator's personal smart mobile device.

X9 is the display screen of X8.

X10 is a bi-directional communications link between X1 and X8.

X1 and X5 and X8 are located with their spectators in the same stadium looking at the same sports event on the same play area. X1 and X5 and X8 may each be of a different type of smart mobile device from one another. X1 and X5 and X8 are daisy chained together.

At the request of the spectator, the smart mobile device X1 is downloaded with a mobile App from the internet or from any other site including from flash memory. The purpose of the mobile App is to instruct the smart mobile device's CPU to receive data from the generic data source X3 and to display animated real-time or historic scaled tracks of the players and play object on the smart mobile device's screen X2 against an animated backdrop of the sports venue's play area. The scale of the tracks and the backdrop are made identical to one another to assure their alignment on the screen X2 as they overlay.

X1 is configured to receive encoded signals from generic source X3 comprising each player's real time position geographic coordinates on the play area, and the play object's real time position coordinates on the play area during a game. X1 is comprised of a CPU and a CPU memory.

X1 stores all of the player's real time moment to moment position coordinates on the play area and the play object's real time position coordinates on the play area during a game. The CPU creates a file comprised of all of the historical geographic coordinates of all the player's and play objects during a game. X1 acts as an archival memory storage site as well as a real time memory site.

Link X4 is a bi-directional communications link. Link X4 can take the form of any communication medium that the smart mobile device can talk to. For example, in one preferred embodiment, link X4 is wireless. In another preferred embodiment, link X4 is the internet. In yet another preferred embodiment, link X4 is WIFI. In still another preferred embodiment, link X4 is a LAN.

The App furnishes X1 with software algorithms to process the incoming data streams from X3 to reduce the geographic coordinates it receives from X3 into coordinates referenced to the display screen's coordinate system so that the data streams can be displayed as scaled tracks on the screen X2.

The geographic coordinates of the boundaries of the play area boundaries of all known play areas have been stored on the App. The geographic coordinates of the boundaries of the play area scoring zones of all known play areas have been stored on the App. The geographic coordinates of the boundaries of the play area fouling zones of all known play areas have been stored on the App. The geographic coordinates of the artifacts of all known play areas have been stored on the App.

In addition, the App has software used by the CPU in X1 to configure a scaled backdrop of the play area used during the sports event at the sports venue. X1 initiates the communication link X4 with X3. Upon a request from X1 for data from X3, X3 begins to transmit a continuous uninterrupted data stream to X1. When the sporting event is over, X1 signals X3 to end its transmission. The scale of the tracks and the backdrop are identical to assure that the tracks and the backdrop align properly.

X3 is a generic data source for each and every player's real time geographic coordinates on the play area and the play object's real time position coordinates on the play area during a sporting event. X3's primary function is to provide X1 with a continuous unbroken sequence or stream of geographic coordinates for the players and play object. In one preferred embodiment, the geographic coordinates originate from just one generic source X3. In another preferred embodiment, there is more than one generic source of geographic coordinates in order to have a backup in the event that one of the generic sources fails to perform its function during the sporting event. The generic sources are essentially surveillance systems for capturing the geographic coordinates of the players and the play object on the play area.

The App configures the backdrop. The backdrop is configured as an animated rendering of the play area. The play area is configured with an animated rendering of pre-determined boundary lines wherein the boundary lines are defined by their geographic coordinates; and an animated rendering of at least one pre-determined artifact wherein the artifact is defined by its form and of its geographic coordinates; and an animated rendering of at least one pre-determined scoring zone wherein the scoring zone is defined by its boundaries and by the form of its geographic coordinates; and an animated rendering of at least one pre-determined fouling zone wherein the fouling zone is defined by its boundaries and by the form of its geographic coordinates.

X4 is the bi-directional communications link between X1 and X3 that carries signals from the generic source X3 transmitted to X1. Some administrative handshaking between X1 and X3 takes place via X4 before, during and after the sporting event. The transmission of X3 to X1 can be by hard wire and/or wirelessly depending on the nature of the technology of X3. The signal from X3 carried by X4 is encoded with the real time position coordinates of the players and play object on the play area and carries a continuous stream of data.

In another preferred embodiment, the App is downloaded into X1 from X3. The smart mobile device X1 is configured to be downloaded with the App.

The colors for the player's symbols and numbers and tracks on the screen X2 are chosen automatically by the App in X1 as a default setting or by the spectator as an option. The colors for the player's symbols and numbers and tracks on the screen can be chosen alternatively by the spectator using the pull down menu. The colors for the artifact's symbols and numbers and tracks on the screen are chosen automatically by the App. The colors for the artifact's symbols and numbers and tracks on the screen can be chosen alternatively by the spectator using the pull down menu.

In a preferred embodiment, a complete set of every known sports venue play area boundary coordinates are stored at an internet site or in the App. The play area data base contains all the pre-determined coordinates of all the current play area boundaries for each and every sport's venue. In a preferred embodiment, in order to keep all the play area data current, GPS position encoders are disposed along each of the sports venue's play area boundaries for those play areas that have been changed. GPS position coordinate data from these position encoders is transmitted wirelessly or by cable to X1 where the data is processed and the files are kept up to date.

The system comprises at least one generic data source of real time geographic coordinates for the players and the play object on the play area. The generic data source generates real time geographic coordinates for each and every player and play object on the play area and communicates the real time geographic position coordinates to the smart mobile devices X1 in real time. There are a multitude of smart mobile devices receiving real time geographic coordinates from X3. The smart mobile devices X1 are configured with at least one CPU and a CPU memory. The CPU memory acts as a memory repository for the App and for all data files. Application system software is also resident in the CPU memory. The purpose of the application system software is to provide instructions to the CPU to operate the system.

The generic data source X3 is a resource of the system. The generic data source X3 offers its data services to spectators having smart mobile devices like X1, X5 and X8. The generic data source is a pre-existing resource of the system. The generic data source is configured for furnishing the real-time player and play object geographic coordinates to the smart mobile devices X1. The generic data source is a generic surveillance means for capturing the real-time geographic position coordinates of the players and the play objects moving on the play area. Each of the players and the play object's instantaneous locations on the play area is marked by its geographic position coordinates at those locations. The generic data source constantly monitors the movements of the players and the play objects on the play area. The generic data source captures the movements of the players and the play objects as changing geographic position coordinates on the play area. Furthermore, the generic data source constantly relays the real-time geographic coordinates of the players and the play objects in real time to the smart mobile devices X1. The generic data source is a resource providing a continuous stream of geographic coordinates to the smart database.

X1 is configured as a repository for the real time geographic position coordinates that are continuously replenished by signals via X3 from at least one generic data source X3 of real time geographic coordinates for each and every player and play object on the play area of the sports venue. The signals are encoded with the identity of each and every player and play object on the play area; and with the identity of the play area and the sporting event and the sports venue and the local time and date of the sports event; and furthermore the smart mobile device X1 is configured as a repository for all historic geographic position coordinates for each and every player and play object on a play area.

Furthermore the smart mobile device X1 is configured as a repository for lists of all known past and present and future sporting events including the type of the sporting event, the name of sports venue, the start time of sporting events and the date of sporting events.

Furthermore the smart mobile device X1 is configured as a repository for play area parameters for all known play areas including the geographic coordinates of the boundaries of the play areas, and the geographic coordinates of the fouling zone boundaries of the play areas, and the geographic coordinates of the scoring zone boundaries of the play areas, and the geographic coordinates of the artifacts of the play areas, and pre-determined artifact parameters and details for graphically displaying the artifacts of the play area on the screen X2.

The smart mobile device X1 is configured with its pre-determined user agent ID for identifying the type of the smart mobile device.

The App configures the smart mobile device X1 to interrogate itself to determine its user agent ID.

The App configures smart mobile device X1 as a repository for lists of pre-determined screen parameters where each screen parameter is for configuring the display of the tracks and the backdrop on the screen X2 of the smart mobile device X1 for which they correspond.

The App is configured with the address of X3 for the smart mobile device X1 to communicate with via X4.

The App programs the smart mobile device X1 to communicate with the smart data base via X4.

The smart mobile device X1 identifies itself to X3 using the user agent ID. The spectator identifies the sporting event's name, date and venue to X1 that the spectator wishes to observe. The spectator can choose a past sporting event to observe or a current sporting event.

Using the sporting venue and date, the smart mobile device X1 selects the corresponding play area for the sporting event from its memory.

The smart mobile device X1 searches the lists of pre-determined screen parameters for the screen parameters for which the spectator's smart mobile device X1 corresponds.

The screen parameters are used by the smart mobile device X1 for transforming the real time geographic coordinates of the players and the play object on the play area into real time screen coordinates for displaying the tracks on the screen X2.

The screen parameters are used by the smart mobile device X1 for transforming the geographic coordinates of the boundaries of the play area, and the geographic coordinates of the fouling zone boundaries of the play area, and the geographic coordinates of the scoring zone boundaries of the play area, and the geographic coordinates of the artifacts of the play area, and the artifact parameters into an animated backdrop of the play area. The tracks are displayed on the screen against the backdrop. The backdrop is scaled to the same scale factor as the tracks so that they align together on the screen. The App instructs the smart mobile device X1 to configure its screen X2 to display the tracks against the backdrop.

The backdrop of the play area, which is displayed on the screen X2 as a background for the player's and play object's tracks, is configured by the App as an animated rendering of the play area. The primary purpose of the backdrop is to acclimate the spectator as to the location of the players and play object on the play area during the game.

The tracks and the backdrop are configured mutually by the App to be aligned with the x-y Cartesian coordinate system on the screen X2.

The play area has pre-determined boundary coordinates. The fouling zone boundaries of the play area have pre-determined boundary coordinates. The scoring zone boundaries of the play area have pre-determined boundary coordinates. The artifact's boundaries of the play area have pre-determined boundary coordinates; and the artifact's have pre-determined graphics and symbols.

The backdrop of the play area is configured by the App as an animated rendering of the pre-determined artifacts of the play area displayed on the screen X2. The backdrop is further configured by the App as an animated rendering of the play area's scoring zone displayed on the screen X2. The backdrop is further configured by the App as an animated rendering of the play area's fouling zone displayed on the screen X2. The backdrop is further configured by the App to be aligned with the x-y Cartesian coordinate system of the screen X2.

At the request of their respective spectators, the smart mobile devices X5 and X8 are downloaded with the mobile App from the internet, or from any other site, including from flash memory, and from X1, and even from their point of manufacture or distribution. In a preferred embodiment, in the case of downloading from X1, X5 would load from X1 via X7. X8 would load from X1 via X10.

In one preferred embodiment a purpose of the mobile App is to instruct the smart mobile device X5 CPU to receive data from X1; and the X8 CPU to receive data from X1; and X5 to display animated real-time or historic scaled tracks of the players and play object on the smart mobile device's screen X6 against an animated backdrop of the sports venue's play area; and X8 to display animated real-time or historic scaled tracks of the players and play object on the smart mobile device's screen X9 against an animated backdrop of the sports venue's play area; The backdrops for X1, X5 and X8 are identical except for options exercised by their spectators, and differences in scaling due to the differences between the types of smart mobile devices.

Additionally the purpose of the mobile App is to instruct the smart mobile device's X5 and X8 CPU's to receive data from X1 and to display animated real-time or historic scaled tracks of the players and play object on the smart mobile device's screen X6 and X9 respectively against an animated backdrop of the sports venue's play area.

The scale of the tracks in X5 and the backdrop in X5 are made identical to one another to assure their alignment on the screen X6 as they overlay. The scale of the tracks in X8 and the backdrop in X8 are made identical to one another to assure their alignment on the screen X9 as they overlay.

The spectator using X5 sees the same tracks displayed on screen X6 as the spectator using X1 sees on screen X2. The spectator using X5 sees the same backdrop displayed on screen X6 as the spectator using X1 sees on screen X2. The only differences between the displays will be due to different display options exercised by the two spectators.

The spectator using X8 sees the same tracks displayed on screen X9 as the spectator using X1 sees on screen X2. The spectator using X8 sees the same backdrop displayed on screen X9 as the spectator using X1 sees on screen X2. The only differences between the displays will be due to different display options exercised by the two spectators.

Now, in the event that X5 and/or X8 want to watch a different sporting event than the one that X1 is watching, then X5 and/or X8 would have to get the geographic coordinates of the players and play object of the sporting event from a different generic data source than X3. In order for them to have access to other generic data sources, X5 and/or X8 would have to have access to the internet or to WIFI for example.

We claim:

1. A sports entertainment system for sports spectators used for following movements of players and play objects via their geographic coordinates on a play area of a sporting event at a sports venue, wherein said system comprises:
   at least one generic resource configured to transmit said geographic coordinates of said players and said play objects in real time,
   a smart database, configured to receive from said generic resource, said geographic coordinates of said players and said play objects in real time; and
   wherein said smart database is further configured to transmit said geographic coordinates of said players and said play objects in real time;
   at least one smart mobile device,
   an app, having been downloaded into said smart mobile device, is for configuring said smart mobile device to receive said geographic coordinates of said players and said play objects from said smart database in real time; and
   wherein said app is for further configuring said smart mobile device to display said geographic coordinates as player's tracks and play object's tracks in real time, and
   wherein said player's tracks and said play object's tracks are each comprised of an animated display of a series of chronologically sequential points, and wherein each point represents said geographic coordinate on said play area, and
   wherein said system compares GPS coordinates of said play objects and GPS coordinates of said players to determine which players have said play objects, and wherein said system polls said sports venue to automatically retrieve and download
a) boundary coordinates of said play area, wherein tracking is disabled for said players and said play objects outside said play area boundary coordinates, and
a flag is raised when said play objects leave said play area boundary coordinates
b) boundary coordinates of foul zones,
wherein said play objects or said players and said foul zone coordinates are used to determine a foul
c) boundary coordinates of scoring zones,
wherein said play objects or said players and said scoring zone coordinates are used to determine a score and
d) data to render animation for play area artifacts.

2. The system of claim 1 wherein said player's tracks are furthermore comprised of:
a series of sequential straight lines for joining said sequential points for smoothing the appearance of said track.

3. The system of claim 2 wherein said player's tracks are furthermore comprised of:
an arrowhead displayed on the latest sequential straight line of said track for pointing in the direction of forward motion of said player.

4. The system of claim 3 wherein said player's tracks are furthermore comprised of:
a symbol displayed for identifying said player's track; wherein said symbol is located a finite distance from the tip of said arrow; and wherein said arrow points to said symbol.

5. The system of claim 1 wherein said play object's tracks are furthermore comprised of:
a series of sequential straight lines for joining said sequential points for smoothing the appearance of said track.

6. The system of claim 5 wherein said play object's tracks are furthermore comprised of:
an arrowhead displayed on the latest sequential straight line of said track for pointing in the direction of forward motion of said play object.

7. The system of claim 6 wherein said play object's tracks are furthermore comprised of:
a symbol displayed for identifying said play object's track; wherein said symbol is located a finite distance from the tip of said arrow; and wherein said arrow points to said symbol.

8. The system of claim 1 wherein furthermore said app is for configuring said smart mobile device to display said player's tracks and said play object's tracks against a backdrop wherein said backdrop is comprised of:
an animated rendering of said play area; and wherein said play area is defined by the pre-determined geographic coordinates of its physical boundaries,
an animated rendering of at least one artifact; and wherein said artifact is defined by its finite pre-determined form and its pre-determined geographic coordinates,
an animated rendering of at least one scoring zone; and wherein said scoring zone is defined by the pre-determined geographic coordinates of its physical boundaries,
an animated rendering of at least one fouling zone; and wherein said fouling zone is defined by the pre-determined geographic coordinates of its physical boundaries.

9. The system of claim 1 wherein furthermore said smart database is configured for:
serving as a repository for said geographic coordinates of said players and for said geographic coordinates of said play objects.

10. The system of claim 1 wherein said generic resource is further configured for encoding said geographic coordinates of said players and said geographic coordinates of said play objects with the time of each said geographic coordinate and the identities of said players and said play objects.

11. The system of claim 1 wherein said generic resource is further configured for encoding each of said geographic coordinates of said players and said play objects with the starting time and date and sporting event and identity of said sports venue.

12. The system of claim 1 wherein said app is further comprised of:
a repository of parameters of known past and present said sporting events comprising: the type of said sporting event; the name of said sports venue; the start time of said sporting event; the date of said sporting event; and wherein said parameters are for building a database for displaying historic tracks for historic games,
a repository of parameters of known past and present said play areas comprising: the geographic coordinates of said play area boundaries; the geographic coordinates of said scoring area boundaries; the geographic coordinates of said fouling area boundaries; the form of said artifacts; the geographic coordinates of said artifacts; and wherein said parameters are for building a database for displaying historic said backdrops for historic games, a repository of parameters of all known past and present said smart mobile devices comprising: parameters for configuring the display on a multitude of types and models of said smart mobile devices,
a repository of parameters of said player's tracks and said play object's tracks for historic said sporting events.

13. The system of claim 1 wherein said smart database is further comprised of:
a repository of parameters of a multitude of known historic said sporting events comprising: the type of said sporting event; the name of said sports venue; the start time of said sporting event; the date of said sporting event; and wherein said parameters are for building a database for displaying historic tracks for historic games,
a repository of parameters of a multitude of known historic said play areas comprising: the geographic coordinates of said play area boundaries; the geographic coordinates of said scoring area boundaries; the geographic coordinates of said fouling area boundaries; the form of said artifacts; the geographic coordinates of said artifacts; and wherein said parameters are for building a database for displaying historic backdrops for historic games,
a repository of parameters of a multitude of known historic said smart mobile devices comprising: parameters for configuring the display on each and every said smart mobile device,
a repository of parameters of said player's tracks and said play object's tracks for historic said sporting events.

14. The system of claim 1 wherein furthermore said app is for configuring said smart mobile device to display past said player's tracks and past said play object's tracks for historic said sporting events; and wherein said app is comprised of:

a software instruction set for configuring said smart mobile device for displaying said player's tracks and said play object's tracks and a backdrop, a repository of historic said player's tracks and historic said play object's tracks for historic said sporting events, a repository of historic said backdrops configured as:

an animated historical rendering of said play area; and wherein said play area is defined by the historical geographic coordinates of its physical boundaries for historic games, an animated historical rendering of at least one artifact; and wherein said artifact is defined by its pre-determined historic form and its historical geographic coordinates for historic games, an animated historical rendering of at least one scoring zone; and wherein said scoring zone is defined by the historical geographic coordinates of its physical boundaries for historic games, an animated historical rendering of at least one fouling zone; and wherein said fouling zone is defined by the historical geographic coordinates of its physical boundaries for historic games.

15. A sports entertainment system for sports spectators used for following movements of players and play objects via their generalized coordinates on a play area of a sporting event at a sports venue, wherein said system comprises:

a generic resource configured to transmit said generalized coordinates of said players and said generalized coordinates of said play objects in real time, a smart database, configured to receive said generalized coordinates of said players and said generalized coordinates of said play objects from said generic resource, a smart mobile device; and wherein said smart database is further configured for transforming said generalized coordinates of said players and said generalized coordinates of said play objects into transformed generalized coordinates for reducing time latency in said smart mobile device;

wherein said smart database is further configured to transmit said transformed generalized coordinates;

an app, having been downloaded into said smart mobile device, is for configuring said smart mobile device to receive said transformed generalized coordinates from said smart database; and wherein said smart mobile device is further configured by said app for displaying said transformed generalized coordinates as player's tracks and play object's tracks in real time, wherein said player's tracks and said play object's tracks are each comprised of an animated display of a series of chronologically sequential points, and wherein each said point represents said generalized coordinate on said play area, and wherein said system compares GPS coordinates of said play objects and GPS coordinates of said players to determine which players have said play objects, and wherein said system polls said sports venue to automatically retrieve and download a) boundary coordinates of said play area, wherein tracking is disabled for said players and said play objects outside said play area boundary coordinates, and a flag is raised when said play objects leave said play area boundary coordinates b) boundary coordinates of foul zones,
wherein said play objects or said players and said foul zone coordinates are used to determine a foul c) boundary coordinates of scoring zones,
wherein said play objects or said players and said scoring zone coordinates are used to determine a score and d) data to render animation for play area artifacts.

16. The system of claim 15 wherein said generalized coordinates are geographic coordinates.

17. The system of claim 15 wherein said player's tracks are furthermore comprised of:

a series of sequential straight lines for joining said sequential points for smoothing the appearance of said track.

18. The system of claim 17 wherein said player's tracks are furthermore comprised of:

an arrowhead displayed on the latest sequential straight line of said track for pointing in the direction of forward motion of said player.

19. The system of claim 15 wherein said play object's tracks are furthermore comprised of:

a series of sequential straight lines for joining said sequential points for smoothing the appearance of said track.

20. The system of claim 19 wherein said play object's tracks are furthermore comprised of:

an arrowhead displayed on the latest sequential straight line of said track for pointing in the direction of forward motion of said play object.

21. The system of claim 20 wherein said player's tracks are furthermore comprised of:

a symbol displayed for identifying said player's track; wherein said symbol is located a finite distance from the tip of said arrow; and wherein said arrow points to said symbol.

22. The system of claim 21 wherein said play object's tracks are furthermore comprised of:

a symbol displayed for identifying said play object's track; wherein said symbol is located a finite distance from the tip of said arrow; and wherein said arrow points to said symbol.

23. The system of claim 15 wherein furthermore said app is for configuring said smart mobile device to display said player's tracks and said play object's tracks against a backdrop wherein said backdrop is comprised of:

a software instruction set for configuring said smart mobile device for displaying said tracks and said backdrop, an animated rendering of said play area; and wherein said play area is defined by the generalized coordinates of its physical boundaries, an animated rendering of at least one artifact; and wherein said artifact is defined by its form and its generalized coordinates, an animated rendering of at least one scoring zone; and wherein said scoring zone is defined by the generalized coordinates of its physical boundaries, an animated rendering of at least one fouling zone; and wherein said fouling zone is defined by the generalized coordinates of its physical boundaries.

24. The system of claim 15 wherein furthermore said smart database is comprised of:

a software instruction set for configuring said smart mobile device in real time for displaying said tracks and a backdrop, a database for serving as a repository for said transformed generalized coordinates of said players and for said transformed generalized coordinates of said play objects, a database for serving as a repository for said transformed generalized coordinates of said players and for said transformed generalized coordinates of said play objects for displaying said player's tracks and said play object's tracks; and wherein said smart database is configured for furnishing said transformed generalized coordinates to said smart mobile device.

25. The system of claim 15 wherein said generic resource is further configured for encoding said generalized coordinates of said players and said generalized coordinates of said play objects with the real time of each said generalized coordinate and the identities of said players and said play objects.

26. The system of claim 15 wherein said generic resource is further configured for encoding each of said generalized coordinates of said players and said play objects with the starting time and date and sporting event and identity of said sports venue.

27. The system of claim 15 wherein said smart database is further comprised of:
- a software instruction set for configuring said smart mobile device for displaying historical said tracks and historical backdrop,
- a repository of parameters of known past and present said sporting events comprising: the type of said sporting event; the name of said sports venue; the start time of said sporting, event; the date of said sporting event; and wherein said parameters are for building a database in said smart database for displaying, historic tracks for historic games,
- a repository of parameters of a multitude of known past and present said play areas comprising: the generalized coordinates of said play area boundaries; the generalized coordinates of said scoring area boundaries; the generalized coordinates of said fouling area boundaries; the form of said artifacts; the generalized coordinates of said artifacts; and wherein said parameters are for building a database for displaying said backdrops for historic games,
- a repository of parameters of known past and present said smart mobile devices comprising: parameters for configuring the display on each and every said smart mobile device,
- a repository of parameters of said player's tracks and said play object's tracks for past said sporting events of historic games.

28. The system of claim 15 wherein said app is further comprised of:
- a software instruction set for configuring said smart mobile device for displaying historic said tracks and historic backdrop for historic games,
- a repository of parameters of known past and present said sporting events comprising: the type of said sporting event; the name of said sports venue; the start time, of said sporting event; the date of said sporting event; and wherein said parameters are for building a database for displaying, historic tracks,
- a repository of parameters of known past and present said play areas comprising: the generalized coordinates of said play area boundaries; the generalized coordinates of said scoring area boundaries; the generalized coordinates of said fouling area boundaries; the form of said artifacts; the generalized coordinates of said artifacts; and wherein said parameters are for building a database for displaying said backdrops,
- a repository of parameters of known past and present said smart mobile devices comprising: parameters for configuring the display on each and every said smart mobile device,
- a repository of parameters of said player's tracks and said play object's tracks for past said sporting events.

29. The system of claim 15 wherein furthermore said app is for configuring said smart mobile device to display historic said player's tracks and historic said play object's tracks for historic said sporting, events; and wherein said app is comprised of:
- a repository of historic said player's tracks and historic said play object's tracks for past said sporting events,
- a repository of historic backdrops comprised of:
- an animated historical rendering of said play area; and wherein said play area is defined by the historical generalized coordinates of its physical boundaries,
- an animated historical rendering of at least one artifact; and wherein said artifact is defined by its pre-determined form and its historical generalized coordinates,
- an animated historical rendering of at least one scoring zone; and wherein said scoring zone is defined by the historical generalized coordinates of its physical boundaries,
- an animated historical rendering of at least one fouling zone; and wherein said fouling zone is defined by the historical generalized coordinates of its physical boundaries.

30. A sports entertainment system for sports spectators used for following movements of players and play objects on a play area of a sports venue;
wherein said system comprises:
- a smart mobile device, and
- a generic resource configured for transmitting real-time signals encoded with the geographic coordinates of said players and said play objects, and
- an app, having been downloaded into said smart mobile device, is for configuring said smart mobile device for receiving said signals from said generic resource;
wherein said smart mobile device is further configured by said app for displaying said geographic coordinates of said players and said play object's as player's tracks and play object's tracks in real-time,
wherein said player's tracks and said play object's tracks are each comprised of an animated display of a series of chronologically sequential points, and wherein each point represents said geographic coordinate on said play area, and
wherein said system compares GPS coordinates of said play objects and GPS coordinates of said players to determine which players have said play objects,
and wherein said system polls said sports venue to automatically retrieve and download
a) boundary coordinates of said play area, wherein tracking is disabled for said players and said play objects outside said play area boundary coordinates, and
a flag is raised when said play objects leave said play area boundary coordinates
b) boundary coordinates of foul zones,
wherein said play objects or said players and said foul zone coordinates are used to determine a foul c) boundary coordinates of scoring zones,
wherein said play objects or said players and said scoring zone coordinates are used to determine a score and
d) data to render animation for play area artifacts.

31. The system of claim 30 wherein said player's tracks are furthermore comprised of:
a series of sequential straight lines for joining said sequential points for smoothing the appearance of said track.

32. The system of claim 31 wherein said player's tracks are furthermore comprised of:
an arrowhead displayed on the tip of said track for pointing in the direction of forward motion of said player.

33. The system of claim 32 wherein said player's tracks are furthermore comprised of:
a symbol displayed for identifying said player's track; wherein said symbol is located a finite distance from the tip of said arrow; and wherein said arrow points to said symbol.

34. The system of claim 30 wherein said play object's tracks are furthermore comprised of:
a series of sequential straight lines for joining said sequential points for smoothing the appearance of said track.

35. The system of claim 34 wherein said play object's tracks are furthermore comprised of:
an arrowhead displayed on the tip of said track for pointing in the direction of forward motion of said play object.

36. The system of claim 35 wherein said play object's tracks are furthermore comprised of:
a symbol displayed for identifying said play object's track; wherein said symbol is located a finite distance from the tip of said arrow; and wherein said arrow points to said symbol.

37. The system of claim 30 wherein furthermore said app is for configuring said smart mobile device to display said player's tracks and said play object's tracks against a backdrop wherein said backdrop is comprised of:
a software instruction set for configuring said smart mobile device in real time for displaying said tracks and said backdrop,
an animated rendering of said play area; and wherein said play area is defined by the geographic coordinates of its physical boundaries,
an animated rendering of at least one artifact; and wherein said artifact is defined by its form and its geographic coordinates,
an animated rendering of at least one scoring zone; and wherein said scoring zone is defined by the geographic coordinates of its physical boundaries,
an animated rendering of at least one fouling zone; and wherein said fouling zone is defined by the geographic coordinates of its physical boundaries.

38. The system of claim 30 wherein furthermore said smart mobile device is configured by said app:
for serving as a repository for said geographic coordinates of said players and for said geographic coordinates of said play objects,
for accessing the internet for updating said geographic coordinates of said players and for said geographic coordinates of said play objects,
for transforming said geographic coordinates of said players and said geographic coordinates of said play objects into transformed geographic coordinates for said players and for said play object for displaying said player's tracks and said play object's tracks,
for serving as a repository for said transformed geographic coordinates.

39. The system of claim 30 wherein said generic resource is further configured for encoding said geographic coordinates of said players and said geographic coordinates of said play objects with the real time of each said geographic coordinate and the identities of said players and said play objects.

40. The system of claim 30 wherein said generic resource is further configured for encoding each of said geographic coordinates of said players and said play objects with the starting time and date and sporting event and identity of said sports venue.

41. The system of claim 30 wherein said smart mobile device is further configured by said app as:
a repository of parameters of known past and present said sporting events comprising: the type of said sporting event; the name of said sports venue; the start time of said sporting event; the
date of said sporting event; and wherein said parameters are for building a database for displaying historic tracks for historic games,
a repository of parameters of a multitude of known past and present said play areas comprising: the geographic coordinates of said play area boundaries; the geographic coordinates of said scoring area boundaries; the geographic coordinates of said fouling area boundaries; the form of said artifacts; the geographic coordinates of said artifacts; and wherein said parameters are for building a database for displaying backdrops on each and every said smart mobile device,
a repository of parameters of a multitude of known past and present said smart mobile devices comprising: parameters for configuring the display on each and every said smart mobile device,
a repository of pre-determined parameters of said players tracks and said play object's tracks for past said sporting events.

42. The system of claim 30 wherein furthermore said app is for configuring said smart mobile device to display historical said players tracks and historical said play object's tracks for historical said sporting events; and wherein said app is comprised of:
a software instruction set for configuring said smart mobile device for displaying historical said tracks and historical backdrop,
a repository of past said players tracks and past said play object's tracks for past said sporting events;
a repository of past said backdrops comprised of:
an animated historical rendering of said play area; and wherein said play area is defined by the historical geographic coordinates of its physical boundaries,
an animated historical rendering of at least one artifact; and wherein said artifact is defined by its form and its pre-determined historical geographic coordinates,
an animated historical rendering of at least one scoring zone; and wherein said scoring zone is defined by the historical geographic coordinates of its physical boundaries,
an animated historical rendering of at least one fouling zone; and wherein said fouling zone is defined by the historical geographic coordinates of its physical boundaries.

43. A sports entertainment system for sports spectators used for following movements of players and play objects on a play area of a sports venue;
wherein said system comprises:
a smart mobile device, and
a generic resource configured for transmitting real-time signals encoded with generalized coordinates of said players and said play objects on said play area,
an app, having been downloaded into said smart mobile device, is for configuring said smart mobile device for receiving said signals from said generic resource;
wherein said smart mobile device is further configured by said app for displaying said generalized coordinates of said players and said play object's as player's tracks and play object's tracks in real-time;
wherein said player's tracks and said play object's tracks are each comprised of an animated display of a series of chronologically sequential points, and wherein each point represents said generalized coordinate on said play area, and
wherein said system compares GPS coordinates of said play objects and GPS coordinates of said players to determine which players have said play objects,
and wherein said system polls said sports venue to automatically retrieve and download
a) boundary coordinates of said play area, wherein tracking is disabled for said players and said play objects outside said play area boundary coordinates, and
a flag is raised when said play objects leave said play area boundary coordinates
b) boundary coordinates of foul zones,
wherein said play objects or said players and said foul zone coordinates are used to determine a foul
c) boundary coordinates of scoring zones,
wherein said play objects or said players and said scoring zone coordinates are used to determine a score and
d) data to render animation for play area artifacts.

44. The system of claim 43 wherein said player's tracks are furthermore comprised of:
a series of sequential straight lines for joining said sequential points for smoothing the appearance of said track.

45. The system of claim 43 wherein said play object's tracks are furthermore comprised of:
a series of sequential straight lines for joining said sequential points for smoothing the appearance of said track.

46. The system of claim 45 wherein said player's tracks are furthermore comprised of:
an arrowhead displayed on the tip of said track for pointing in the direction of forward motion of said player.

47. The system of claim 46 wherein said player's tracks are furthermore comprised of:
a symbol displayed for identifying said player's track; wherein said symbol is located a finite distance from the tip of said arrow; and wherein said arrow points to said symbol.

48. The system of claim 45 wherein said play object's tracks are furthermore comprised of:
an arrowhead displayed on the tip of said track for pointing in the direction of forward motion of said pay object.

49. The system of claim 48 wherein said play object's tracks are furthermore comprised of:
a symbol displayed for identifying said play object's track; wherein said symbol is located a finite distance from the tip of said arrow; and wherein said arrow points to said symbol.

50. The system of claim 43 wherein furthermore said app is for configuring said smart mobile device to display said player's tracks and said play object's tracks against a backdrop wherein said backdrop is comprised of:
an animated rendering of said play area; and wherein said play area is defined by the generalized coordinates of its physical boundaries,
an animated rendering of at least one artifact; and wherein said artifact is defined by its form and its pre-determined generalized coordinates,
an animated rendering of at least one scoring zone; and wherein said scoring zone is defined by the generalized coordinates of its physical boundaries,
an animated rendering of at least one fouling zone; and wherein said fouling zone is defined by the generalized coordinates of its physical boundaries.

51. The system of claim 43 wherein furthermore said smart mobile device is configured by said app:
for serving as a repository for said generalized coordinates of said players and for said generalized coordinates of said play objects,
for transforming said generalized coordinates of said players and said generalized coordinates of said play objects into transformed generalized coordinates for said players and for said play object for displaying said players tracks and said play object's tracks,
for serving as a repository for said transformed generalized coordinates.

52. The system of claim 43 wherein said generic resource is further configured for encoding said generalized coordinates of said players and said generalized coordinates of said play objects with the real time of each said generalized coordinate and the identities of said players and said play objects.

53. The system of claim 43 wherein said generic resource is further configured for encoding each of said generalized coordinates of said players and said play objects with the starting time and date and sporting event and identity of said sports venue.

54. The system of claim 43 wherein said app further configures said smart mobile device as:
a repository of parameters of a multitude of known past and present said sporting events comprising: the type of said sporting event; the name of said sports venue; the start time of said sporting event; the date of said sporting event; and wherein said parameters are for building a database for displaying historic said player's tracks and historic said play object's tracks and backdrops,
a repository of parameters of a multitude of known past and present said play areas for historic games comprising: the generalized coordinates of said play area boundaries; the generalized coordinates of said scoring area boundaries; the generalized coordinates of said fouling area boundaries; the form of said artifacts; the generalized coordinates of said artifacts; and wherein said parameters are for building a database for displaying historic said backdrops,
a repository of parameters of a multitude of known past and present said smart mobile devices comprising: parameters for configuring the display on each and every said smart mobile device for displaying historic said player's tracks and historic said play object's tracks and backdrops, a repository of parameters of said player's tracks and said play object's tracks for past said sporting events for displaying historic said player's tracks and historic said play object's tracks.

55. The system of claim 43 wherein furthermore said app is for configuring said smart mobile device to display historical said player's tracks and historical said play object's tracks for past said sporting events; and wherein said app is comprised of:

- a software instruction set for configuring said smart mobile device for displaying historical said tracks and historical said backdrop,
- a repository of past said player's tracks and past said play object's tracks for past said sporting events,
- a repository of past said backdrops comprised of:
- an animated historical rendering of said play area; and wherein said play area is defined by the historical generalized coordinates of its physical boundaries for historic games,
- an animated historical rendering of at least one artifact; and wherein said artifact is defined by its form and its historical generalized coordinates,
- an animated historical rendering of at least one scoring zone; and wherein said scoring zone is defined by the historical generalized coordinates of its physical boundaries for historic games,
- an animated historical rendering of at least one fouling zone; and wherein said fouling zone is defined by the historical generalized coordinates of its physical boundaries for historic games.

56. The system of claim 55 wherein furthermore said app is for configuring said smart mobile device for collecting and storing the geographic coordinates of said players and said play object's on said play area from an internet service provider.

57. The system of claim 55 wherein furthermore said app is downloaded into said smart mobile device from an internet service provider.

58. The system of claim 55 wherein furthermore said app is downloaded into said smart mobile device from flash memory.

59. The system of claim 55 wherein furthermore said app is downloaded into said smart mobile device from WIFI.

* * * * *